US009602465B2

(12) United States Patent
Jain et al.

(10) Patent No.: US 9,602,465 B2
(45) Date of Patent: Mar. 21, 2017

(54) SYSTEMS AND METHODS FOR CARRIER GRADE NAT OPTIMIZATION

(71) Applicant: Citrix Systems, Inc., Fort Lauderdale, FL (US)

(72) Inventors: Nishant Kumar Jain, Bangalore (IN); Sameer Bagepalli Ramesh, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 234 days.

(21) Appl. No.: 14/481,215

(22) Filed: Sep. 9, 2014

(65) Prior Publication Data
US 2016/0072766 A1  Mar. 10, 2016

(51) Int. Cl.
*H04L 1/00* (2006.01)
*H04L 29/12* (2006.01)
*H04L 29/08* (2006.01)

(52) U.S. Cl.
CPC ...... *H04L 61/2567* (2013.01); *H04L 61/2532* (2013.01); *H04L 67/141* (2013.01); *H04L 61/255* (2013.01)

(58) Field of Classification Search
CPC ... H01L 61/25–61/2589; H01L 67/14–67/141; H01L 12/56–12/569
See application file for complete search history.

(56) References Cited

U.S. PATENT DOCUMENTS

| 2005/0013308 | A1* | 1/2005 | Wybenga | H04L 45/00 370/396 |
| 2010/0287227 | A1 | 11/2010 | Goel et al. | |
| 2011/0235508 | A1* | 9/2011 | Goel | H04L 47/125 370/230 |
| 2011/0268119 | A1* | 11/2011 | Pong | H04L 47/32 370/392 |
| 2013/0315230 | A1* | 11/2013 | Li | H04L 12/14 370/352 |
| 2014/0181341 | A1* | 6/2014 | Vantrease | G06F 9/52 710/200 |

FOREIGN PATENT DOCUMENTS

KR  101019251 B1  3/2011

OTHER PUBLICATIONS

International Search Report and Written Opinion mailed Nov. 16, 2015 in PCT Application No. PCT/US2015/048915.

* cited by examiner

*Primary Examiner* — Nicholas Taylor
*Assistant Examiner* — Clayton R Williams
(74) *Attorney, Agent, or Firm* — Foley & Lardner LLP; Christopher J. McKenna; Shabbi S. Khan

(57) ABSTRACT

Methods and systems for maintaining NAT session management on a multi-core device are disclosed. A first core of the multi-core device that is intermediary between a plurality of clients and a plurality of servers may insert a NAT session into a local outbound session table stored in a memory of the first core. The first core may determine that a second core of the multi-core device will serve as a receiving core for a response to the request from the server to the client. The first core may insert the NAT session into a global session table responsive to determining that the second core will serve as the receiving core.

19 Claims, 37 Drawing Sheets

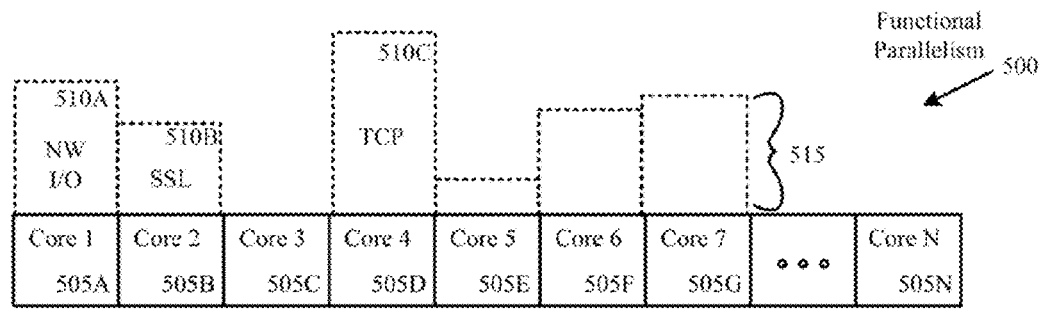
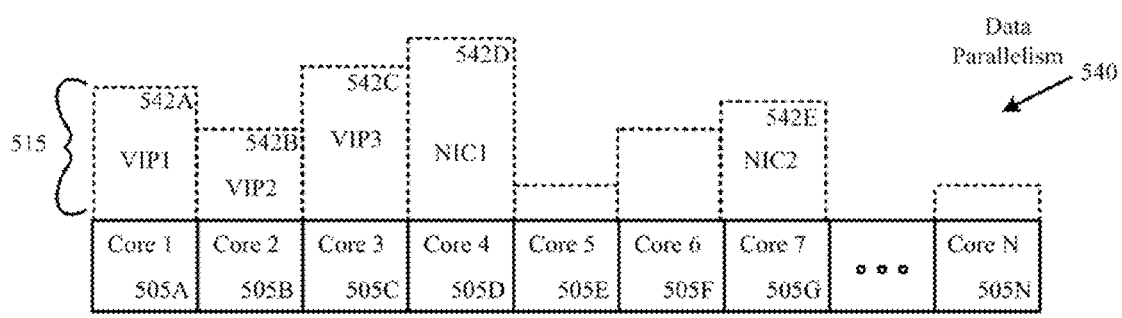
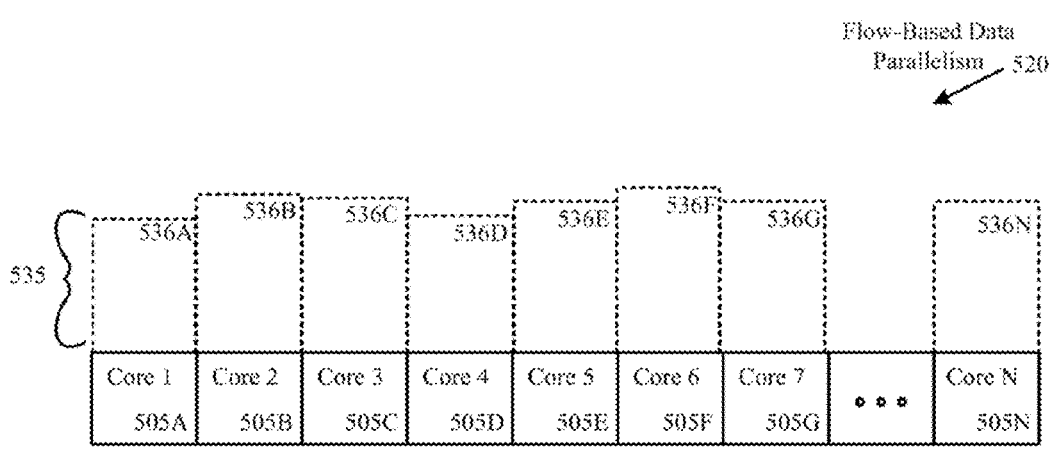
Fig. 5A

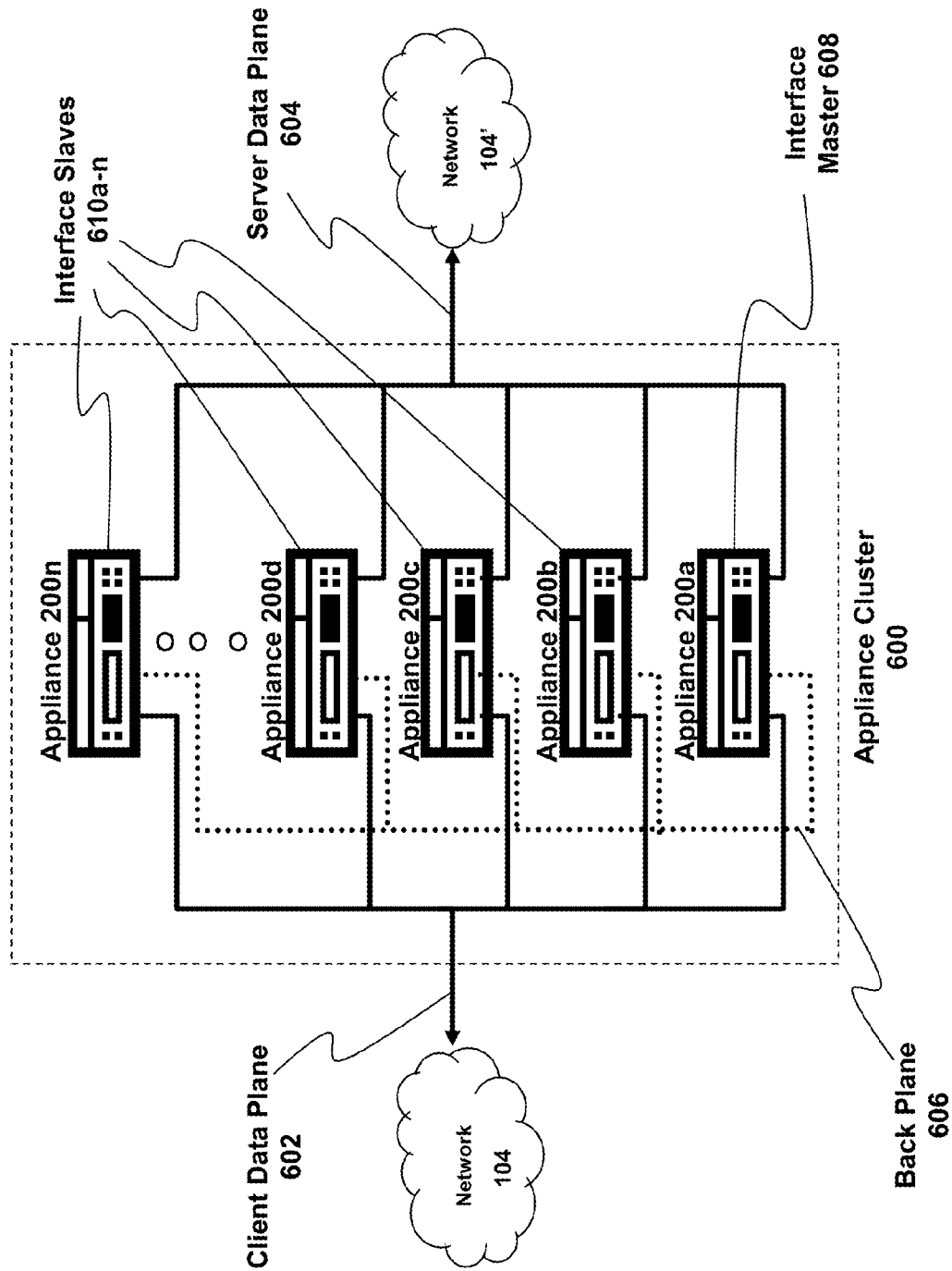

SYSTEMS AND METHODS FOR CARRIER GRADE NAT OPTIMIZATION

FIELD

The present application generally relates to systems and methods for carrier grade network address translation (NAT) optimization. In particular, the present application relates to systems and methods for network services, session management, port allocation, memory management, dynamic resource quotas for subscribers for carrier-grade network address translation (NAT) using a multi-core system.

BACKGROUND

A network may provide carrier-grade NAT. The network may allow inbound, outbound, and hair-pinned traffic. Some networks provide additional services, such as traffic management services, security, and optimization.

BRIEF SUMMARY

Embodiments of the present disclosure describe systems and methods to use advanced network services including traffic management services, security and optimization in conjunction with carrier-grade NAT. In some implementations, carrier-grade NAT, also known as large-scale NAT (LSN), is an approach to IPv4 network design in which end sites, such as residential networks, are configured with private network addresses that are translated to public IPv4 addresses by middlebox network address translator devices embedded in an intermediary between a plurality of clients and a plurality of servers, for example, the network operator's network. In this way, permitting the sharing of small pools of public addresses among many end sites. This shifts the NAT function and configuration thereof from end sites to the intermediary.

Embodiments of the present disclosure also describe systems and methods for providing scalable and efficient carrier-grade NAT session management on multi-core systems. In some embodiments, the systems and methods for NAT session management may be memory efficient on multi-core systems at a carrier-grade scale.

Embodiments of the present disclosure also describe systems and methods for port allocation for carrier-grade NAT on a multi-core system. To provide address translation, carrier-grade NAT allocates ports on IP addresses that are selected from NAT IP address pool. The allocation may be for any port on a given IP address or for a particular, specified port. A single port may be allocated from a range of free ports associated with a IP. In some configurations, a single or multiple blocks of ports may be allocated from the range of free ports. Port allocation may preserve parity and range during translation as required. Port allocation may consider traffic distribution scheme like RSS to ensure that return traffic lands on the same core. Multiple cores may perform port allocation for a single IP address without or with little synchronization for data in the shared memory that can be changed by more than one core. In some implementations, random ports from the range of free ports may be allocated.

Carrier-grade NAT on a multi-core system requires memory for allocating configuration structure (like NAT rules, port tables), dynamic entities (like NAT session, mapping, filtering, subscriber data, port block information, etc.) and hash table. On a multi-core implementation, there are various access patterns for this memory. Some memory, such as configuration structures, may reside in a core's private memory and be accessed efficiently due to the fact the configuration structures are changed and accessed by the respective core. Some resources could be efficiently partitioned among the cores and also safely reside in a core's private memory. A partitioning of some resources may leave some resources for need-based shared allocation which are present in shared memory like shared port tables. Entities which are heavily accessed and are required by dense subset of cores are replicated on all the cores. These entities are stored in shared memory. Subscriber data is one example of an entity stored in shared memory. Finally, entities which are either read-heavy or are required by only a sparse subset of cores are shared among all the cores. For instance, a NAT session which may be accessed by two cores in outbound and inbound path may be shared among all cores. Also, bindings, like mapping or filtering, are present on the shared memory and may be shared among all the cores because the bindings may be read-only after they are created. Hash tables are similar to bindings in this sense.

Subscribers may be configured to allocate a configured limit of resources. Such limits ensure fairness, so that no subscriber may use up resources and prevent other subscribes from using those resources, especially for scarce resources such as ports or memory. Subscribers include devices, servers, services, etc., that are the source, i.e. attached to the internal network and have addresses that are to be translated.

In one aspect, the present disclosure is related to a method for maintaining NAT session management on a multi-core device. A first core of the multi-core device that is intermediary between a plurality of clients and a plurality of servers may insert a NAT session into a local outbound session table stored in a memory of the first core. The first core may determine that a second core of the multi-core device will serve as a receiving core for a response to the request from the server to the client. The first core may insert the NAT session into a global session table responsive to determining that the second core will serve as the receiving core.

In some embodiments, the second core of the multi-core device identifies that the NAT session is not included in a local inbound session table stored in a memory of the second core. The device identified the NAT session in the global session table, and the second core inserts the NAT session in the local inbound session table stored on the memory of the second core.

In some embodiments, the first core determines that the first core will serve as a receiving core for a response to the request from the server to the client, and the first core inserts the NAT session in a local inbound session table stored on the memory of the first core.

In some embodiments, the first core identifies an existing NAT session owned by the first core. The device determines that the existing NAT session is shared using the global session table. The device determines that the existing NAT session is no longer being used. The device removes the existing NAT session is removed from local outbound session table stored on the memory of the first core. The device removes the existing NAT session from a local inbound session table stored on a memory of a core of the multi-core device determined to serve as a receiving core for packets corresponding to the existing NAT session.

In some embodiments, the first core receives an input packet corresponding to the NAT session. The device determines that at least one service is associated with the NAT session, and the device forwards the input packet from the client to the service.

In some embodiments, the first core receives a request for a port within a range on the first core. The device iterates through the slots of ports in a local bitmap of the first core. The device determines that a slot of ports in the local bitmap has at least one free port, and the first core allocates the free port responsive to the request.

In some embodiments, the device allocates a port range based on one of a block allocation or a NAT session.

In some embodiments, the first core receives a request for allocation of an object. The device determines that the object is available in a free queue of a memory of the first core. The device removes the object from the free queue. The device returns the object to a core from which the request was received.

In some embodiments, the first core receives a request for a resource on the first core. The first core determines that a quota is configured for a resource. The device processes the request responsive to determining that a quota is not configured for the resource.

In another aspect, the present disclosure is directed to a system for maintaining a NAT session management on a multi-core system. The system may comprise a multi-core device intermediary between a plurality of clients and a plurality of servers. The multi-core device may include a first core and a second core. The first core may be configure to insert a NAT session into a local outbound session stored in a memory of the first core, for a session established between a client of the plurality of clients and a server of the plurality of servers. The first core may also determine that a second core of the multi-core device will serve as a receiving core for a response to the request from the server to the client. The first core may also insert the NAT session into a global session table responsive to determining that the second core will serve as the receiving core.

In some embodiments, the second core of the multi-core device identifies that the NAT session is not included in a local inbound session table stored in a memory of the second core. The device identified the NAT session in the global session table, and the second core inserts the NAT session in the local inbound session table stored on the memory of the second core.

In some embodiments, the first core determines that the first core will serve as a receiving core for a response to the request from the server to the client, and the first core inserts the NAT session in a local inbound session table stored on the memory of the first core.

In some embodiments, the first core identifies an existing NAT session owned by the first core. The device determines that the existing NAT session is shared using the global session table. The device determines that the existing NAT session is no longer being used. The device removes the existing NAT session is removed from local outbound session table stored on the memory of the first core. The device removes the existing NAT session from a local inbound session table stored on a memory of a core of the multi-core device determined to serve as a receiving core for packets corresponding to the existing NAT session.

In some embodiments, the first core receives an input packet corresponding to the NAT session. The device determines that at least one service is associated with the NAT session, and the device forwards the input packet from the client to the service.

In some embodiments, the first core receives a request for a port within a range on the first core. The device iterates through the slots of ports in a local bitmap of the first core. The device determines that a slot of ports in the local bitmap has at least one free port, and the first core allocates the free port responsive to the request.

In some embodiments, the device allocates a port range based on one of a block allocation or a NAT session.

In some embodiments, the first core receives a request for allocation of an object. The device determines that the object is available in a free queue of a memory of the first core. The device removes the object from the free queue. The device returns the object to a core from which the request was received.

In some embodiments, the first core receives a request for a resource on the first core. The first core determines that a quota is configured for a resource. The device processes the request responsive to determining that a quota is not configured for the resource.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 5A are block diagrams of embodiments of approaches to implementing parallelism in a multi-core system.

FIG. 6 is a block diagram of an embodiment of a cluster system.

Figure 1A:
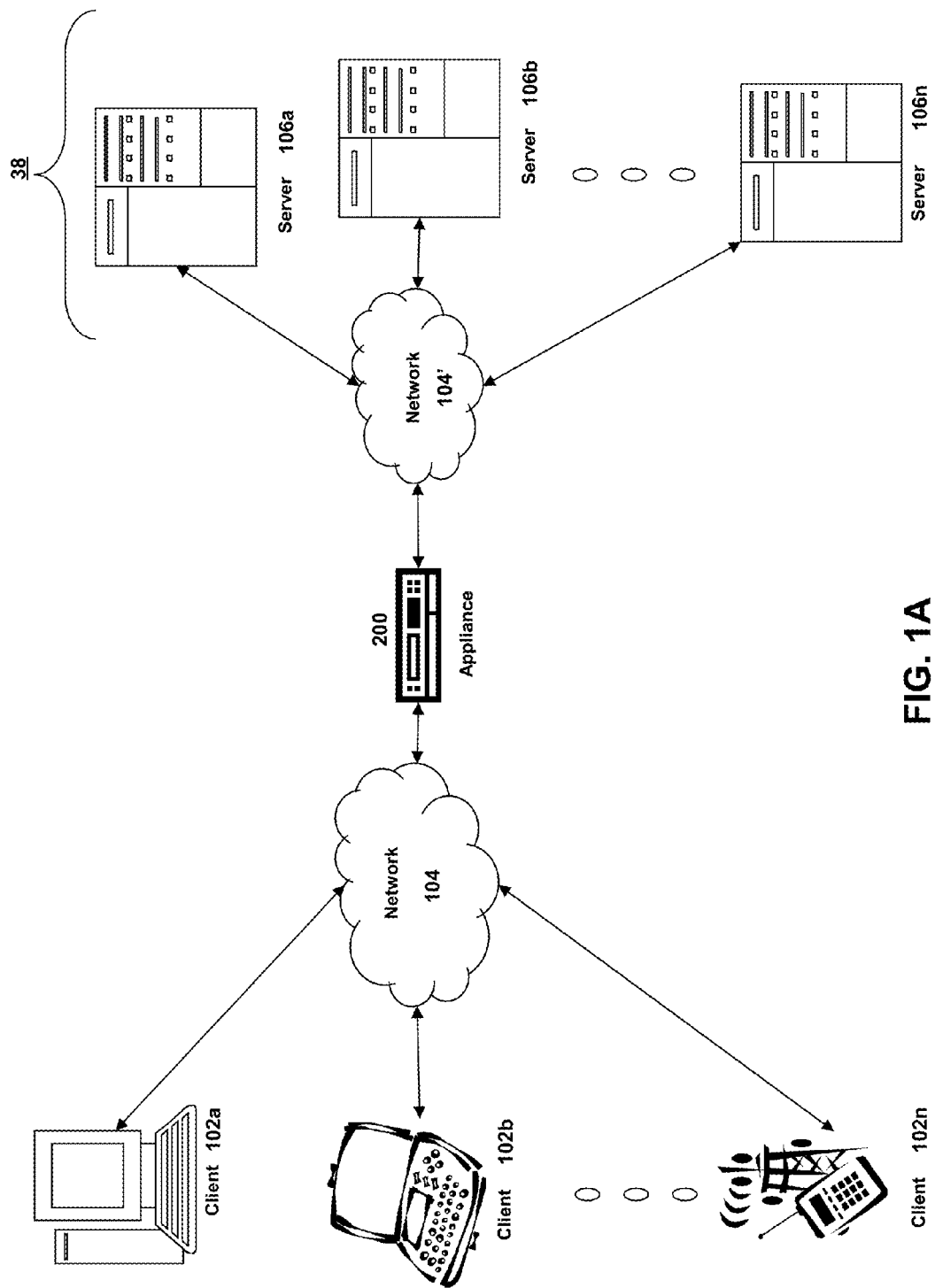
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein:

Section B describes embodiments of systems and methods for delivering a computing environment to a remote user.

Section C describes embodiments of systems and methods for accelerating communications between a client and a server.

Section D describes embodiments of systems and methods for virtualizing an application delivery controller.

Section E describes embodiments of systems and methods for providing a multi-core architecture and environment.

Section F describes embodiments of systems and methods for providing a clustered appliance architecture environment.

Section G describes embodiments of systems and methods for providing network services with carrier-grade NAT.

Section H describes embodiments of systems and methods for carrier-grade NAT session management on a multi-core system.

Section I describes embodiments of systems and methods for port-allocation for carrier-grade NAT on a multi-core system.

Section J describes embodiments of systems and methods for memory management for carrier-grade NAT implementation on a multi-core system.

Section K describes embodiments of systems and methods for dynamic resource quotas for subscribers of carrier-grade NAT on multi-core systems.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
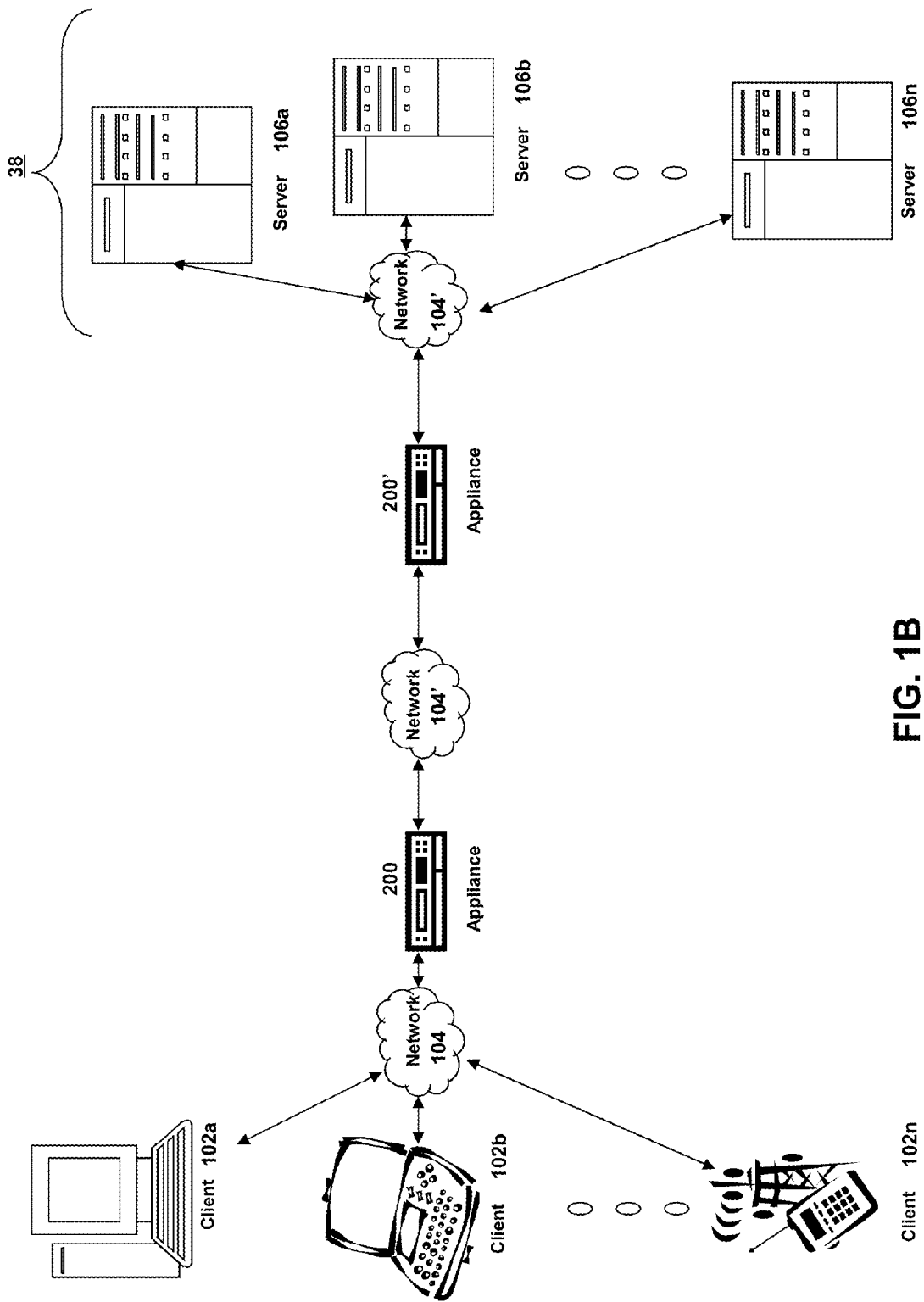
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
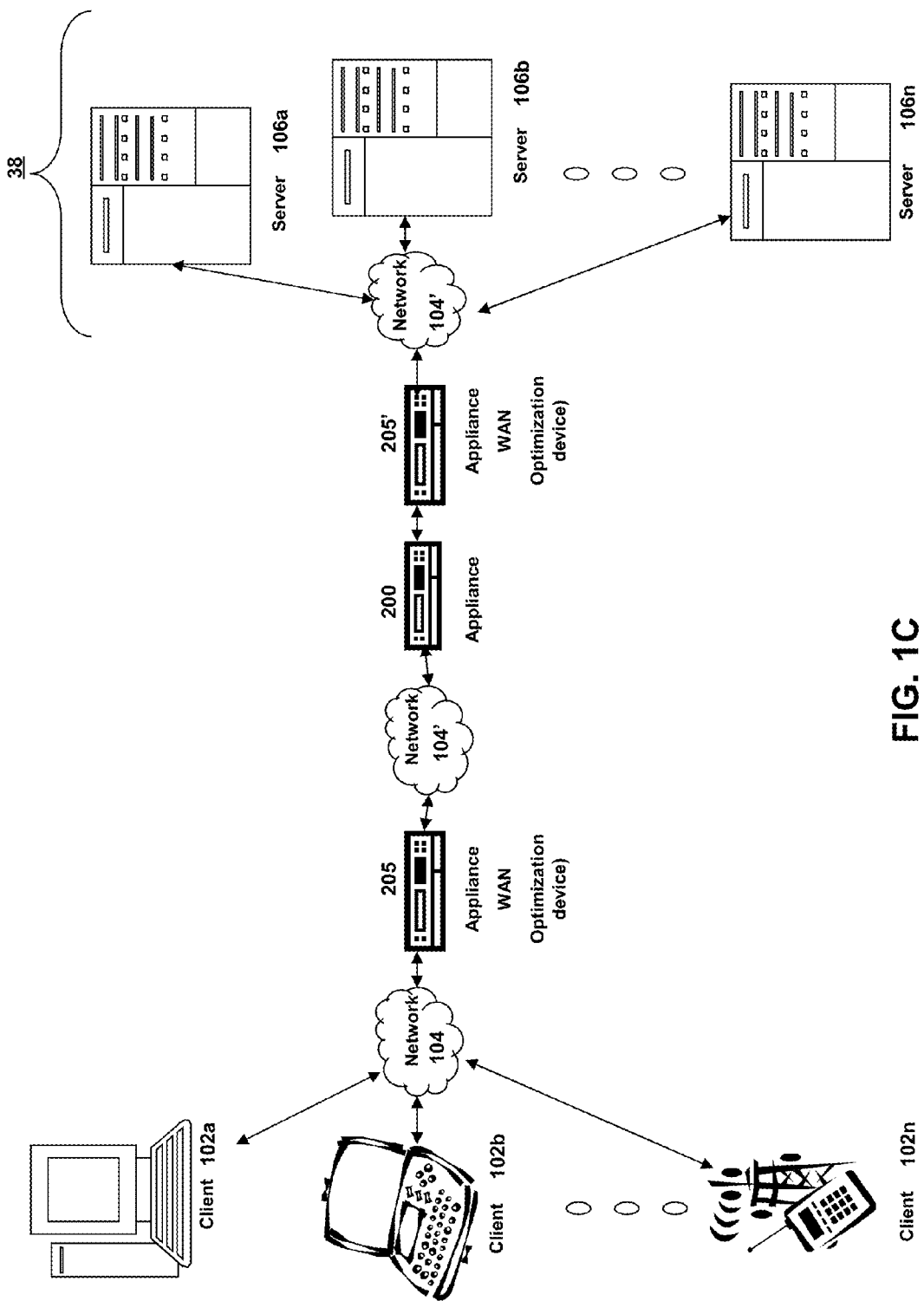
FIG. 1C is a block diagram of another embodiment of an environment for delivering a computing environment from a server to a client via an appliance.

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
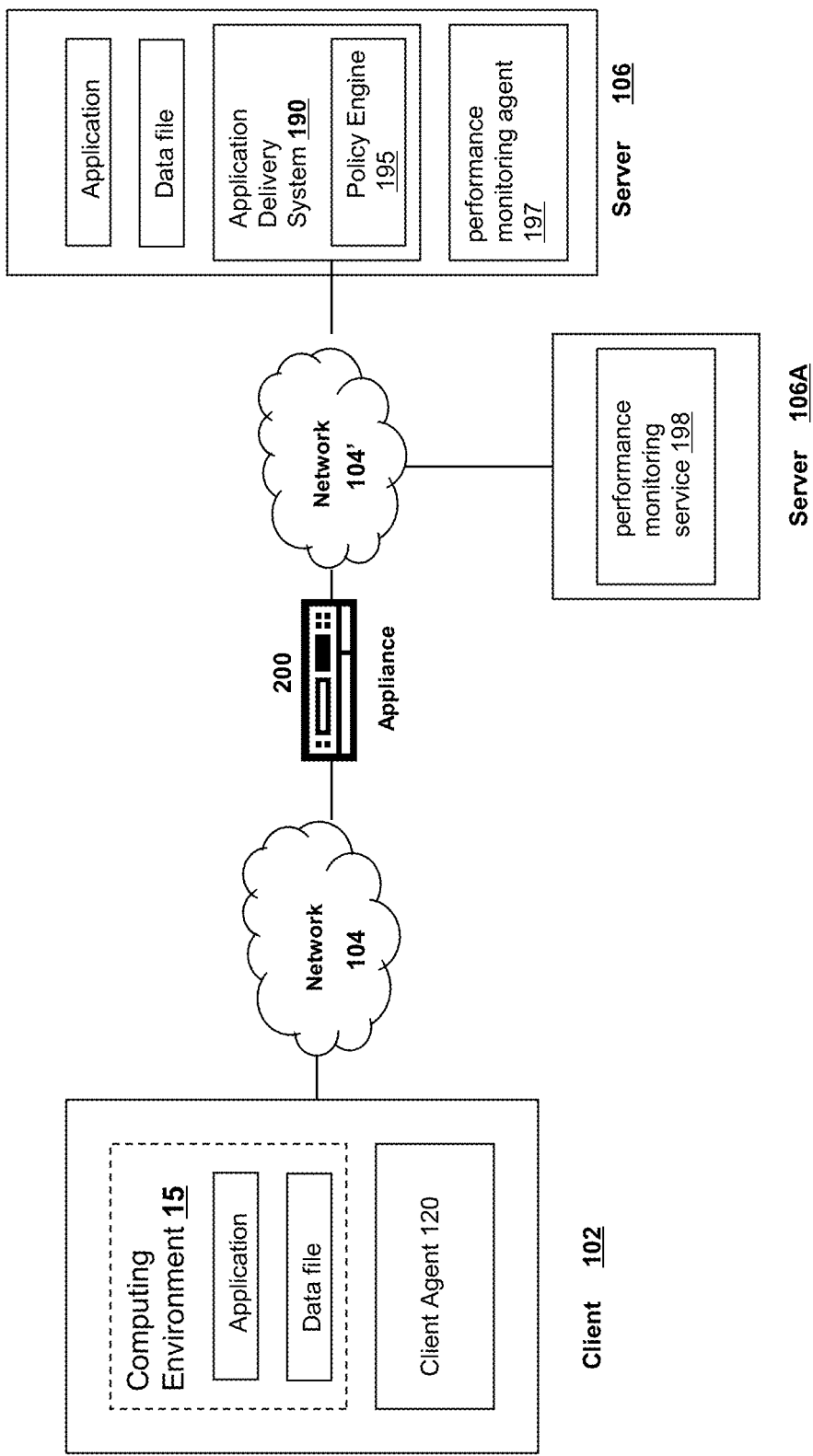
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
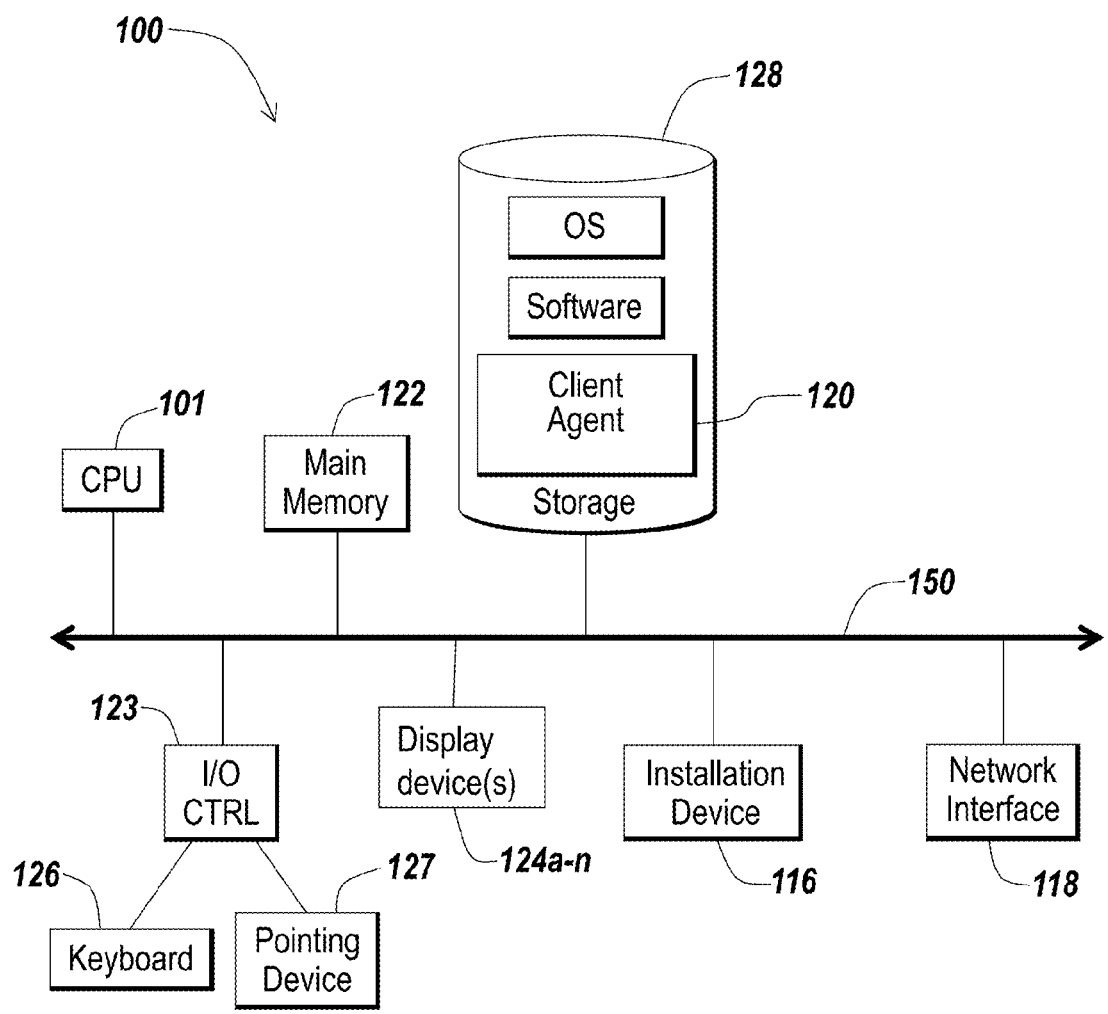
FIGS. 1E-1H are block diagrams of embodiments of a computing device.
Figure 1F:
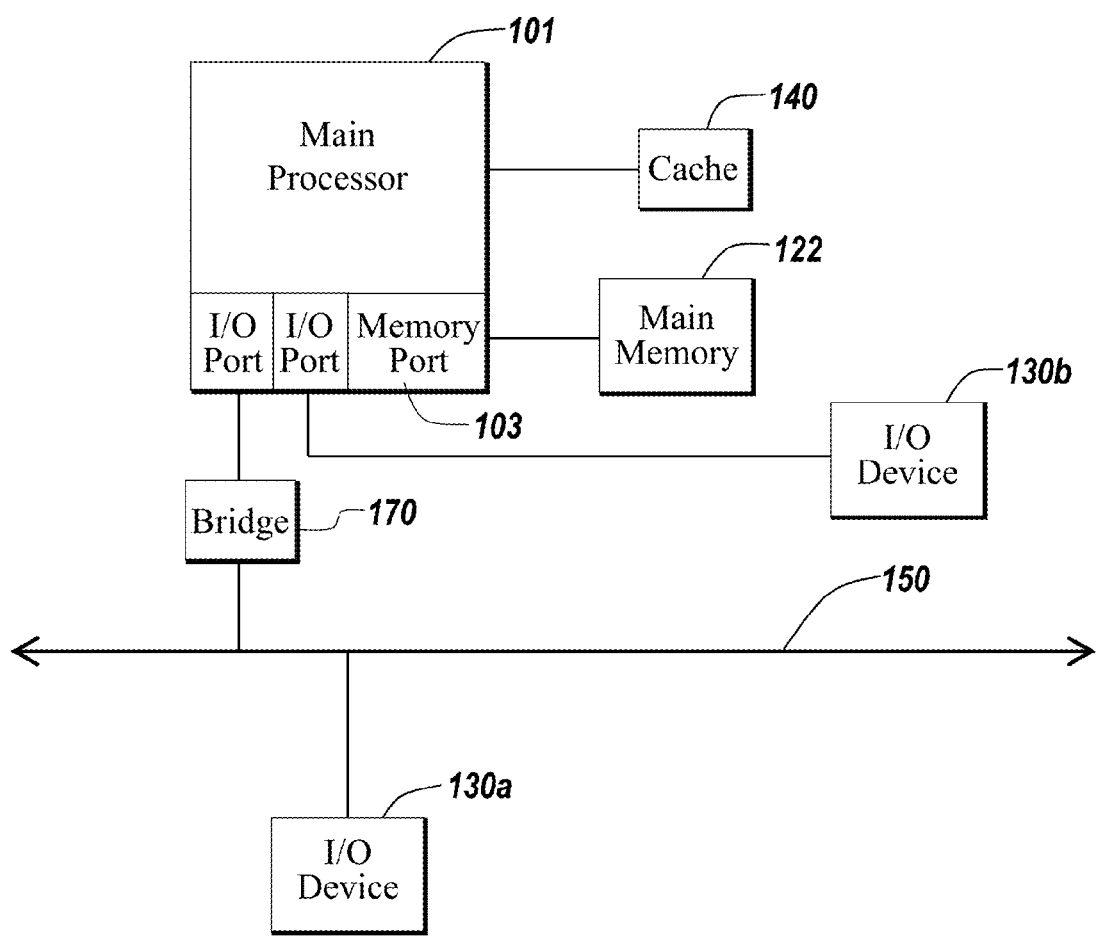

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
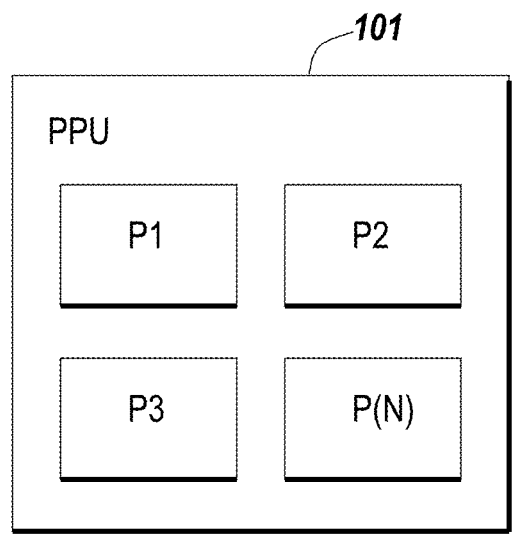

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
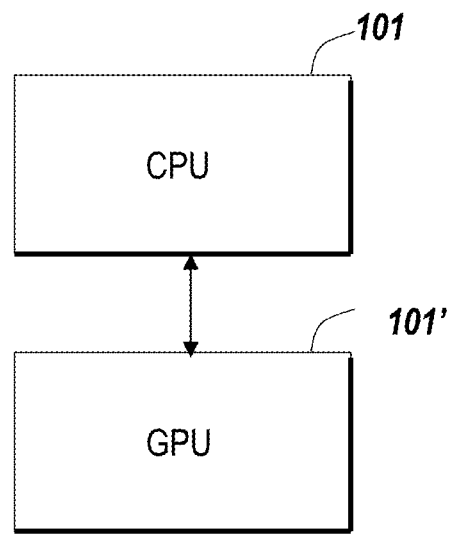

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
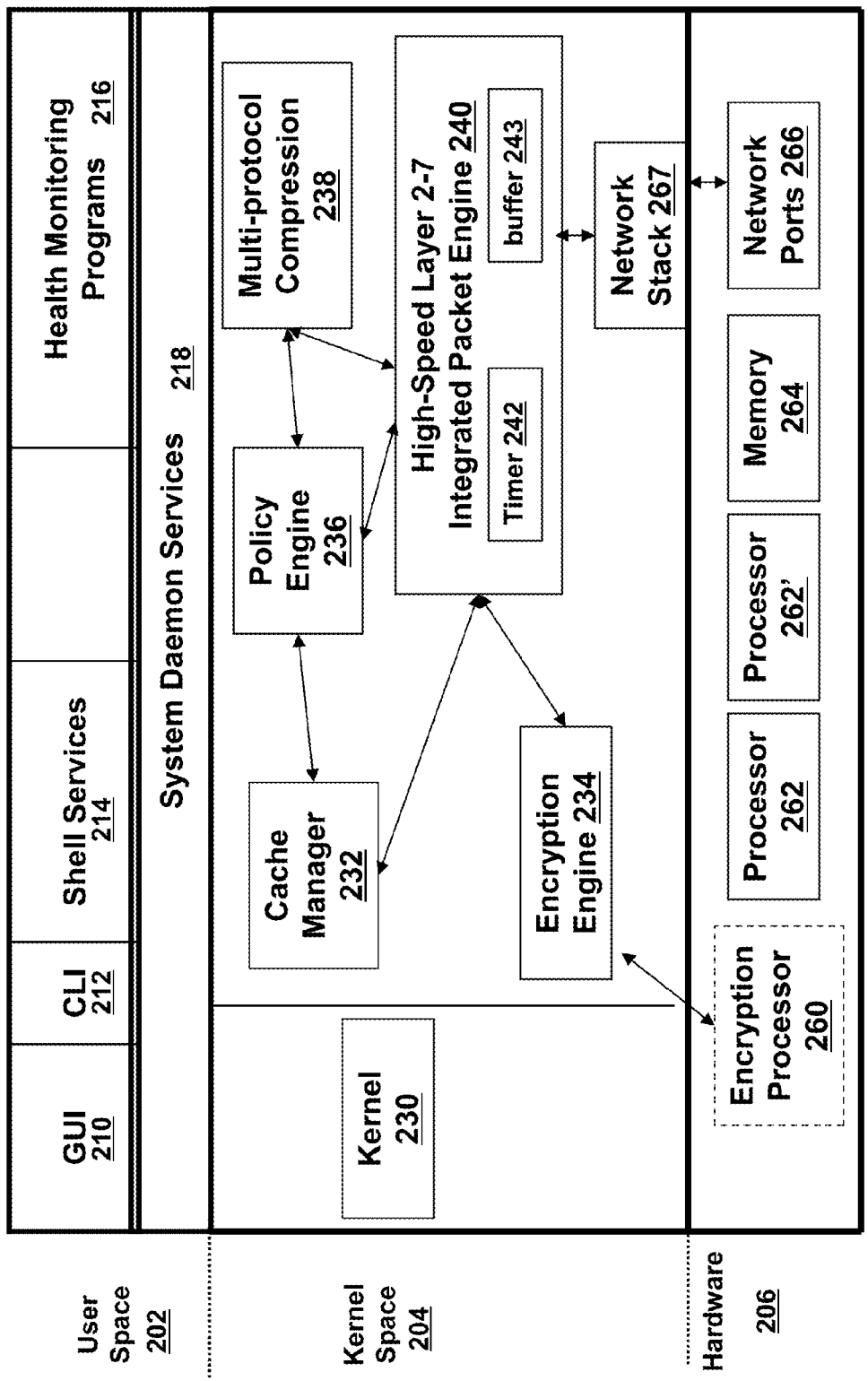
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102-102n, server 106a-106n, or appliance 200. As such, the encryption engine 234 provides offloading and acceleration of SSL processing. In one embodiment, the encryption engine 234 uses a tunneling protocol to provide a virtual private network between a client 102-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
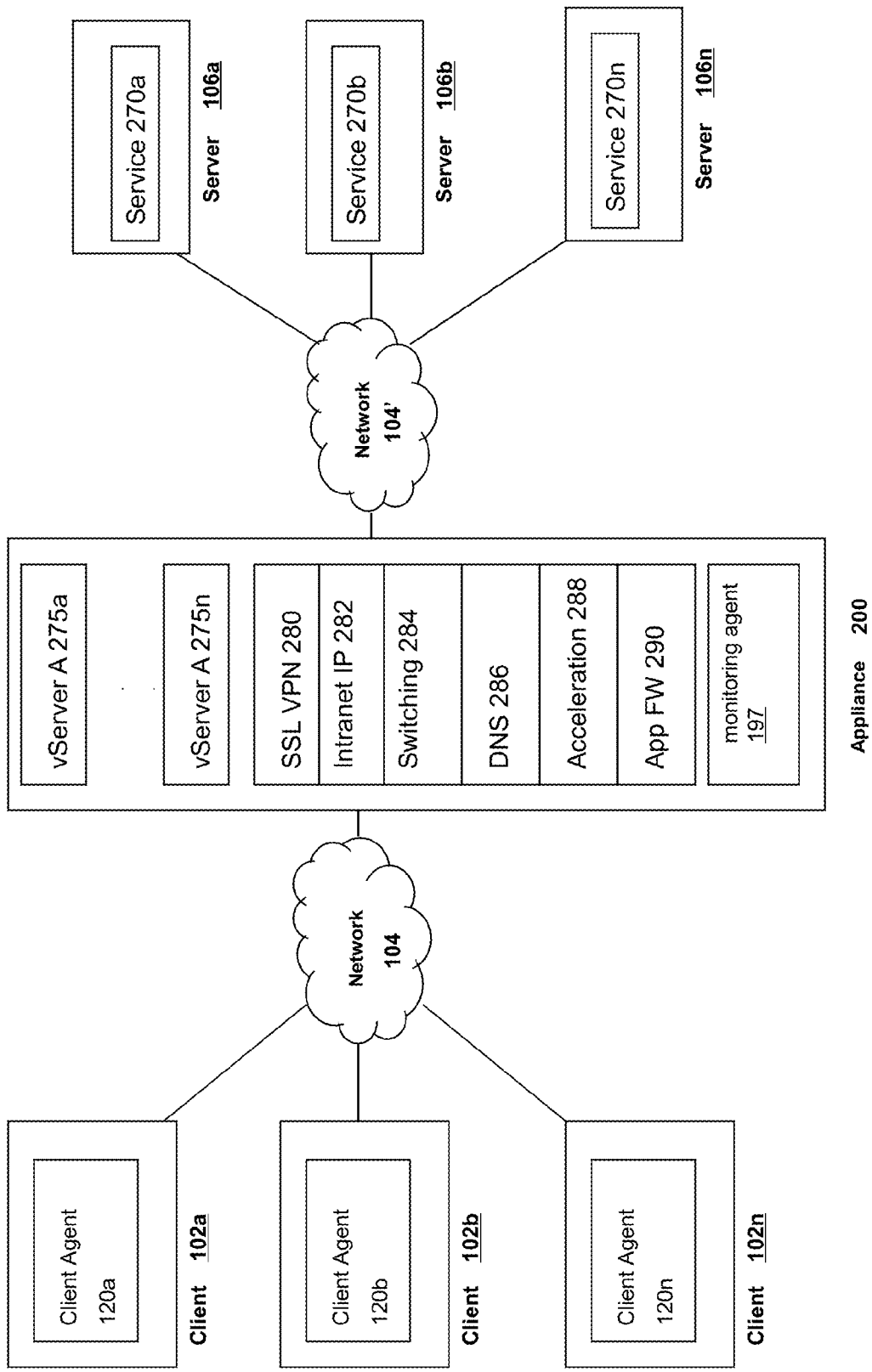
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5)

cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
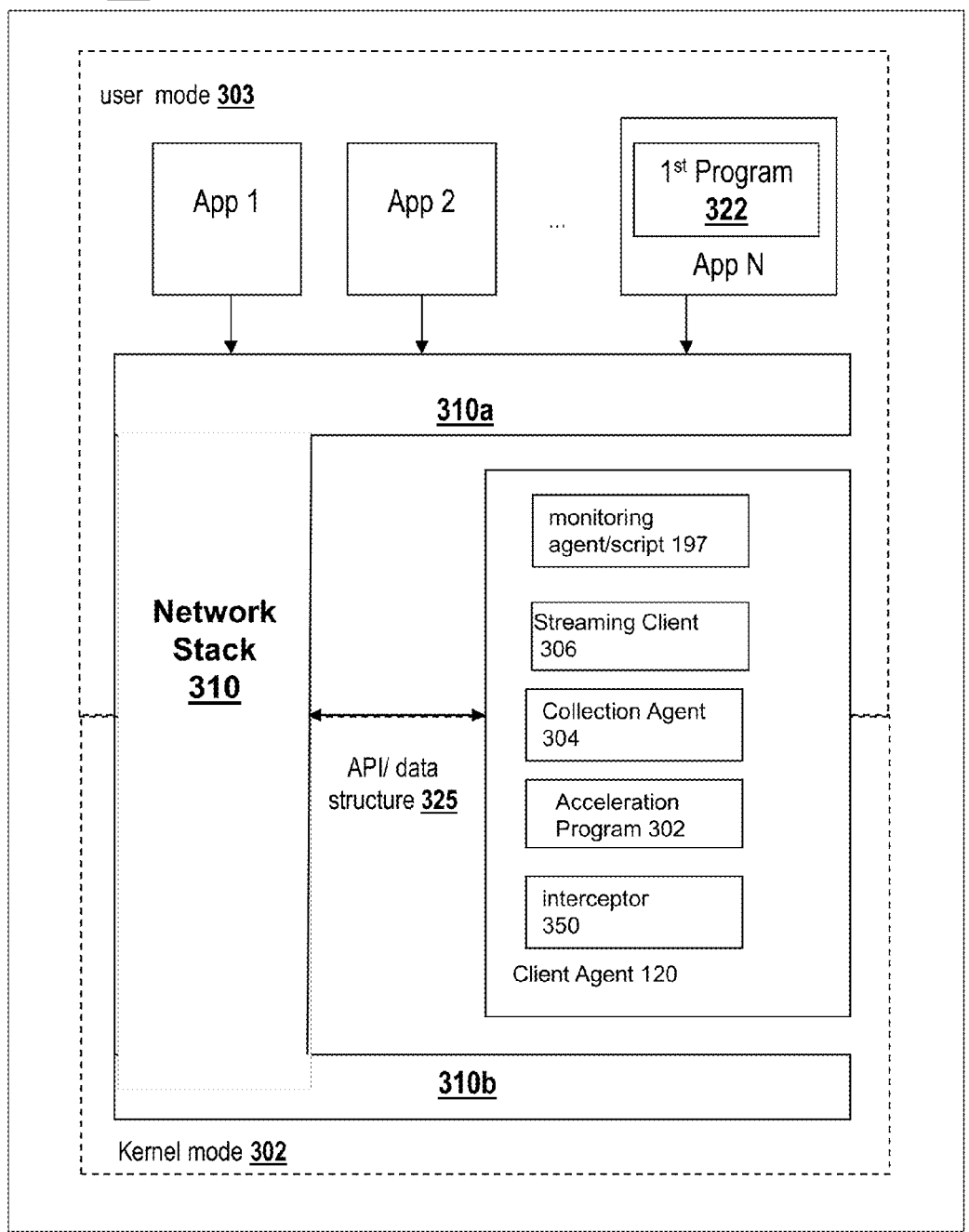
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310*a* of the network stack may provide user-mode access to the network stack 310 to an application while a second portion 310*a* of the network stack 310 provides access to a network. In some embodiments, a first portion 310*a* of the network stack may comprise one or more upper layers of the network stack 310, such as any of layers 5-7. In other embodiments, a second portion 310*b* of the network stack 310 comprises one or more lower layers, such as any of layers 1-4. Each of the first portion 310*a* and second portion 310*b* of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system and/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
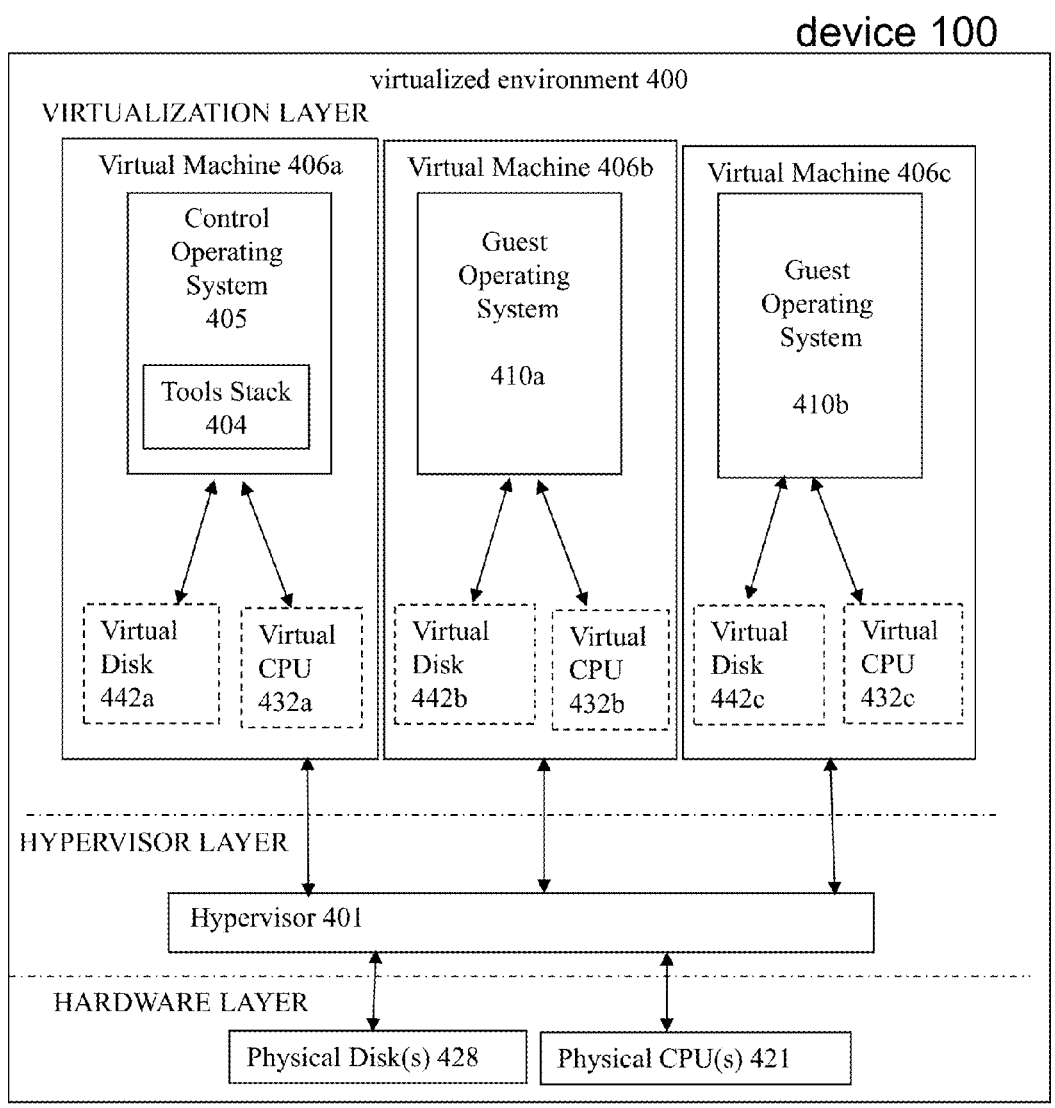
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
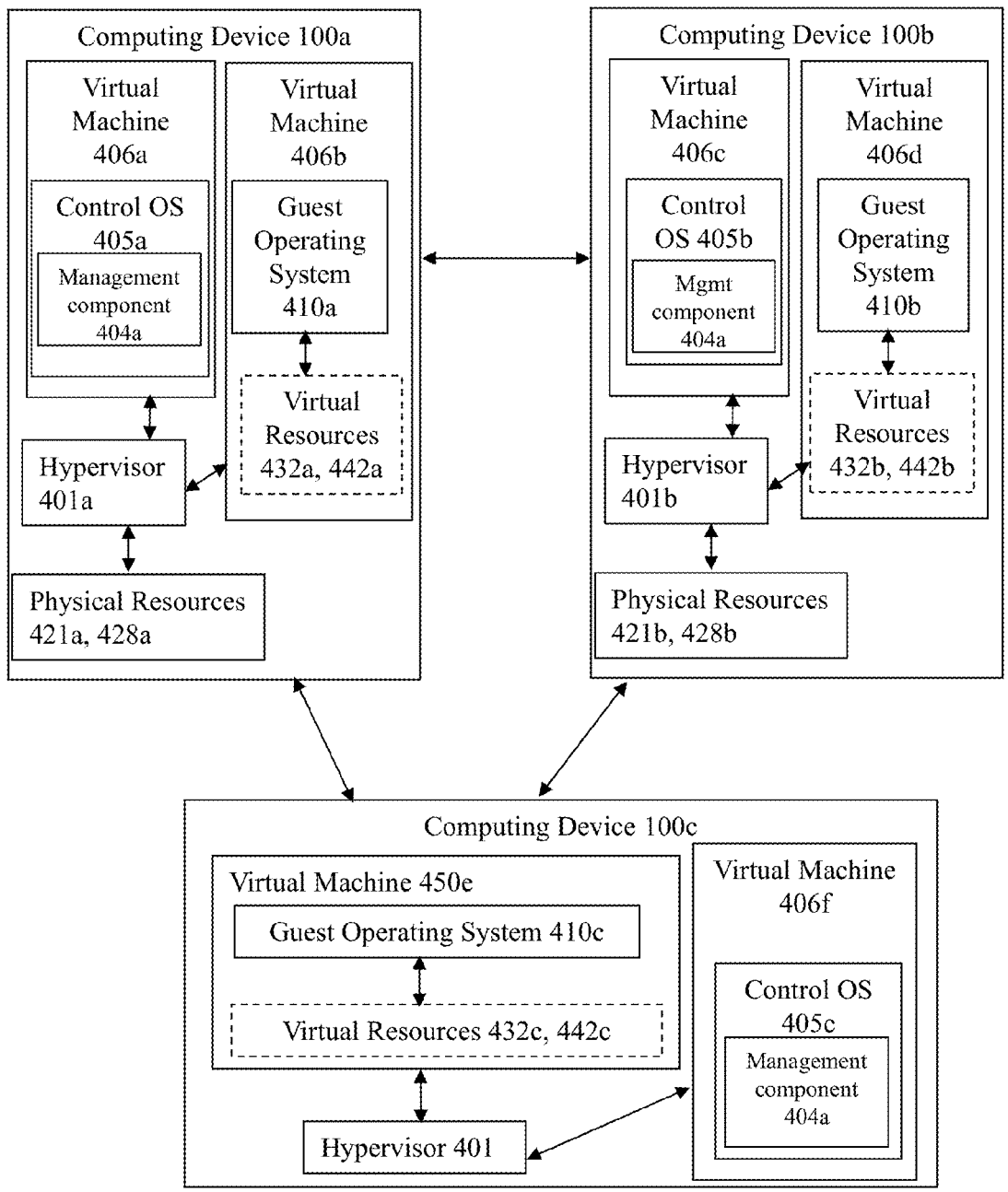
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
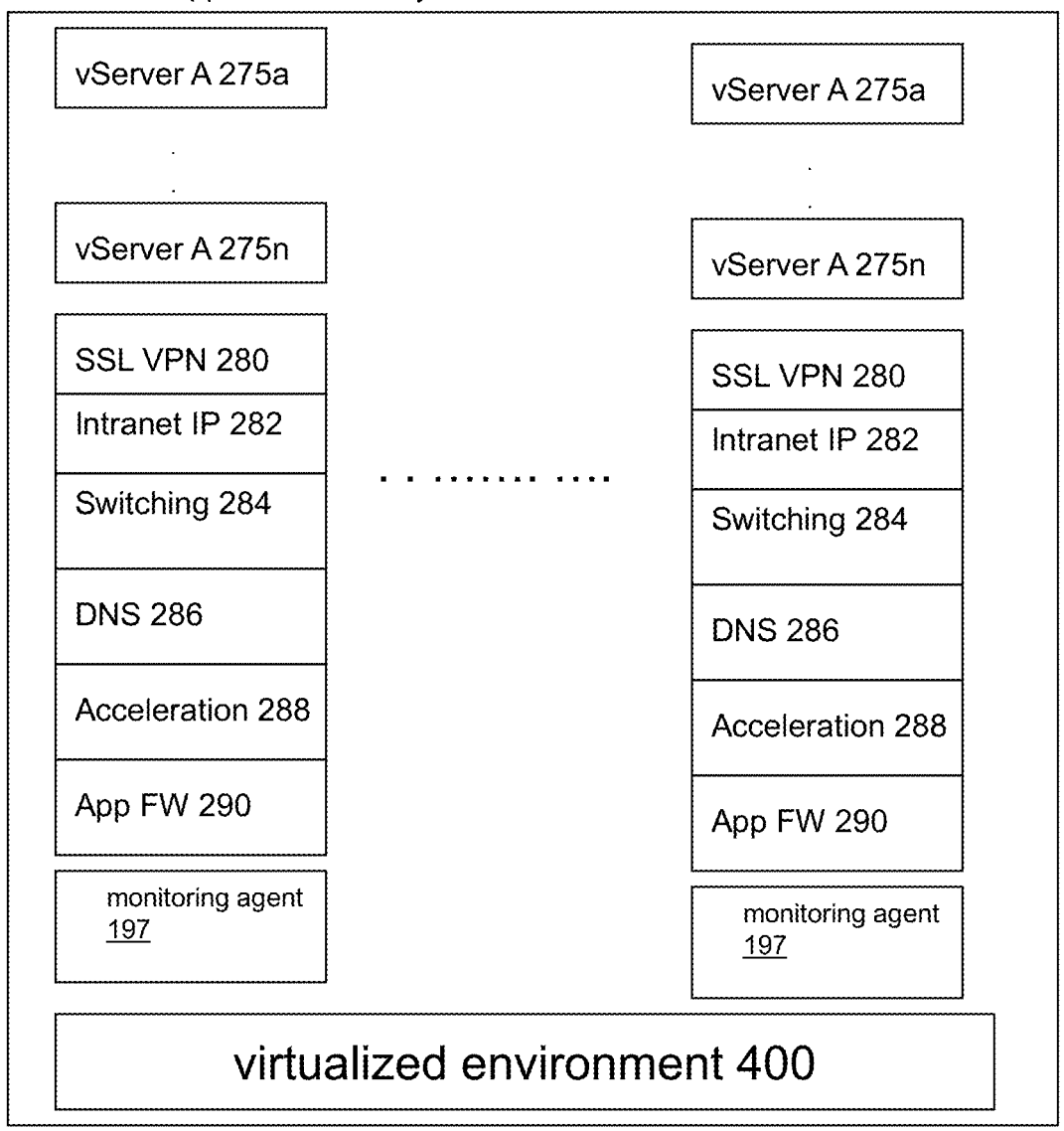
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
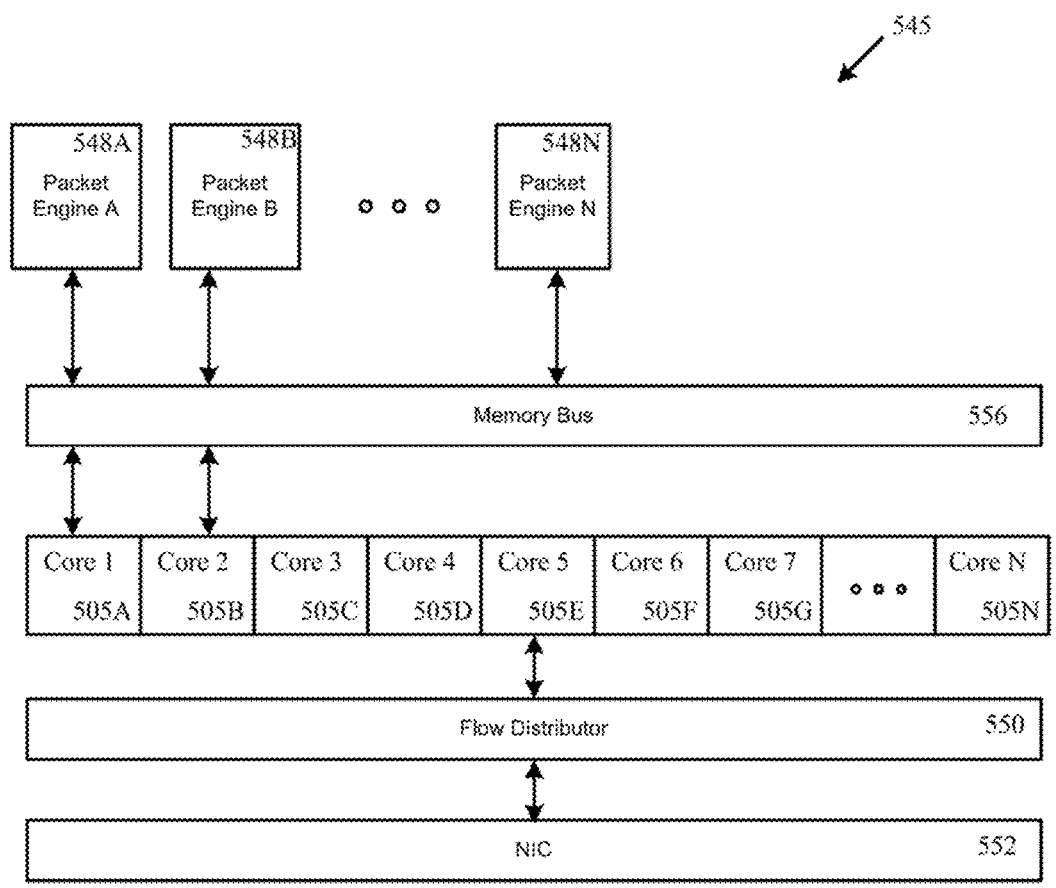
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/or manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may be used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
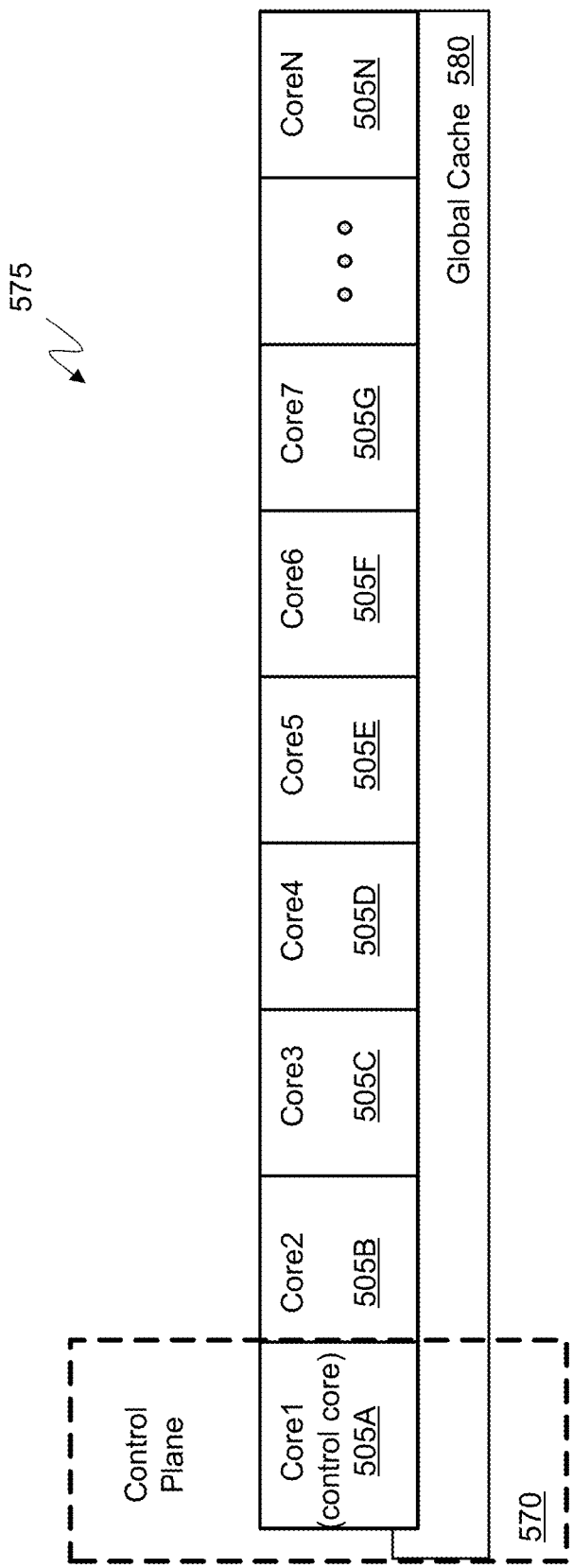
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Providing a Distributed Cluster Architecture

As discussed in the previous section, to overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Referring now to FIG. 6, illustrated is an embodiment of a computing device cluster or appliance cluster 600. A plurality of appliances 200a-200n or other computing devices, sometimes referred to as nodes, such as desktop computers, servers, rackmount servers, blade servers, or any other type and form of computing device may be joined into a single appliance cluster 600. Although referred to as an appliance cluster, in many embodiments, the cluster may operate as an application server, network storage server, backup service, or any other type of computing device without limitation. In many embodiments, the appliance cluster 600 may be used to perform many of the functions of appliances 200, WAN optimization devices, network acceleration devices, or other devices discussed above.

In some embodiments, the appliance cluster 600 may comprise a homogenous set of computing devices, such as identical appliances, blade servers within one or more chassis, desktop or rackmount computing devices, or other devices. In other embodiments, the appliance cluster 600 may comprise a heterogeneous or mixed set of devices, including different models of appliances, mixed appliances and servers, or any other set of computing devices. This may allow for an appliance cluster 600 to be expanded or upgraded over time with new models or devices, for example.

In some embodiments, each computing device or appliance 200 of an appliance cluster 600 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing to multiple cores. Accordingly, in such embodiments, the node distribution system need not manage flow distribution to individual cores, as that may be taken care of by a master or control core as discussed above.

In many embodiments, an appliance cluster 600 may be physically grouped, such as a plurality of blade servers in a chassis or plurality of rackmount devices in a single rack, but in other embodiments, the appliance cluster 600 may be distributed in a plurality of chassis, plurality of racks, plurality of rooms in a data center, plurality of data centers, or any other physical arrangement. Accordingly, the appliance cluster 600 may be considered a virtual appliance, grouped via common configuration, management, and purpose, rather than a physical group.

In some embodiments, an appliance cluster 600 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 600 may be similarly deployed to operate as a single appliance. In many embodiments, this may not require any network topology changes external to appliance cluster 600, allowing for ease of installation and scalability from a single appliance scenario. In other embodiments, an appliance cluster 600 may be similarly deployed as shown in FIGS. 1B-1D or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 600. In yet still other embodiments, an appliance cluster 600 may comprise a mix of appliances 200 or virtual machines configured as appliances 200. In some embodiments, appliance cluster 600 may be geographically distributed, with the plurality of appliances 200 not co-located. For example, referring back to FIG. 6, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 600, communications from clients and servers at the corporate headquarters may be directed to the appliance 200b deployed at the site, load balancing may be weighted by location, or similar steps can be taken to mitigate any latency.

Still referring to FIG. 6, an appliance cluster 600 may be connected to a network via a client data plane 602. In some embodiments, client data plane 602 may comprise a communication network, such as a network 104, carrying data between clients and appliance cluster 600. In some embodiments, client data plane 602 may comprise a switch, hub, router, or other network devices bridging an external network 104 and the plurality of appliances 200a-200n of the appliance cluster 600. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 600. Thus, in many embodiments, the interface master may comprise a flow distributor external to appliance cluster 600. In other embodiments, the interface master may comprise one of appliances 200a-200n. For example, a first appliance 200a may serve as the interface master, receiving incoming traffic for the appliance cluster 600 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves 610A-610N.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 600 may be connected to a network via a server data plane 604. Similar to client data plane 602, server data plane 604 may comprise a communication network, such as a network 104', carrying data between servers and appliance cluster 600. In some embodiments, server data plane 604 may comprise a switch, hub, router, or other network devices bridging an external network 104' and the plurality of appliances 200a-200n of the appliance cluster 600. For example, in one such embodiment, a router may be connected to an external network 104', and connected to a network interface of each appliance 200a-200n. In many embodiments, each appliance 200a-200n may comprise multiple network interfaces, with a first network interface connected to client data plane 602 and a second network interface connected to server data plane 604. This may provide additional security and prevent direct interface of client and server networks by having appliance cluster 600 server as an intermediary device. In other embodiments, client data plane 602 and server data plane 604 may be merged or combined. For example, appliance cluster 600 may be deployed as a non-intermediary node on a network with clients 102 and servers 106. As discussed above, in many embodiments, an interface master may be deployed on the server data plane 604, for routing and distributing communications from the servers and network 104' to each appliance of the appliance cluster. In many embodiments, an interface master for client data plane 602 and an interface master for server data plane 604 may be similarly configured, performing ECMP or LAG protocols as discussed above.

In some embodiments, each appliance 200a-200n in appliance cluster 600 may be connected via an internal communication network or back plane 606. Back plane 606 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 606, and from second appliance to server, and vice versa. In other embodiments, back plane 606 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 606. For example, a first node or master node may select an RSS key, such as at startup or boot, and may distribute this key for use by other nodes. In some embodiments, back plane 606 may comprise a network between network interfaces of each appliance 200, and may comprise a router, switch, or other network device (not illustrated). Thus, in some embodiments and as discussed above, a router for client data plane 602 may be deployed between appliance cluster 600 and network 104, a router for server data plane 604 may be deployed between appliance cluster 600 and network 104', and a router for back plane 606 may be deployed as part of appliance cluster 600. Each router may connect to a different network interface of each appliance 200. In other embodiments, one or more planes 602-606 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 600. In some embodiments, the control plane may be a fourth physical network, while in other embodiments, the control plane may comprise a VPN, tunnel, or communication via one of planes 602-606. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 606; or any other type and form of interface.

In some embodiments, as discussed above, appliance cluster 600 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 600. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 600 may receive communications from external routers via connection mirroring.

In many embodiments, flow distribution among nodes of appliance cluster 600 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g. TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as its internal IP address. In other embodiments, the flow distributor may assign internal IP addresses to each node within the appliance cluster 600. Traffic arriving from external clients or servers, such as a workstation used by an administrator, directed to the internal IP address of the appliance (1.2.3.4) may be forwarded directly, without requiring hashing.

G. Systems and Methods for Providing Network Services with Carrier-Grade NAT

Embodiments of the present disclosure describe systems and methods to use advanced network services including traffic management services, security and optimization in conjunction with carrier-grade NAT. In some implementations, carrier-grade NAT, also known as large-scale NAT (LSN), is an approach to IPv4 network design in which end sites, such as residential networks, are configured with private network addresses that are translated to public IPv4 addresses by middlebox network address translator devices embedded in an intermediary between a plurality of clients and a plurality of servers, for example, the network operator's network. In this way, permitting the sharing of small pools of public addresses among many end sites. This shifts the NAT function and configuration thereof from end sites to the intermediary.

The advanced network services may be provided on a transport layer, session layer, presentation layer, and/or the application layer of the OSI model. Traffic management services may include loading balancing and content switching. Security services can include application firewall and content filter. Optimization services can include compression.

The carrier-grade NAT may be provided on an intermediary device between an internal network, e.g. a private network, and an external network, e.g. the internet. Traffic may be inbound, i.e. originating from the external network and routing to the internal network, or outbound, i.e. originating from the internal network and routing to the external network. Traffic may also be hairpinned traffic, originating from an internal network and routing to another device within the internal network.

Embodiments of the present disclosure provide a logical service chaining of carrier-grade NAT features with configured network services on a single system. The configured network services may perform processing at higher network layers like HTTP header manipulation or override some or all translations performed by carrier-grade NAT. Services can be configured for some or all of NAT traffic (on specific and wild card IP/ports) and support processing of all NAT traffic types, including private network originated traffic or outbound traffic, internet originated traffic or inbound traffic, and hairpinned traffic.

For a new flow, a device intermediary between a plurality of clients and a plurality of servers and between one or more private networks and one or more public networks may create a lightweight NAT session based on configured NAT policies responsive to receiving a packet. An example of such a device may be appliance 200 shown in FIG. 2A. Next, the intermediary device may match various packet parameters of the received packet, such as IP address port, to lookup services. If no service matches, the intermediary device causes the packet to undergo IP address and port translation using the NAT session information, and transmits the translated packet to an intended destination of the packet. If, on the other hand, the intermediary device matches one or more services that have been configured for this flow, the intermediary device may create a new protocol control block (PCB) session. The new PCB may store states of different layers, including full TCP state, application layer state, etc. Depending on the service type and traffic direction, the intermediary device may create a link between the new PCB session and the NAT session using information from the NAT session. For outbound traffic, the intermediary device may use the translated IP address and port information to create the link. For inbound traffic, the intermediary device may use the destination private IP address and port information to create the link. For hairpinned traffic, the intermediary device may use a combination of translated IP, translated port, private IP address and private port information to create the link. Some services may dynamically allocate new NAT sessions for mapping/filtering bindings. A service may also specify parameters to be used for translation such as using a particular NAT IP. The intermediary device may perform packet translations using PCB session parameters for subsequent packets. For connections with NAT session linkage, services may impose certain restrictions to ensure proper NAT behavior. For example, server-side connection reuse may only be allowed if a packet is from matching translated IP address and port. Some services may perform NAT-specific functions, such as updating statistics.

In some embodiments, PCB session and NAT session may not be present in same address space. On a multi-core system, PCB session may be in core private memory while the NAT session may be present in shared memory. The intermediary device may maintain a link using reference count and flags. The PCB session may cache the frequently accessed information from the NAT session.

Figure 7A:
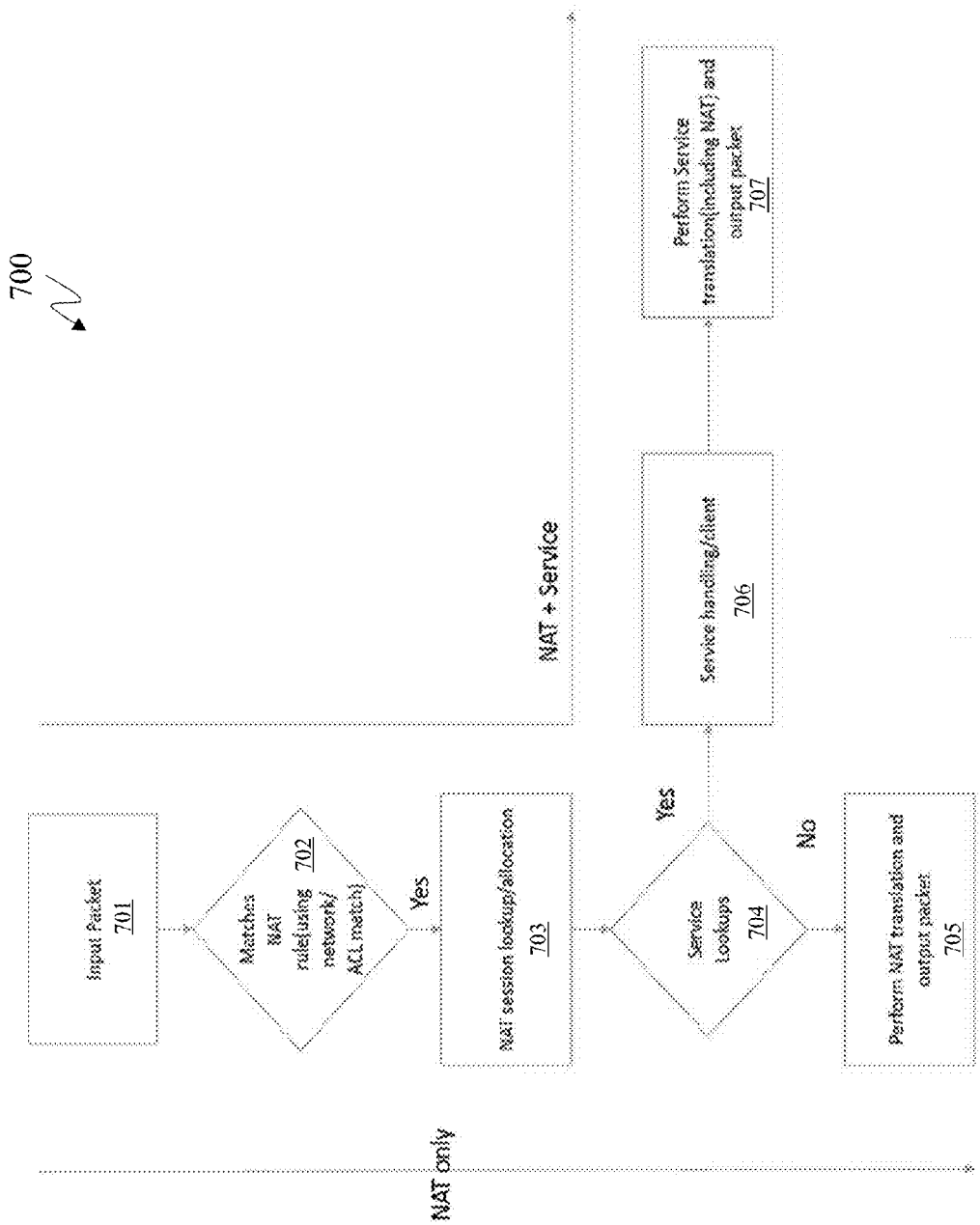
FIG. 7A is a flow diagram of an embodiment of a method for providing network services with carrier-grade network address translation (NAT)

Referring now to FIG. 7A, a flow diagram of an embodiment of a method for providing network services with carrier-grade NAT is described. In brief overview, the method 700 includes a device receiving an input packet (step 701), the device matching the input packet with a NAT rule (step 702), and the device performing NAT session lookup and allocation (step 703). The method may further include the device looking up a service (step 704), the device performing NAT translation and outputting the packet (step 705), the device handling the service for the client (step 706), and the device performing service translation and outputting the packet (step 707).

At step 701, the device may receive an input packet. The device may be intermediary to a plurality of clients and a plurality of servers. The input packet may be inbound, outbound, or hairpinned traffic. The input packet may comprise source and destination information, such as source IP, source port, destination IP address and destination port.

At step 702, the device may match the input packet to a NAT rule. In some implementations, the NAT rule may be an access control list (ACL) comprising access control entries that permit or deny packets passing through the appliance. A NAT rule may specify one or more of source IP, source port, source IP address mask, destination IP, destination port, destination mask, and other packet parameters. A NAT rule may further specify the translation direction, i.e. inbound and/or outbound traffic. Hairpinned traffic may be both an inbound and outbound traffic.

At step 703, the device may look up an NAT session and allocate memory for a new session. The device may perform a lookup using a lookup table, such as a hash table or an array. The lookup table may include entries corresponding to existing NAT sessions that have already been allocated. For a new flow, NAT session lookup may result in not finding a NAT session, at which point the device may allocate a new NAT session for the new flow and update the lookup table with an entry corresponding to the new NAT session. When a new NAT session is created, the device may associate one or more services with the NAT session, where the services created may be predefined by one or more NAT policies. Network services may be layer 4 to layer 7 services, including transport layer, session layer, presentation layer, and application layer services. Network services may include traffic management, security, and optimization services. In some instances, the NAT session lookup may result in an entry corresponding to an existing NAT session that had previously been allocated.

At step 704, the device may look up a service. The device may perform the lookup with the NAT session that was found or allocated at step 703. In some instances, the NAT session may be associated with no services. In other instances, the NAT session may be associated with one or more services. The device may perform the service lookup by finding one or more links between the NAT session and one or more PCB sessions. The device may store the links with the NAT session or in association with the NAT session.

At step 705, if no service is found, the device may perform a NAT translation on the input packet and the translated packet may be outputted. In some implementations, the device may modify one or more of the source IP, source port, destination IP, and destination port based on one or more NAT translation rules, table, and/or map. In some implementations, the device may route the translated packet to the destination IP address over one or more networks.

At step 706, if one more services are found at step 704, the device may perform service handling. In some implementations, the service handling may be performed for a client device. The service handling is described in greater detail in relation to FIG. 7B.

At step 707, the device may perform service translation and output the packet. The service translation may include NAT translation, as described in relation to step 705. Service translation may further include one or more translations from the services. For instance, a service may be a load balancing service, that changes the destination IP address of an inbound packet such that the packet may be received at a different server device that has a lower load than an original server destination of the packet.

Figure 7B:
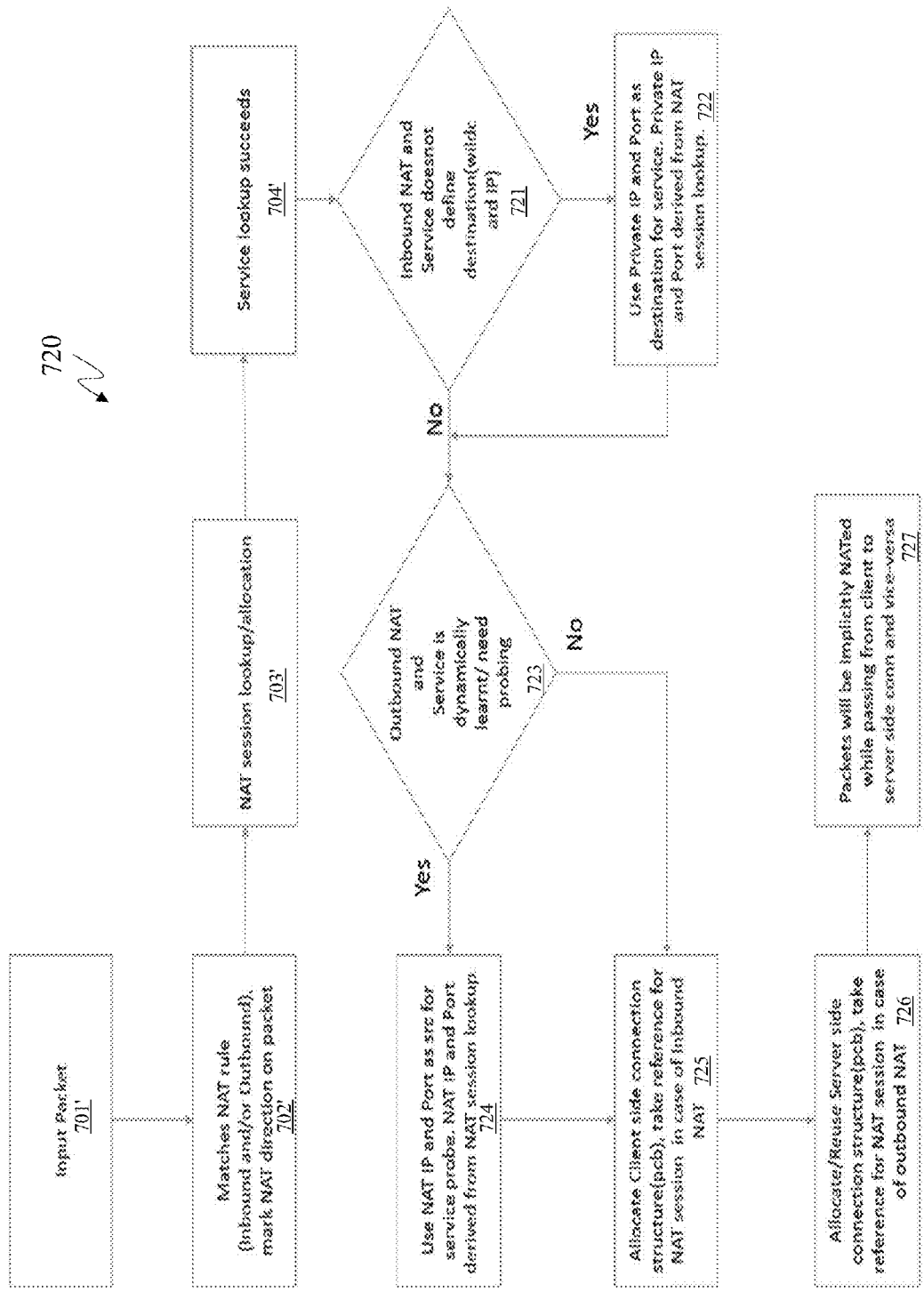
FIG. 7B is a flow diagram of an embodiment of a method for service handling with carrier-grade NAT.

Referring now to FIG. 7B, a flow diagram of an embodiment of a method for service handling with carrier-grade NAT is described. In brief overview, the method 720 includes a device receiving an input packet (step 701'), the device matching the input packet with a NAT rule (step 702'), and the device performing NAT session lookup and allocation (step 703'). The method may further include the device may successfully perform a service lookup (step 704'), the device determining for inbound NAT, whether the service defines a destination (step 721), and the device using private IP address and port as destination for service (step 722). The method may further include the device determining, for outbound NAT, whether the service dynamically learns the destination or needs probing (step 723), the device probing the service destination using NAT IP address and port as source (step 724), and the device allocating client-side connection structure (step 725). The method may further include the device allocating or reusing server-side connection structure (step 726), and the device outputting the packet that has implicitly be translated (step 727).

At step 701', a device may receive an input packet, similar to step 701 described in relation to FIG. 7A. The device may be an appliance 200, and an intermediary device. The input packet may be inbound, outbound, or hairpinned. The input packet may comprise packet parameters.

At step 702', the device may match the input packet to a NAT rule, similar to step 702 described in relation to FIG. 7A. The NAT rule may specify inbound and/or outbound traffic. A NAT rule may be matched to an input packet, and the NAT direction may be marked on the packet. NAT direction may be inbound and/or outbound. NAT direction may be a translation direction.

At step 703', the device may perform NAT session lookup and allocation, similar to step 703 described in relation to FIG. 7A. NAT session lookup may be performed using a lookup table. If a NAT session is not found, a new NAT session may be allocated.

At step 704', the device may successfully perform a service lookup, similar to step 704 described in relation to FIG. 7A. One or more services may be found associated with the NAT session by a link.

At step 721, the device may determine whether, for an inbound NAT, the service does not define a destination. This step may be performed for inbound and hairpinned traffic. This step may be performed based on marked NAT direction in step 702'. This step may be skipped for outbound NAT and the method may continue to step 723. Inbound NAT and service may not define a destination if, for instance, a wildcard IP address is used. For instance, a service may specify an inbound destination IP address with a wildcard or a mask. If a destination is defined, the method continues to step 723. Otherwise, the method continues to step 722.

At step 722, if the device determines that the inbound NAT service does not define a destination, the device may use the private IP address and port as the destination for the service. The device may derive the private IP address and port from a NAT session lookup. In some implementations, the NAT session lookup may be similar to NAT translation as described in relation to step 705 of FIG. 7A. The method may then continue to step 723.

At step 723, the device may determine whether, for an outbound NAT, the service dynamically learns the destination or needs probing. This step may be performed for outbound and hairpinned traffic. This step may be performed based on marked NAT direction in step 702'. This step may be skipped for outbound NAT and the method may continue to step 726. Outbound NAT and/or the service may specify a destination that be dynamically translated to an address that may be routable by the external network, e.g. the internet, or the internal network and the appliance for hairpinned traffic. The outbound NAT and/or the service may specify the destination using an internal IP address which may be dynamically translated using IP addresses from a pool of global addresses. The device may periodically prove the dynamically learned outbound destinations to determine whether the flow, i.e. the connection, is still active and needs to be maintained. The device may store each dynamically translated address with a timer or a timestamp that may be referenced or updated to determine whether the connection needs to be probed. If the service dynamically learns the destination or needs probing, the method continues to step 724. Otherwise, the method continues to step 725.

At step 724, the device may probe the destination of the service using the NAT IP address and port as source address. In some implementations, NAT IP address and port may be derived from the header of the input packet. In some implementations, NAT IP address and port may be derived from NAT session lookup in step 703'. In some instances, the NAP IP address and the port may be used to dynamically learn a destination address. In other instances, the NAT IP address and NAT port may be probed to determine whether the flow is still active. In yet other instance, the NAT IP address and port may be used to determine a destination address that may be probed. Probing may include pinging or otherwise sending a packet to the destination address or the NAT IP address and NAT port to determine whether a connection is still alive or active. The result of the probing may be used to update a timer or a timestamp that determines whether the a service destination needs to be probed.

At step 725, the device may allocate a client-side connection structure for inbound NAT. In some implementations, the client-side connection structure may be a client-side protocol control block (PCB). A PCB may store full TCP state, application layer state, information on a socket connection, and any other state associated with the network layers and/or the flow. For inbound traffic, the PCB may store destination private IP address and port. For hairpinned traffic, the PCB may store a combination of translated and destination IP addresses and ports. In some implementations, for inbound NAT, the device may take a reference for the NAT session. The reference may be used to create a link between the PCB and the NAT session. Taking the reference may also increment a reference count associated with the client-side PCB.

At step 726, the device may allocate or reuse a server-side connection structure for outbound NAT. In some implementations, the server-side connection structure may be a server-side PCB. For outbound traffic, the server-side PCB may store translated IP address and port. For hairpinned traffic, the PCB may store a combination of translated and destination IP addresses and ports. In some implementations, for outbound NAT, the device may take a reference for the NAT session. The reference may be used to create a link between the PCB and the NAT session and increment a reference count associated with the PCB. The device may allocate a new PCB if the destination is dynamically learned or the probe failed in step 723. Otherwise, the device may be reuse a PCB if the probe was successful in step 724. In other implementations, a policy may specify reusing server-side connections.

At step 727, the device may output the packet. The address of the packet will have been implicitly translated by the steps described in this method. The packet may be passing from client to server side connection and vice versa. The packet may also be hairpinned.

H. Systems and Methods for Carrier-Grade NAT Session Management on a Multi-Core System Embodiments of the present disclosure describe systems and methods for providing scalable and efficient carrier-grade NAT session management on multi-core systems. In some embodiments, the systems and methods for NAT session management may be memory efficient on multi-core systems at a carrier-grade scale.

A device intermediary between a plurality of clients and a plurality of servers may allocate a single session structure for each flow that can be used in both outbound and inbound direction. The device may use hash tables for efficient lookups of sessions. The device may insert the single session structure into two hash tables. The device may insert the single session structure into a first hash table with a first key that is a hash of outbound parameters. Examples of outbound parameters may include subscriber IP, subscriber port, destination IP, and destination port. For outbound traffic, the subscriber may refer to a client device that sends the packet. The device may also insert the single session structure into a second hash table with a second key that is a hash of inbound parameters. Examples of inbound parameters may include destination IP, destination port, NAT IP, and NAT port. NAT IP address and NAT port may also be referred to as public IP address and public port, or external IP address and external port. For inbound traffic, NAT IP address and NAT port may be how the destination IP address and destination port may be viewed from a device outside the internal network.

Traffic distribution methods like receive-side scaling (RSS) may distribute outbound and inbound traffic for the same flow on two cores of a multi-core system. In some implementations, both outbound and inbound traffic may be distributed to one core. In instances where two cores are used, both cores may need the same session information for the translations. Since this information may be read-only after a session has been created, a shared session that may be accessed by the two cores may be used. The shared session may be allocated from a shared memory that may be mapped to all the cores of the multi-core system. However, for efficient allocation and accounting, cores may be assigned ownership of memory allocated by them. Each core also allocates required resources, such as NAT IP address and NAT port.

A multi-core device may insert a session structure into a hash table in a memory owned by the respective first core for the current direction. For instance, the device may insert the session structure into a hash table in a memory owned by the core assigned to outbound traffic if the flow is originating from private network. The device may assign a second core for reverse traffic via some calculation, such as load balancing, randomly picking a core, an algorithm, or a set of rules. If the device determines that the second core is the same as the first core, the device may insert a second session key into the hash table in memory owned by the first core for the reverse direction. Otherwise, if the device determines that the second core is different from the first core, the device may insert the session structure into a global hash table for the reverse direction. When the second core receives a packet corresponding to the reverse traffic, the device, or in some embodiments, the second core may perform a lookup in the global hash table and insert the session structure into a hash table in a memory owned by the second core for the reverse direction. All lookups and insertions of the global hash table need synchronization, which may be performed using locks.

In some embodiments, NAT may support bindings among subscriber IP address and subscriber port with translated IP address and translated port to allow features like full-cone NAT, also referred to as one-to-one NAT. Optionally, the device may configure bindings to be created by mapping and filtering behaviors. Mapping and filtering behaviors may be endpoint independent, address dependent, or address and port dependent. If mapping and filtering behaviors are endpoint independent, for instance, the device may use a two-tuple for a mapping lookup. If the mapping and filtering behaviors are address and port dependent, the device may use a three-tuple for a mapping lookup. If mapping and filtering behaviors are address dependent, the device may use a one-tuple for address lookup.

The device may reuse the same session structure for the two-tuple and three-tuple bindings by inserting the structure into additional mapping/filtering hash table as required. The device may mark the sessions which may be inserted into these additional mapping/filtering hash tables as owners of the bindings. Other sessions using the same binding information increment a reference count of the entries in the hash table. New sessions may use existing bindings partially or entirely as available in the hash table. The device may change a NAT type for a traffic using configuration which may immediately be applied for new sessions.

The device may use a stage-based algorithm for creating session, mapping and filtering for a flow. During a lookup stage, the device finds a highest match first. A highest match may be defined in the order of a session match, and then a mapping (outbound traffic) match or a filtering (inbound traffic) match. Depending on lookup stage results, the device may acquire new resources during a creation stage. New resources may include memory and port.

For outbound flows, the device, at the insertion stage, may first optionally insert a mapping into a respective mapping hash table, then insert the session structure into a respective session hash table. For inbound flows, the device, at the insertion stage, may first insert a filtering into a respective filtering hash table, then insert the session structure into the respective session hash table. In some implementations, the device may associate each core with an inbound session hash table and an outbound session hash table. Each of the hash tables may reside in a memory location owned by the respective core.

The device may perform three tasks at each insertion stage, namely, insert into hash table, call a next stage, and handle return codes from subsequent stages. While handling return codes, the device may undo the changes done during the insertion task or simply return back the codes to be handled elsewhere.

Figure 8A:
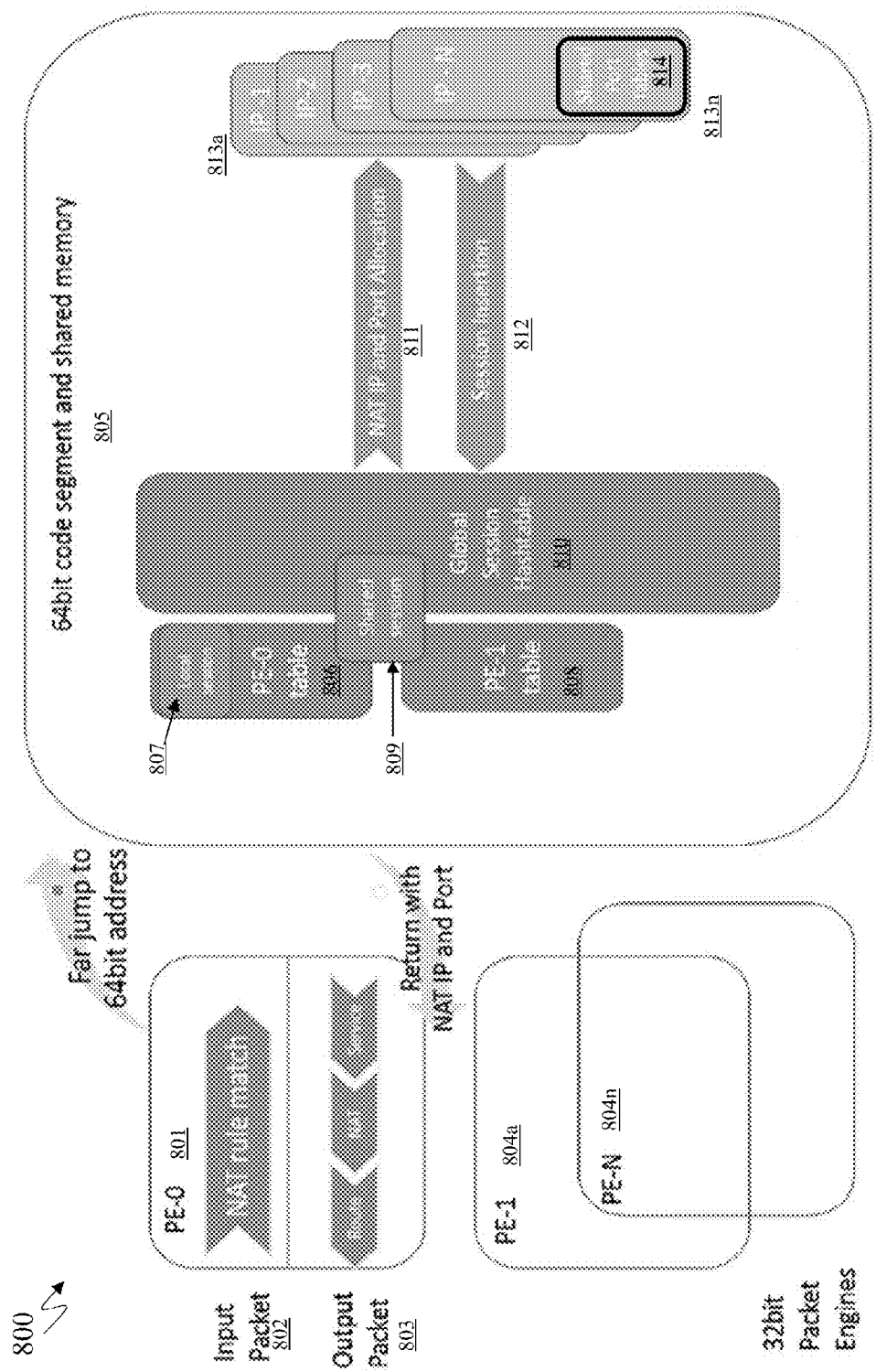
FIG. 8A is a block diagram of an embodiment of a system for scalable and efficient carrier-grade NAT session management on a multi-core system.

FIG. 8A is a block diagram of an embodiment of a system 800 for scalable and efficient carrier-grade NAT session management on a multi-core system. The system 800 may be implemented on one or more appliances 200 as described previously. The system 800 system 800 comprises a plurality of packet engines, comprising a first packet engine 801 and one or more additional packet engines 804a-n. The system 800 may further comprise shared memory 805. The shared memory 805 may comprise one or more tables 806-810 and one or more IP addresses 813a-n selected from a pool of IP addresses, each IP address comprising a shared port table.

The plurality of packet engines may be similar to packet engines 240 described previously. In some implementations, the plurality of packet engines may be 32-bit packet engines. The plurality of packet engines may be configured to access code segments and shared memory 805. The one or more additional packet engines 804a-n may be configured to one or more cores of a multi-core system.

The first packet engine 801 may comprise an input module 802 that may receive input packets. The input module 802 may access, send, write into shared memory 805. In some implementations, the input module 802 may far jump into shared memory 805. The first packet engine 801 may further comprise an output module 803 that may output packets. The output module 803 may read from and access shared memory 805. The output module 803 may return with a NAT IP address and port. The output module 803 may use the returned NAT IP address and port for service handling, translate address, and to route the packet as described in relation to FIGS. 7A-B.

The shared memory 805 may comprise a plurality of packet engine tables 806, 808, a shared session structure 809, and a global session hash table 810. Shared memory may further comprise one or more IP addresses 813a-n.

The shared session structure 809, comprising packet parameters and other session information, may be shared among a plurality of tables, such as packet engine tables 806, 808 and the global session hash table 810. Each packet engine table 806 may comprise a local session 807, which may be a local copy of the shared session structure 809. Each packet engine table 806 may be owned by a particular packet engine such as packet engines 801 and 804a-n. The shared session structure 809 or a copy of the structure may be stored in the global session hash table 810. In some implementations, the mapping/filtering lookup may use the global shared hash table 810. One or more of the tables 806, 808, 810 may access one or more IP addresses 813a-n. The information from the IP addresses 813a-n may be used to create the shared session structure 809 and insert the session 812 into the one or more tables 806, 808, 810. Each of the IP addresses 813a-n or each of the ports in shared port tables 814 may correspond to a flow or a binding.

Figure 8B:
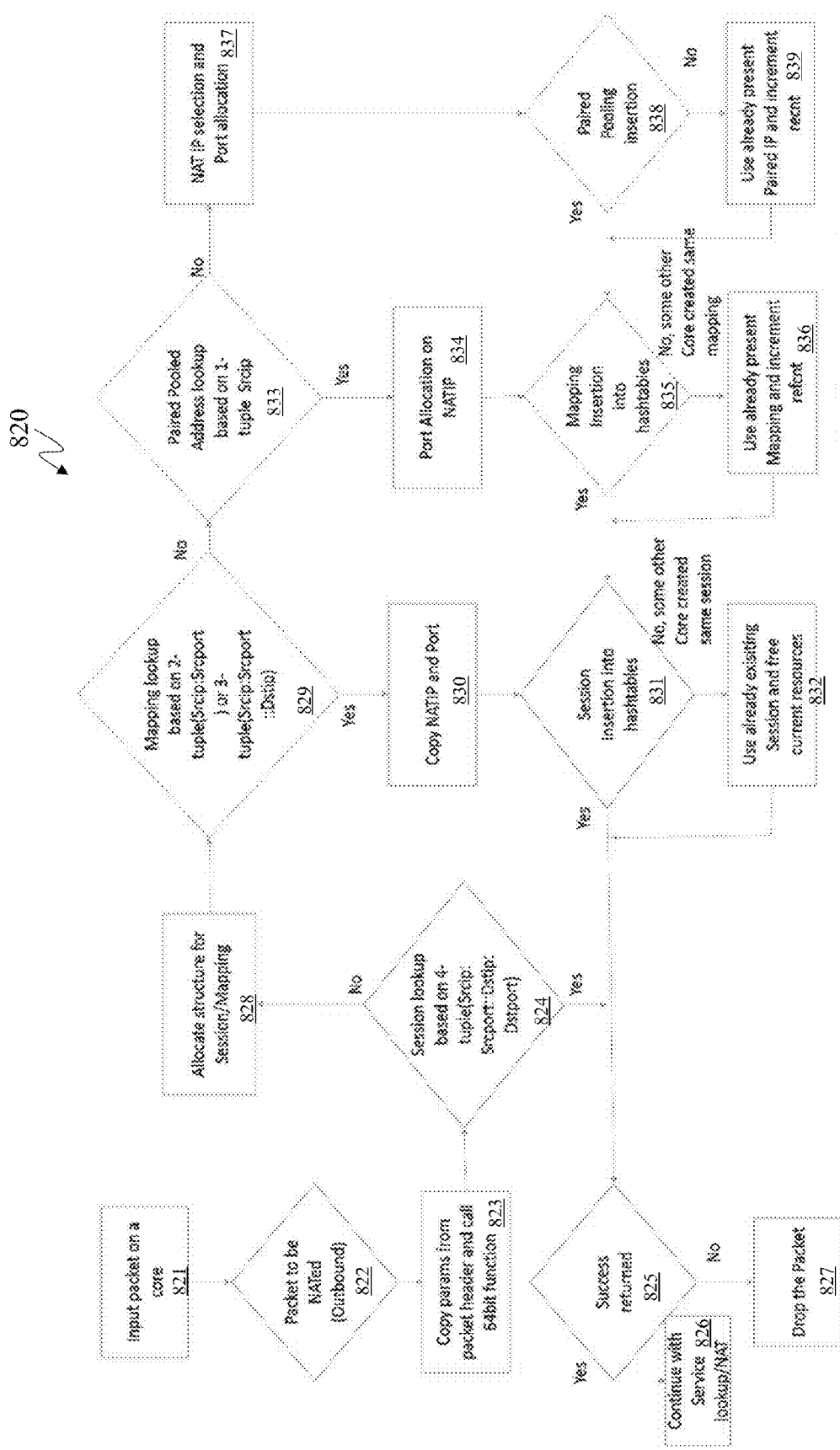
FIG. 8B is a flow diagram of an embodiment of a method for outbound flow and allocation on a multi-core system.

FIG. 8B is a flow diagram of an embodiment of a method for outbound flow and allocation on a multi-core system. In brief overview, the method 820 includes a core receiving an input packet (step 821), the core determining that the packet is to be translated (step 822), the core copying parameters from packet header (step 823), and the core performing a session lookup based on a four-tuple (step 824). The method may further include the core determining that a success was returned (step 825), the core continuing with service lookup and NAT (step 826), the core dropping the packet (step 827), and the core allocating structure for session and mapping (step 828). The method may further include the core optionally performing a mapping lookup based on a two-tuple or a three-tuple (step 829), the core copying NAT IP address and NAT port (step 830), the core inserting a session structure into hash table (step 831), and the core using already existing session and freeing current resources (step 832), The method may further include the core optionally performing a paired-pooled address lookup based on a one-tuple source IP address (step 833), the core allocating port on NAT IP address (step 834), the core optionally mapping insertion into mapping hash table (step 835), and the core using already-present mapping and incrementing a corresponding reference count (step 836). The method may further include the core selecting NAT IP address and allocating port (step 837), the core optionally inserting paired pooling (step 838), and the core using already-present paired IP address and incrementing a corresponding reference count (step 839).

At step 821, a core of a multi-core device may receive an input packet. The packet may be an inbound or outbound. The core may be configured to execute a packet engine 801 as described in relation to FIG. 8A. In some implementations, the receiving core may forward the input packet to a first core executing one of additional packet engines 804 as described in relation to FIG. 8A.

At step 822, the first core determines that the packet is to be translated. In some implementations, the packet may be determined to be outbound. The first core may determine that the source address of the packet may be translated. In some implementations, the core may use the source IP address to determine that the packet may be outbound. In some implementations, the first core determines that the packet may be inbound and that the destination address may be translated.

At step 823, the first core may copy parameters from the packet header. The packet header may include source IP, source port, destination IP, and destination port. The parameters may be copied to a temporary memory or to a shared memory. In some implementations, the first core may make a call to a shared-memory function. In some implementations, the shared-memory function may be a 64-bit function. The shared-memory function may have access to shared-memory tables.

At step 824, the first core may perform a session lookup based on a four-tuple. The four-tuple may comprise the source IP, source port, destination IP, and destination port. The four-tuple may be hashed to produce a key value that the core may use to lookup into a session hash table. The session hash table may be the global hash table stored in shared memory. In some implementations, the first core may perform a session lookup using local hash table owned by a first core. Session lookup is described further in relation to FIG. 8C.

At step 825, the core may determine whether a success was returned. A success may be returned from a session lookup at step 824, session insertion into a hash table at step 831, or an already-existing session at step 832. If a success was returned, the global hash table will include a session structure which was inserted at step 831 or inserted previously by processing another packet.

At step 826, if the core determines that a success was returned at step 825, the core performs service lookup and NAT. Service lookup and NAT may be performed as described in relation to FIGS. 7A-B.

At step 827, if the core determines that a success was not returned at step 825, the core drops the packet. The destination address of the dropped packet may be unable to be translated to an external address that may be routable by an external network, e.g. the internet.

At step 828, if the core was unable to find a session in a corresponding hash table during the session lookup at step 824, the core allocates a structure for the session associated with the packet. The session structure may include source IP, source port, destination IP, destination port, and other session information. In some implementations, the core can also allocate a structure for mapping or filtering. The mapping structure may be allocated for outbound packets. The filtering structure may be allocated for inbound packets. The allocating may be performed in a shared memory that may be accessible by every core of the multi-core system.

At step 829, the core may optionally perform a mapping lookup based on two-tuple or three-tuple. In some implementations, for inbound traffic, the core may perform a filtering lookup based on two-tuple or three-tuple. The lookup may be performed on a global hash table in shared memory. The two or three-tuple may be dependent of the mapping or filtering behavior. The two-tuple may include source IP address and source port. The three-tuple may be source IP, source port, and destination IP. The two-tuple may be used for endpoint independent mapping or filtering behavior. The three-tuple may be used for address and port dependent mapping or filtering behavior. The different mapping and filtering behavior may be configured to specify a NAT type, such as full-cone NAT, address-restricted-cone NAT, port-restricted cone NAT, and symmetric NAT.

At step 830, if the core successfully finds an entry mapping lookup at step 829 successfully finds an entry in the global hash table, the method includes the core copying NAT IP address and NAT port, which may be the external IP address and port of the source address. The NAT IP address and port may be copied from the mapping entry in the global hash table that was looked up in step 829.

At step 831, the core may insert a session structure into the global hash table. In some implementations, the session structure may be inserted into a local hash table, stored in shared memory and owned by the first core processing the input packet. The session structure may include source IP, source port, destination IP address and destination port. In some implementations, the destination IP address and destination port may be the NAT IP address and NAT port copied in step 830. The session structure may have been allocated in step 828. If the session structure is successfully inserted into the hash table, the method may continue to step 825. Otherwise, the session structure cannot be inserted into the global hash table due to another core already allocating a session structure and inserting it into the global hash table. If the session structure cannot be inserted, the method continues to step 832. Session insertion is described in further detail in relation to FIG. 8C.

At step 832, the core may use an already-existing session structure. The already-existing session structure may be stored in the global hash table. Current resources that were allocated for session in step 828 may be freed. The method then continues to step 825.

At step 833, the method optionally includes the core performing a paired-pooled address lookup based on a one-tuple source IP. In some implementations, the one-tuple of source IP address may be used for address dependent mapping/filtering behavior. In some implementations, the one-tuple of source IP address may be used for paired-address-pooling, where a local or internal address may be consistently mapped to a single global address. The one-tuple may be used to generate a hash key that may be used to lookup on a global paired-address-pooling hash table. If the lookup is successful, the method continues to step 834. Otherwise, the method continues to step 837.

At step 834, the core may allocate a port on NAT IP. Each NAT IP address may be part of a pool of IP addresses that may be assigned to be mapped to internal addresses. Each NAT IP address may include a list of ports that may be currently used. Each port in the list of ports may also include session information of the session associated with the respective port. Allocating a port on a NAT IP address may include finding a port number for the NAT IP address that is not currently used. In some implementations, the port number corresponds to a default port number for the packet type. In some implementations, the port number may be set to a port number of the source device for outbound packets.

At step 835, the method may optionally include the core inserting the mapping into global mapping hash table. In some implementations, for inbound packets, insertions may be made into global filtering hash table. The structure for insertion may be allocated in step 828. The mapping or filtering structure may include two-tuple or a three-tuple as described in relation to step 829. If the mapping or filtering insertion is successful, the method continues to session insertion into hash table in step 831. If the mapping or filtering insertion fails, another core has already created the same mapping or filtering and the method continues to step 836.

At step 836, the core may use an already-present mapping in the global mapping hash table. A reference count associated with the mapping may be incremented by one. In some implementations, for inbound packets, an already-present filtering in the global filtering hash table may be used, and a reference count associated with the filtering may be incremented by one. The method then continues to step 831.

At step 837, the core may select a NAT IP address and allocate a port. In some implementations without mapping or paired-address-pooling, NAT IP address selection and port allocation may occur after step 828. For some implementations with mapping but no paired pooling, the NAT IP address selection and port allocation may occur after step 829. For some implementations with paired address pooling, NAT IP address selection and port allocation may occur after step 833. NAT IP address may be selected from a pool of unused IP addresses. Each IP address in the pool may be used as an external IP address that may be mapped to an internal address. For instance, a device internal to a network with NAT may have a network address of 10.0.0.1. The internal device may be mapped to an external IP address selected from the pool of 123.124.125.126. Once the IP address is selected, the IP address may be removed from the pool. The IP address may be returned to the pool when the NAT session ends. Port may be allocated for the selected IP address as described in relation to step 834.

At step 838, the method optionally includes the core inserting paired pooling. A key for a global paired IP address hash table may be generated from a one-tuple of source IP. If the one-tuple is successfully inserted, the method may continue to mapping insertion at step 835 for NAT types with mapping configured, or to session insertion at step 831. If the one-tuple cannot be inserted due to, e.g. hash collision, the method may continue to step 839.

At step 839, the core may use an already-present paired IP. The paired IP address may already be present in the global paired IP address hash table. A reference count associated with the already-present paired IP address in the hash table may be incremented. The method may then continue to either session insertion in step 831 or mapping insertion in step 831, depending on the NAT type.

Figure 8C:
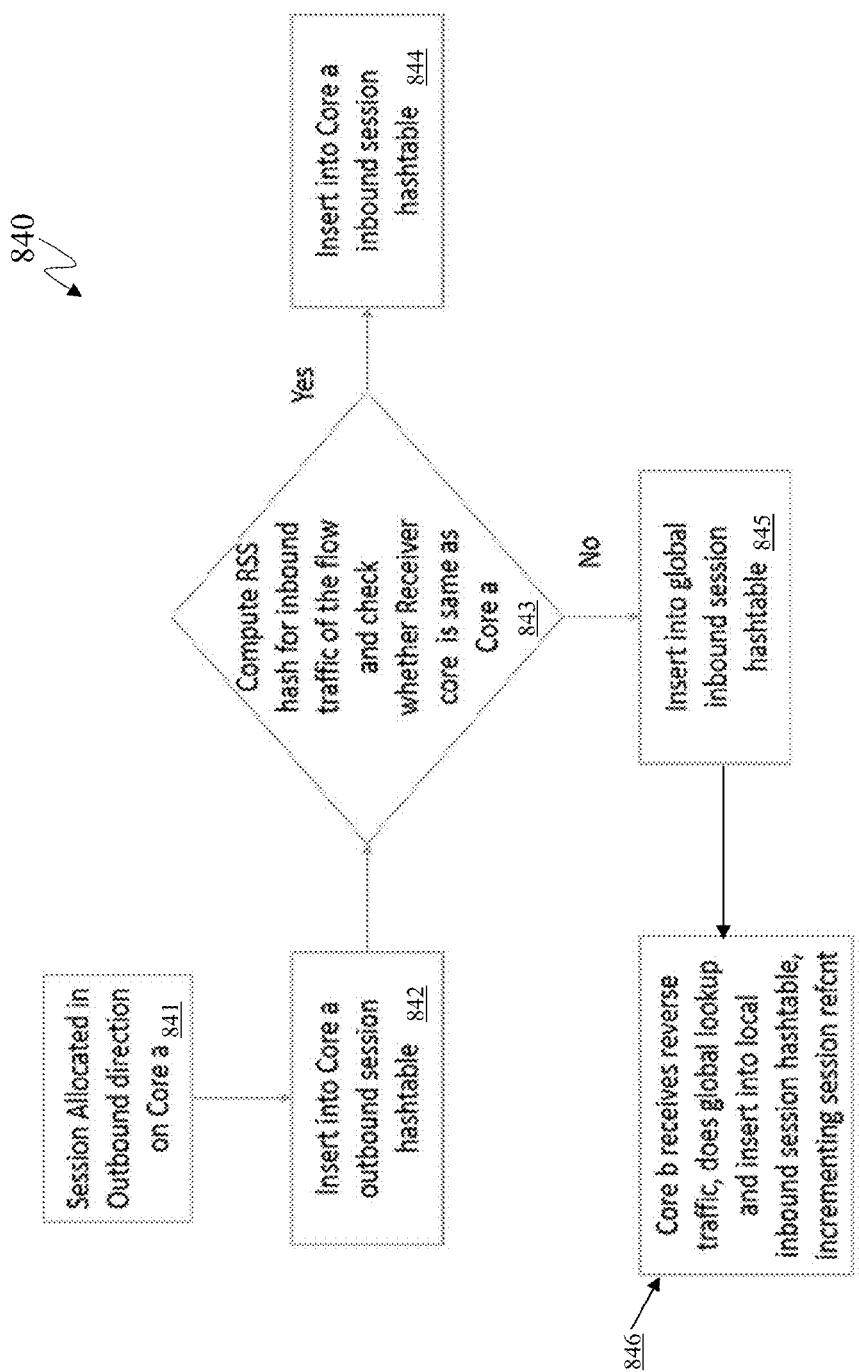
FIG. 8C is a flow diagram of an embodiment of a method for session lookup and hash table details on a multi-core system.

FIG. 8C is a flow diagram of an embodiment of a method for session lookup and hash table details on a multi-core system. The method 840 may be a method for maintaining NAT session management on a multi-core system. In brief overview, the method 840 includes a first core allocating session structure in outbound direction (step 841), the first core inserting the session structure into the first hash table owned the first core (step 842), and the first core computing RSS hash for reverse traffic of the flow and checking whether the receiver core is the same as the first core (step 843). The method may further include the first core inserting the session into a session hash table (step 844), and the first core inserting into global hash table (step 845). The method 840 may further include a second core receiving a reverse traffic, the second core performing a lookup on the global hash table, and the second core inserting the session into a second hash table owned by the second core, and the second core incrementing a session reference count associated with the hash table entry in the global hash table (step 846).

At step 841, a first core may allocate a session structure in outbound direction. The session may not have been allocated for inbound direction previously. In some instances, a session is allocated in inbound direction on the first core before allocating the session in outbound direction. In some implementations, the allocation may occur in step 828 of FIG. 8B.

At step 842, the first core may insert the session structure that was allocated in step 841 into the outbound session hash table of the first core. In some implementations, the first core of a multi-core device intermediary between a plurality of clients and a plurality of servers may perform the insertion. In some implementations, the multi-core device may be intermediary between an internal network and an external network. In some implementations, the session may be established between a client of the plurality of clients and a server of the plurality of servers. The session may be a NAT session. In some implementations, the first core may use one local session hash table for both inbound and outbound sessions. In some instances, where the session was allocated in inbound direction at the first core at step 841, the session may be inserted into inbound session hash table.

At step 843, the method includes the first core computing RSS hash for reverse traffic and checking whether a receiver core is the same as the first core. In some instances, the RSS hash may be a Toeplitz hash and/or a preference list or a distribution table may be used. In some instances where the session was allocated in outbound direction on the first core, the reverse traffic may be inbound direction. In other instances where the session was allocated in inbound direction on the first core, the reverse traffic may be outbound direction. In some implementations, the first core may determine that a second core of the multi-core device will serve as a receiving core for a response to the request from the server to the client. The response may be any traffic that is reverse direction of the session allocated on the first core at step 841. In some instances, the first core may determine that the receiving core is the first core, and that the first core will serve as a receiving core for a response to the request from the server to the client.

At step 844, if the first core determines that the receiving core is the same as the first core, the first core inserts the session into an inbound session hash table that is local to the first core. In some implementations, the inbound session hash table is same as the outbound session hash table. In some implementations, the session insertion may occur as part of step 831 in FIG. 8B.

At step 845, if the first core is a different core than the receiving core as determined in step 843, the first core inserts the session into a global inbound session hash table. In some implementations, the global inbound session hash table may be the same as the global outbound session hash table. The NAT session may be inserted by the first core into a global session table responsive to determining that the second core will serve as the receiving core. In some implementations, the session insertion may occur as part of step 831 in FIG. 8B.

At step 846, after the first core inserts the session in the global session table, the second core may receive a reverse traffic. The second core may identify that the NAT session is not included in a local hash table store in a memory of the second core. The local hash table may be a local inbound session hash table, or a local outbound session hash table, depending on the reverse direction of the session allocated on the first core in step 841. The NAT session may be identified in the global session table, and the second core may insert the session in the local session hash table stored on the memory of the second core. In some implementations, the local session hash table may be a table that is for a reverse direction of the session allocated in step 841.

Figure 8D:
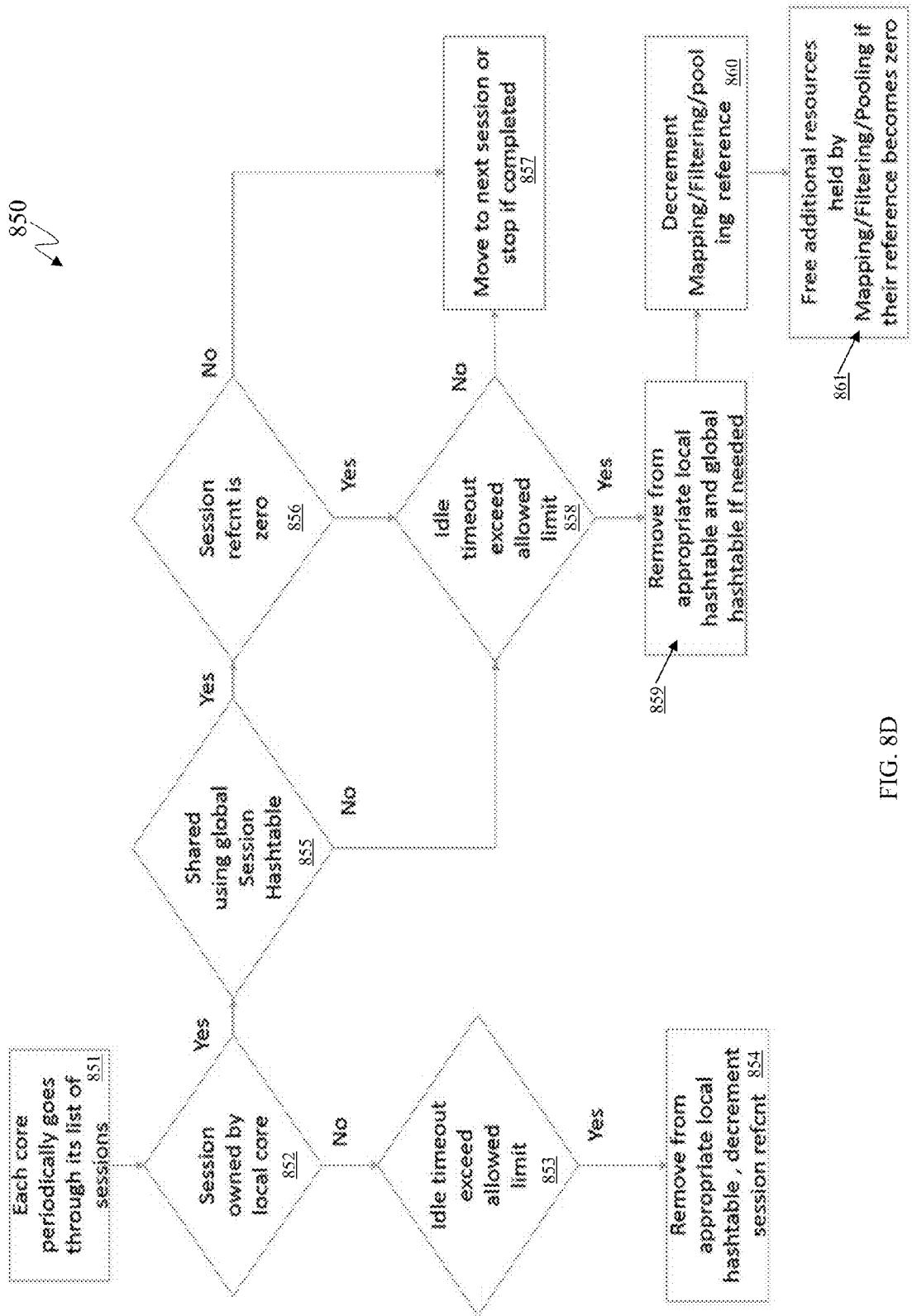
FIG. 8D is a flow diagram of an embodiment of a method for session, mapping, filtering, and pooling deallocation on a multi-core system.

FIG. 8D is a flow diagram of an embodiment of a method for session, mapping, filtering, and pooling deallocation on a multi-core system. In brief overview, the method 850 includes each core periodically going through a respective list of sessions (step 851), a core determining whether it owns a session (step 852), the core determining whether idle timeout exceeded allowed time limit (step 853), and the core removing the session from appropriate local hash table (step 854). The method may further include the core determining whether the session is shared using global session hash table (step 855), the core determining whether the session reference count is zero (step 856), and the core moving to next session or stopping if completed (step 857). The method may further include the core determining whether idle timeout exceeds allowed time limit (step 858), the core removing session from appropriate local hash table and global hash table if needed (step 859), the core optionally decrementing mapping/filtering/pooling reference counts (step 860), and the core optionally freeing additional resources held by mapping/filtering/pooling if the references becomes zero (step 861).

At step 851, each core of the multi-core system may periodically go through a respective list of sessions. Each core may store in, local memory or global memory, a list of sessions. Each core may go through the list periodically, where the periodicity may be preconfigured. Periodicity may be measured by seconds, such as between one to three hundred seconds. Periodicity may be measured by clock cycles or other measurements known in the art. In some implementations, a first core may iterate through a list of sessions.

At step 852, the method may include a core determining whether the core owns a session in the respective list of sessions. The core may be each of the cores from step 851 and may also be referred to as a local core that is iterating through the respective list of sessions. The determination may include determining whether the first core allocated the session in step 841 of FIG. 8C. In some implementations, the first core may identify an existing NAT session owned by the first core.

At step 853, if the local core does not own the session, then the core may determine whether idle timeout exceeds allowed time limits. The session may store a timestamp that corresponds to a time in which the session was last used. The idle timeout may be calculated by current time and the timestamp stored with the session. The idle timeout may be refreshed when a core uses or looks up the session, such as in step 824 in FIG. 8B, or when the session is inserted as in step 831 of FIG. 8B. In some implementations, a session may store an idle counter that stores the length of time the session has been idle or not been used. The idle counter of each session may be incremented each cycle or second or each period of time as described in relation to step 851. The idle counter may be reset when the a core uses or looks up the session, such as in step 824 in FIG. 8B. If the idle timeout or the idle counter exceed a predefined limit, the method may continue to step 854. In some implementations, the predefined limit may be between one second to one day. The predefined limit may be defined by number of cycles and other measurements known in the art. If the idle timeout or the idle counter does not exceed the predefined limit, the method may terminate.

At step 854, if idle timeout exceeds allowed limits at step 853, then the local core removes the session from appropriate local hash table that is owned by the local core that is not the owner of the session. In some implementations, the existing NAT session may be determined to be no longer being used by the local core. After the session is removed from the local hash table, a reference count of the session may be decremented. The reference count may be stored with the session structure in shared memory or with a global hash table entry of the session. The reference count may have been incremented in step 846 of FIG. 8C. The reference count may be non-negative integer number, i.e. zero, one, two, etc. If the reference count is decremented to negative one, it may be reset to zero.

At step 855, if the session is determined to be owned by the local core in step 852, the method includes the core determining whether the session is shared using global session hash table. In some implementations, an existing NAT session is determined to be shared using the global session table if the global session table includes the NAT session. The NAT session may have been inserted into global session table in step 845 of FIG. 8C.

At step 856, if the session is shared using global session hash table in step 855, then the method may include the core determining whether the session reference count is zero. This step may be equivalent to determining that the existing NAT session is no longer being used by any of the cores in the multi-core system. In some implementations, a session reference count may be stored within the session structure. In some implementations, a session reference count may be stored with each entry in the global session hash table. The reference count may be incremented in step 846 of FIG. 8C. The reference count may be decremented in step 854. If the reference count equals zero, then the method may continue to step 858. Otherwise, the method may continue to step 857.

At step 857, the method includes the core moving to a next session of the session list of the local core, or stopping if all sessions in the session list has been checked for the current time. In some implementations, moving to the next session includes going back to step 852 for the next session in the list. In some implementations, stopping may include a process on a first core sleeping until the next period of time. The period of time may be defined by the predefined periodicity, as defined in step 851. In some implementations, stopping may include a process executing the method 850 terminating. In some implementations, before the process terminates, a new process may be queued to start in next period of time.

At step 858, the method may include the core determining whether idle timeout exceeds allowed time limit. This step may be similar to step 853 as described above. The method may arrive at this from step 855 or step 856. If the method arrives at this step from step 855, then the session is not shared using global session hash table. If the method arrives at this step from step 856, then the session reference count is zero. If idle timeout does exceed allowed limit, method may continue to step 859. Otherwise, the method may continue to step 857 which is described above.

At step 859, if the idle timeout does exceed allowed limits, then the core removes the session from appropriate local hash table and global hash table if needed. The local hash table will be located in memory owned by the local core or the first core. In some implementations, this step may comprise removing the existing NAT session from the local outbound session table stored on the memory of the first core. If the session is shared in the global session hash table as determined in 855 but the reference count is zero as determined in step 856, then the session is removed from the global hash table as well. This step may also comprise removing the existing NAT session from a local inbound session table stored on a memory of a core of the multi-core device determined to serve as a receiving core for packets corresponding to the existing NAT session.

At step 860, the method optionally includes the core decrementing mapping/filtering/pooling reference counts. Mapping and filtering reference counts may have been incremented at step 836 of FIG. 8B. Pooling reference count may have been incremented at step 839 of FIG. 8B.

At step 861, the core may free additional resources. The additional resources may be held by mapping, filtering, and/or pooling. The additional resources may be freed if the respective reference is zero. In some implementations, this step occurs only after a reference count has been decremented in step 860.

Figure 8E:
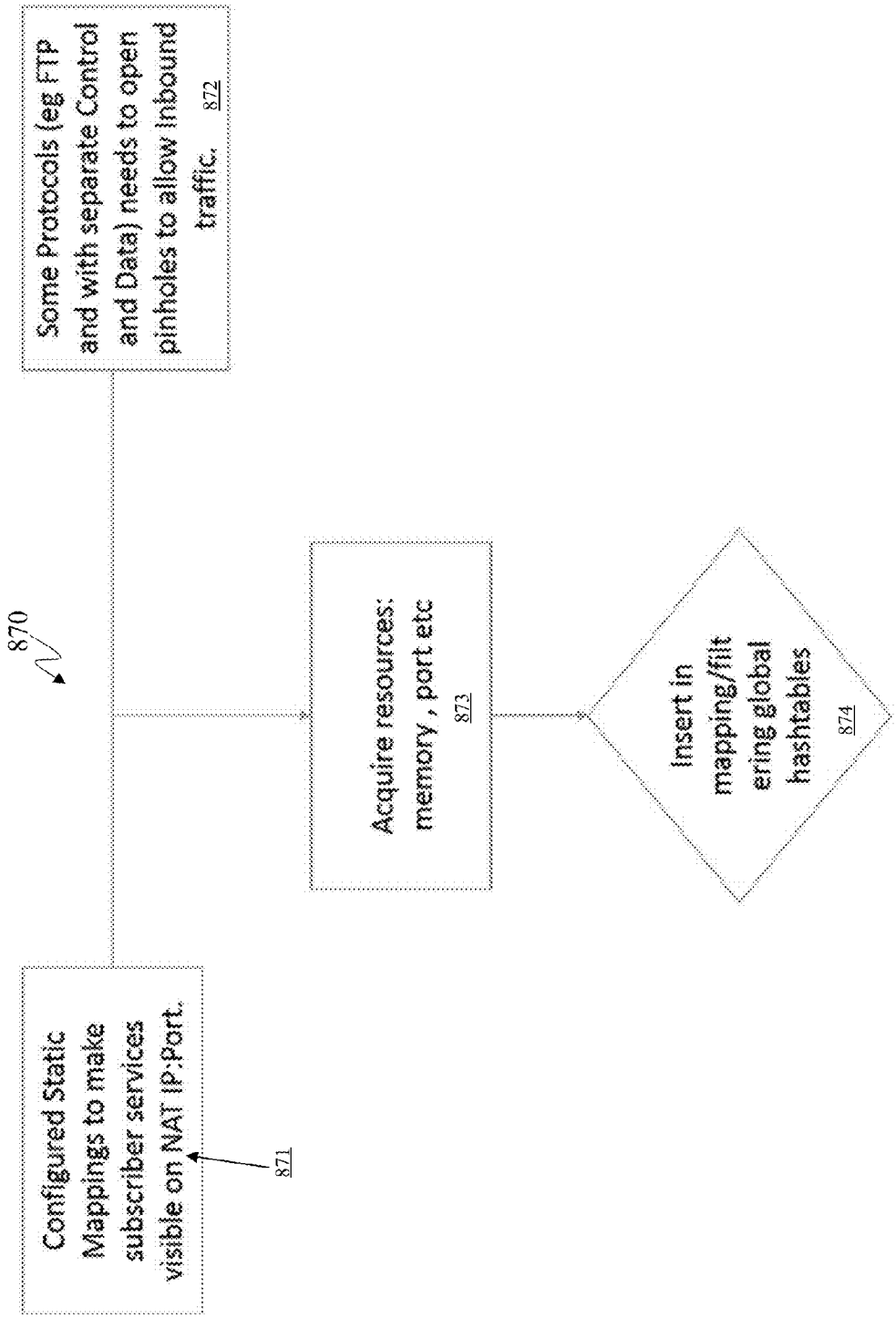
FIG. 8E is a flow diagram of an embodiment of a method of static mapping and filtering on a multi-core system.

FIG. 8E is a flow diagram of an embodiment of a method of static mapping and filtering on a multi-core system. In brief overview, the method 870 may include a core configuring static mappings to make subscriber services visible on NAT IP address and NAT port (step 871), the core optionally opening pinholes to allow inbound traffic (step 872), the core acquiring resources (step 873) and the core determining whether to insert in mapping/filtering global hash table (step 874). Static mapping and filtering may be performed in step 834 of FIG. 8B.

At step 871, the method includes a core configuring static mappings to make subscriber services visible on NAT IP address and NAT port. A static mapping includes a fixed translation of internal addresses to mapped addresses, i.e. NAT IP address and NAT port. Subscriber services refer to services provided by devices in the internal network with internal addresses. Devices external to the NAT system will be able to view the subscriber services via the NAT IP address and NAT port and not the internal address.

At step 872, the core may open pinholes to allow inbound traffic for some protocols. Protocols that require pinholes include some FTP that use separate control and data ports. Pinholes, in terms of NAT, may refer to additional ports and/or address that may be required for external device to communicate with an internal device through the NAT system. For example, the static mapping may not be sufficient due to the FTP requiring two different ports and the static mapping only providing a mapping of one IP/port. Additional mapping between an external address/port and internal address/port may be opened or assigned. In some implementations, the pinhole may be opened in the same way a static mapping is configured as described in step 871. In some implementations, pinhole and/or static mapping may perform similar steps. In some implementations, pinhole and the static mapping may be linked. In some implementations, the address and port for the pinhole may be selected from a pool. In some implementations, the pinhole may use the same NAT IP address as the static mapping but use a different port number.

At step 873, the core may acquire resources. Resources may include memory for mapping and filtering structures, ports, addresses, etc. In some implementations, resources may be acquired as part of steps 828 or 834 of FIG. 8B.

At 874, the core may insert the mapping or filtering in a mapping or filtering global hash table. This step may be similar to step 835 in FIG. 8B. In some implementations, the pinhole may also be added to the mapping or filtering global hash table.

I. Systems and Methods for Port Allocation for Carrier-Grade NAT on a Multi-Core System Embodiments of the present disclosure describe systems and methods for port allocation for carrier-grade NAT on a multi-core system. To provide address translation, carrier-grade NAT allocates ports on IP addresses that are selected from NAT IP address pool. The allocation may be for any port on a given IP address or for a particular, specified port. A single port may be allocated from a range of free ports associated with a IP. In some configurations, a single or multiple blocks of ports may be allocated from the range of free ports. Port allocation may preserve parity and range during translation as required. Port allocation may consider traffic distribution scheme like RSS to ensure that return traffic lands on the same core. Multiple cores may perform port allocation for a single IP address without or with little synchronization for data in the shared memory that can be changed by more than one core. In some implementations, random ports from the range of free ports may be allocated.

A port is allocated using port bitmap tables which keep track of all the free ports for a single IP. Each IP address may include two port bitmap tables. The first port table may be for TCP, and the second port table may be for non-TCP. Each port table may use one of two different schemes of port bitmap. The first scheme may be used with deterministic NAT and block allocation, and the second scheme may be used for non-deterministic NAT or block allocation. In both schemes, a shared bitmap table may be accessed by any core, and each core owns a respective bitmap table.

A deterministic NAT may ensure that a source IP address and port always maps to a same destination IP address and port, eliminating the need for address translation logging. Here, source IP address and port refers to pre-translated IP address and port and destination IP address and port refers to post-translated IP address and port, i.e. NAT IP address and port. Block allocation may refer to allocating a block of ports for translation instead of individual ports. Deterministic NAT and block allocation may be performed by algorithms that use a combination of offsets, multipliers, and/or ceiling, floor, and modulo functions, on the IP address and port.

The first scheme of port bitmap may represent the ports by bits in order. For instance, the first bit represents port number zero, the second bit represents port number one, etc. The first scheme may also be referred to as a basic scheme. In the basic scheme, each core replicates a full port bitmap. A shared port table maintains a bitmap for a chunk of pre-defined number of ports, such as 16 ports, also referred to as chunk size. Each core allocates these chunks from shared port table on need basis and sets the bitmaps corresponding to the predefined number of ports in the local bitmap. Port allocation are done from the chunks in the local bitmap. Once all the ports in a chunk are freed, chunk is returned to the shared bitmap.

The second scheme shuffles the port positions and groups them into slots according to their RSS hash for optimized allocation. Each core may own a core local bitmap that may comprise one or more bits corresponding to ports. The bits in the core local bitmap may be organized into slots. The shared port bitmap table, also referred to as global bitmap, may be partitioned to an owner cores partition and a smaller shared pool partition. Each partition may comprise one or more slots. Each port of the owner cores partition may be owned by one core. Each slot in the owner cores partition may be owned by one core. Each core may own one or more ports and/or slots of the owner cores partition. Ports from the shared pool partition may be allocated to any core on need basis. The shared pool partition may be similar to the basic scheme and may comprise of chunks of predefined number of ports. Because ports may be assigned to different cores or to the global shared partition, the global bitmap may also be referred to as shuffled bitmap.

For the second scheme, memory optimizations may allow each core to allocate enough memory for the bitmap to store the exclusive ports owned by the core from the owner cores partition and any ports owned by the core in the shared pool partition. Without memory optimizations, each core may allocate memory equivalent to the shared bitmap table. Given a port number, the corresponding bit position on the bitmap may be calculated using a reverse lookup, which may account for exclusive partitioning. For ports in which return traffic is assigned on the same core, as described in relation to FIG. 8C, preferential search for a free port may be performed within a same slot.

Range may be preserved by maintaining a separate bitmap for well-known ports. The separate bitmap for well-known ports may be used such that any source port, i.e. the port to be translated, that is within the range of well-known ports will stay within the range after it is translated to destination port. For instance, well-known ports may be ports 0-1023. If the source port is a well-known known port and hence between 0 to 1023, then the separate bitmap for well-known ports may be used, and the translated port will thus also be between 0 to 1023.

Parity may be preserved by masking a port bitmap with a parity filter. For port parity preservation, source ports that are even number are translated to another even-number source port, and odd-numbered source ports are translated to another odd-numbered source port. For instance, port 1024 may be translated to port 1036. For the first scheme, the parity filter may be a simple pattern of alternate bit. For the second scheme, the parity filter may be a pre-computed pattern for the shuffled bitmap, calculated based on the partitions of the shared bitmap table.

Block allocation may be performed by maintaining a bitmap for each block. Port block allocation may refer to allocating a block of ports for translation instead of allocating individual ports. A block may consists of several chunks which may be allocated by individual cores. The block information may be stored in a subscriber structure, i.e. a structure corresponding to a device internal to the NAT system that is the source IP address and port to be translated. The block information can be used for deterministic NAT or multiple block allocations. Port allocation may be randomized by starting a search for a free port from random positions.

Figure 9A:
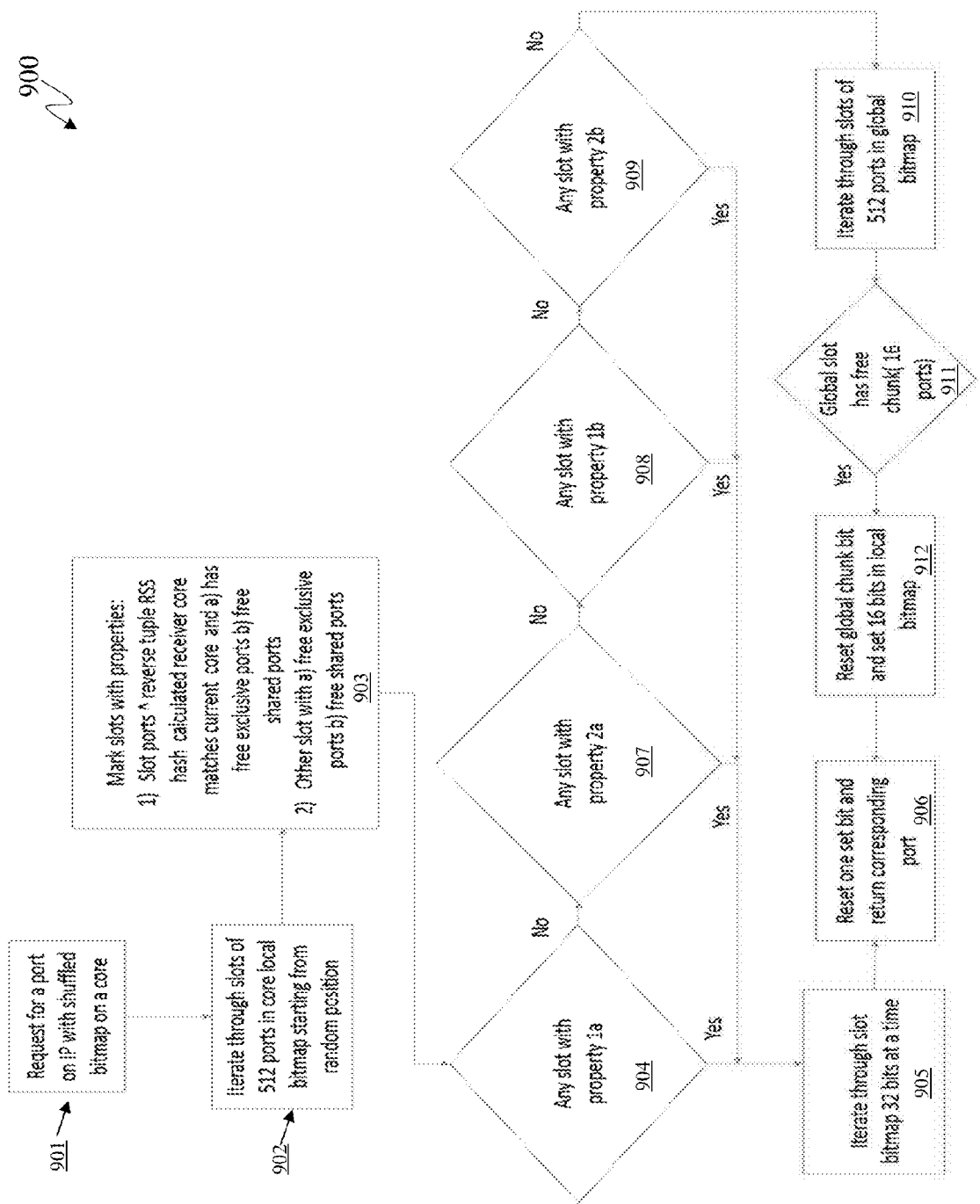
FIG. 9A is a flow diagram of an embodiment of a method for allocating a port from a shuffled bitmap.

FIG. 9A is a flow diagram of an embodiment of a method 900 for allocating a port from a shuffled bitmap. In brief overview, a device, or a core of the device, receives a request for a port on a specified IP address (step 901), iterates through slots of specified number of ports in a core local bitmap, starting from a random position (step 902), and marks slots with properties (step 903). The device checks whether any slots are marked with specific properties (steps 904, 907, 908, and 909). The device iterates through a slot bitmap a specific number of bits at a time (step 905), and resets one set bit and returns the corresponding port (step 906). The device iterates through the slots of a specified number of ports in the global bitmap (step 910), determines whether the global slot has free chunks (step 911), and resets a global chunk bit (step 912).

At step 901, the device receives a request for a port on a specified IP address. The request may be received at a core of a multi-core device. The core may use a shuffled bitmap for port allocation. The shuffled bitmap may be a global port bitmap. The request for port allocation may occur at steps 834 and 837 in FIG. 8B.

At step 902, the core of the device iterates through slots of specified number of ports in a core local bitmap, starting from a random position. A core local bitmap may be a bitmap allocated by and owned by the core that received the request at step 901. In some implementations, each slot may comprise 512 ports. The core local bitmap may comprise one or more slots. In some implementations, a random slot may be selected to start the iteration.

At step 903, the core marks each slot with properties. A first property, property 1a, may indicate whether a slot of the current core has a free exclusive port, or a port that that only the current core may allocate. A second property, property 1b, may indicate whether the current core has a free shared port available for use. A third property, property 2a, may indicate whether another slot, besides the currently marked slot, has a free exclusive port available. A fourth slot, property 2b, may indicate whether another slot has a free shared port available. To determine property 1a and 1b, a RSS hash may be performed on a reverse tuple, i.e. switched destination and source address, to find the receiver core for the reverse traffic. The receiver core may be matched with the current core, and a bitwise operator of the match may be performed with the slot ports. In some implementations, the bitwise operator may be an AND or an XOR operator. In some implementations, to determine property 2a and 2b, similar calculations with the reverse tuple and RSS hash may be performed.

At steps 904, 907, 908, and 909, the core may find any slot with the properties 1a, 1b, 2a, and 2b. In some implementations, the properties may be search in a specific order, and the search may be stopped once a free port is found. The order may be property 1a, 2a, 1b, and 2b. Once the core finds a slot with one of the properties, the method may continue to step 905, where the core finds a port in the core local bitmap. Otherwise, the method may continue to step 910, where the core finds a port in the global bitmap.

At step 905, the core iterates through a slot bitmap a specific number of bits at a time. In some implementation, the specific number may be 32, or any number between 1 and 65536. The specific number of bits may produce semi-random port allocation as different ports may be allocated within a given slot based on when the ports are freed. The slot may be part of the core local bitmap, and may be one of the slots that was iterated through in step 902.

At step 906, the core resets one set bit and returns the corresponding port. The set bit may be part of the core local bitmap. The corresponding port may be calculated from the bit number of the core local bitmap. For instance, a bit of a core local bitmap may be the first bit of the core local bitmap. The first bit may be mapped to 1024$^{th}$ bit of the global bitmap and port number 1024. In other implementations, the bit number of the global bitmap may not equal the port number due to, for instance, well-known ports. Resetting a bit may include changing the value to zero, indicating that the port is not in the pool of available ports that may be allocated. The corresponding port number may be returned.

At step 910, if none of the slots in the local core match any of the four properties in steps 904, 907, 908, and 909, then the core iterates through the slots in the global bitmap. In some implementations, each slot of the global bitmap may include 512 ports. Each slot may comprise one or more chunks, which are a collection of ports. In some implementations, the iteration may start with a random slot of the global bitmap. The iteration continues until a free port is found in one of the slots.

At step 911, for each slot that is iterated through in step 910, the core determines whether the global slot has a free chunk. In some implementations, a chunk may comprise 16 ports. Each chunk may be free or otherwise allocated to a core. A chunk allocated to a core may comprise of ports that may be allocated and freed by the core. Each chunk may be represented by a bit, with a value of zero indicating that the chunk has already been assigned and a value of one indicating that the chunk is free.

At step 912, if the core finds a free chunk, the core resets the global chunk bit and sets a specified number of bits in the local bitmap. The specified number of bits equals the chunk size, i.e. the number ports in a chunk. In some implementations, 16 bits in the local bitmap may be set. The set bits may indicate that the corresponding ports are available to be allocated. The method may further continue to step 906, where one of the 16 bits is reset and the corresponding port number may be returned.

Figure 9B:
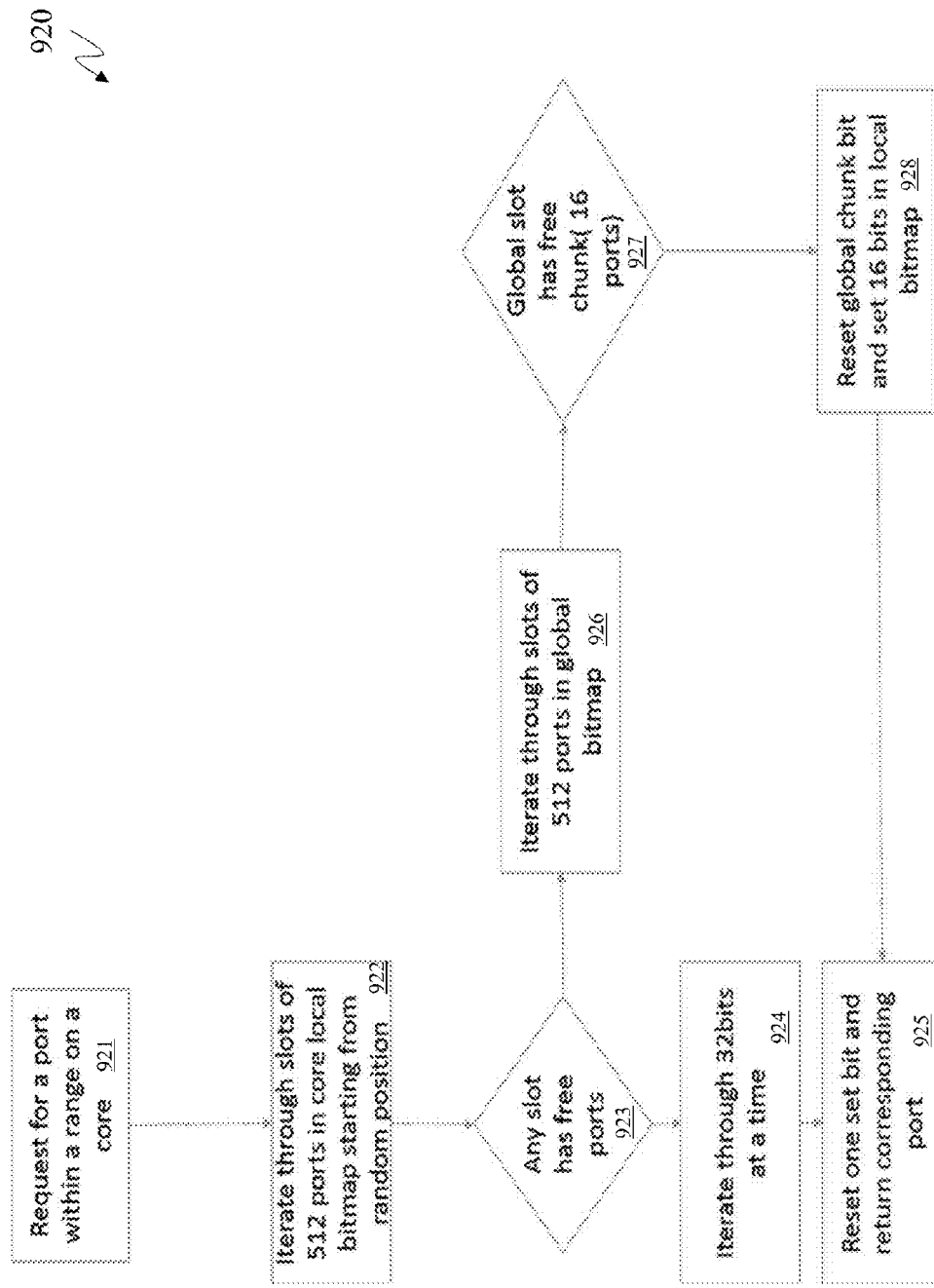
FIG. 9B is a flow diagram of an embodiment of a method for allocating a port within a range using a basic bitmap.

FIG. 9B is a flow diagram of an embodiment of a method for allocating a port within a range using a basic bitmap. In brief overview, a core of a device receives a request for a port within a range on the core (step 921), iterates through a slots of specific number of ports in the core local bitmap (step 922), and determines whether any slots have free ports (step 923). The core then iterates through a specified number of bits at a time (step 924), and resets one set bit and returns the corresponding port number (step 925). The core then iterates through the slots in global bitmap (step 926), determines whether a global slot has a free chunk (step 927), resets a global chunk bit and sets a specific number of bits in the local bitmap (step 928).

At step 921, a first core may receive a request for a port within a range. In some implementations, the range may the well-known range of ports. In some implementations, the port range may be registered ports. In some implementations, the port range may have been predefined. The request for port allocation may occur at steps 834 and 837 in FIG. 8B.

At step 922, the core iterates through the slots in a local bitmap of the core. The slot may comprise of a specific number of ports. In some implementations, a slot may comprise 512 ports. The iteration may start from a random position. This step may be similar to step 902 in FIG. 9A. In some implementations, the core may not yet have been assigned a slot or a chunk, so the core local bitmap may indicate that no slots are free.

At step 923, the core determines whether any slots in the core local bitmap has a free port. If a slot with a free port is found, the method continues to step 924, to find the free port in the free slot. Otherwise, the method continues to step 926, where the core assigns a chunk to the core.

At step 924, the core iterates through the core local bitmap a set of specific bits at a time. In some iterations, the specific number of bits may be 32 bits. The number of bits may be set to optimize performance and finding a free port. This step may be similar to step 905 of FIG. 9A.

At step 925, when the core finds a free port, the core resets the corresponding bit in the core local bitmap, indicating that the port is allocated. The core returns the port number corresponding to the allocated port. This step may be similar to step 906 of FIG. 9A.

At step 926, if the core determines that no slots in the core local bitmap have free ports, the core iterates through slots in the global bitmap. In some implementations, a slot may comprise 512 ports. The global bitmap may comprise one or more slots. This step may be similar to step 910 in FIG. 9A.

At step 927, the core determines whether a slot has a free chunk. In some implementations, a chunk may comprise 16 ports. A chunk may be indicated to be free when a bit corresponding to the chunk contains a value of one. The chunk may be indicated to be allocated when the bit contains the value of zero. This step may be similar to step 911 in FIG. 9A.

At step 928, the core resets a global chunk bit and sets a specified number of bits in local bitmap. In some implementations, the specified number of bits may be 16 bits, i.e. chunk size. The global chunk bit may be stored in the global bitmap. Resetting the bit includes changing the value of the global chunk bit to zero. Setting the bits in the local bitmap includes changing a number of bits in the local bitmap such that the ports represented by the number of bits may be indicated to be free. The number of bits equals chunk size. This step may be similar to step 912 in FIG. 9A. The method may then continue to step 925 to set one of the bits that are set in the current step.

Figure 9C:
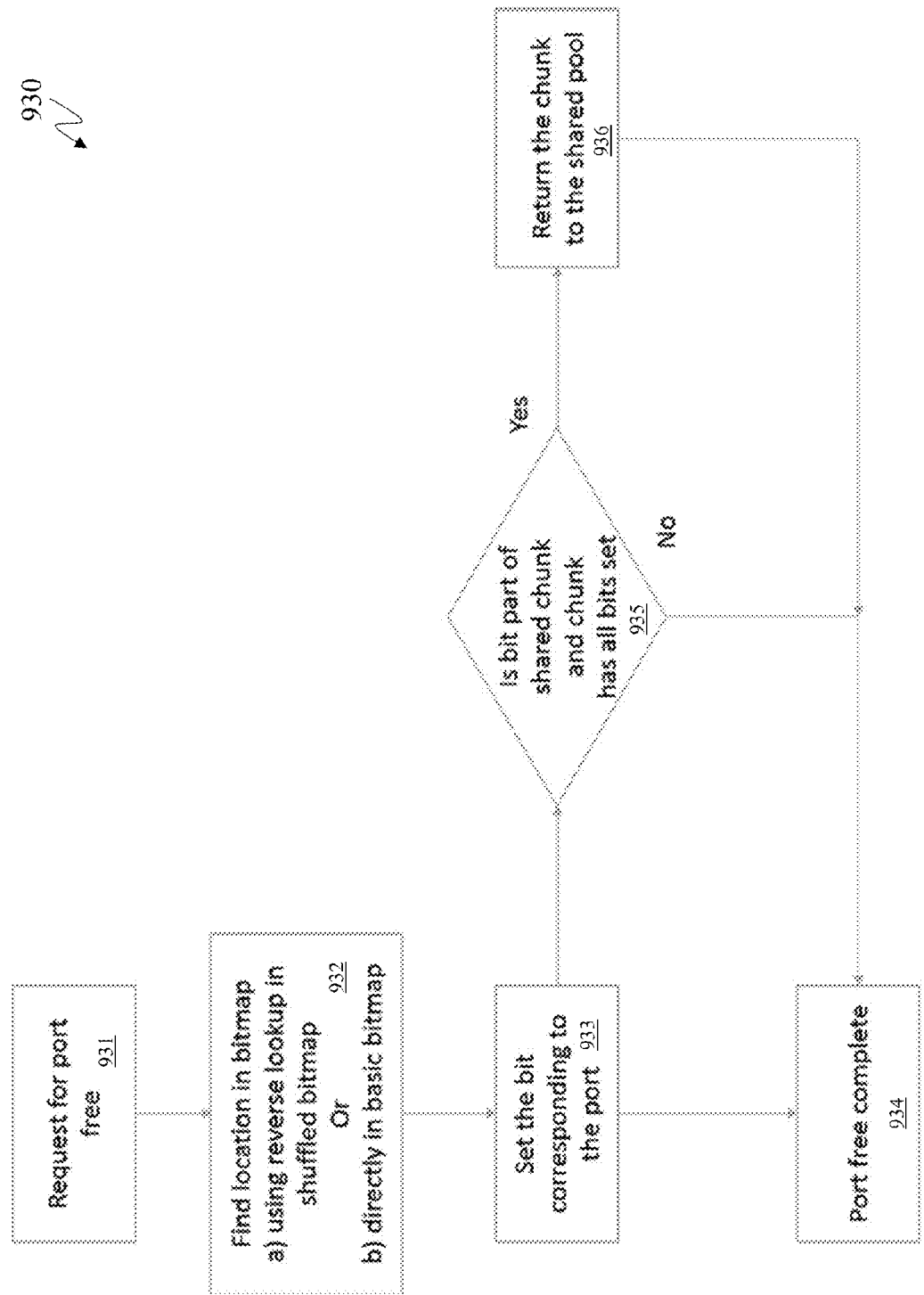
FIG. 9C is a flow diagram of an embodiment of a method for freeing a port.

FIG. 9C is a flow diagram of an embodiment of a method 930 for freeing a port. In brief overview, the core receives a request to free a port (step 931), finds the location of the port in a bitmap (step 932) and sets the bit corresponding to the port (step 933). The core determines whether a bit is part of a shared chunk, and whether the chunk has all bits set (step 935). The core can return the chunk to the shared pool (step 936), and indicate that the port has been freed (step 934).

At step 931, the core may receive a request to free a port. The request may be sent from step 832 of FIG. 8B. The request may include a port number that is to be freed. The port number may be a NAT port number, i.e. a translated port number.

At step 932, the core finds a location in the bitmap. In implementations where shuffled bitmap is used, the core finds the location using reverse lookup in the shuffled bitmap. In implementations where a basic bitmap is used, the core can find the location directly from the basic bitmap.

A step 933, the core sets the bit corresponding to the port. The location of the bit may have been found in step 932. Setting the bit to one may indicate that the bit is free. In some implementations, the method concludes to step 934.

At step 935, the core determines whether the bit is part of a shared chunk, and whether the chunk has all bits set. The core determines whether the chunk, comprising of chunks, may be freed and may then be allocated to other cores as need arises. To do so, the core checks each of the bits in the chunk. If all bits in the chunk are set, where each bit is part of the core local bitmap, the core may deallocate the chunk. Otherwise, the chunk may not be deallocated and the process ends.

At step 936, if all bits in the core local bitmap that correspond to the chunk are set, then the chunk is returned to the shared pool. In some implementations, a chunk bit in the global bitmap may be set.

Figure 9D:
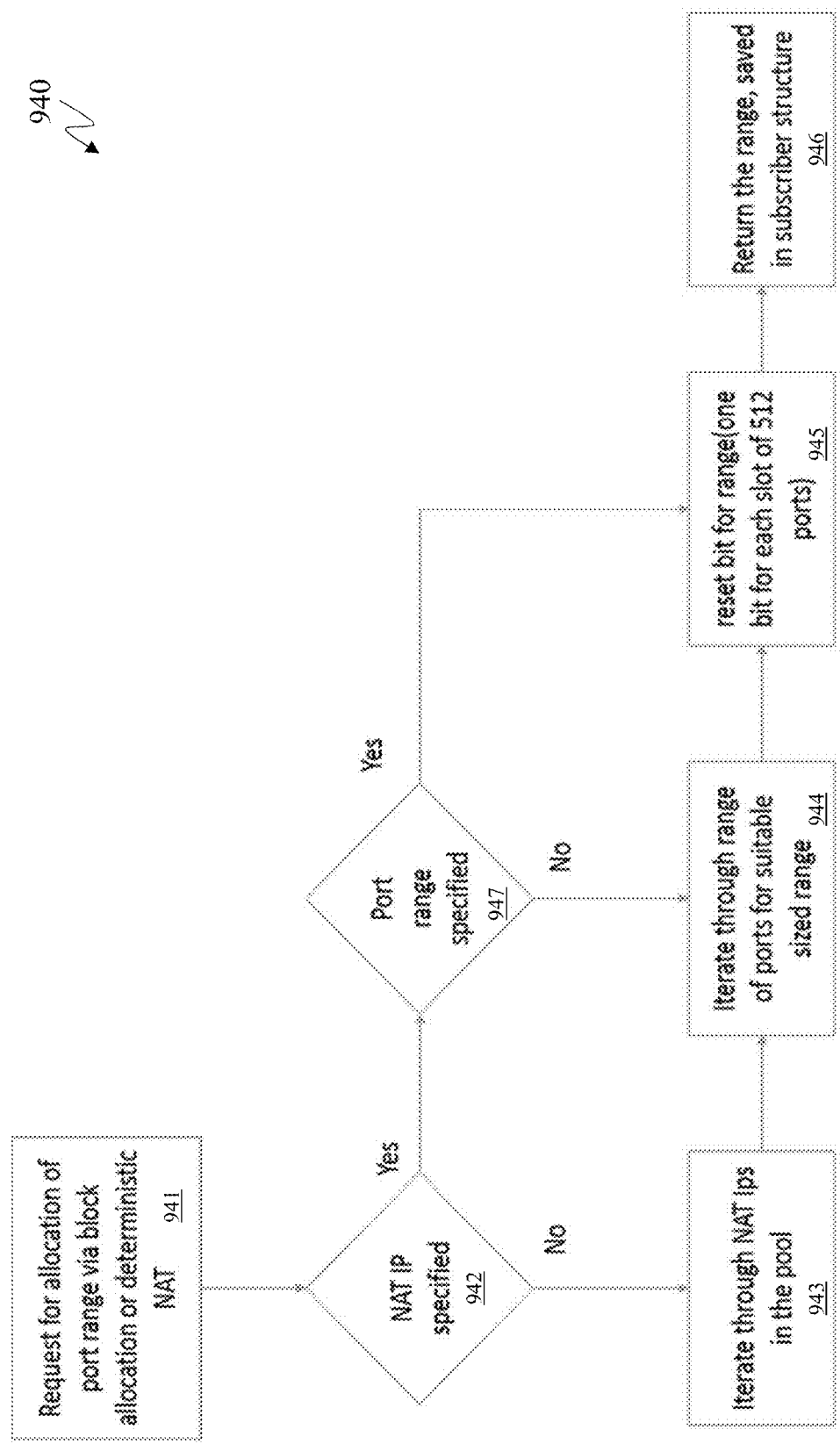
FIG. 9D is a flow diagram of an embodiment of a method for allocating a port range.

FIG. 9D is a flow diagram of an embodiment of a method for allocating a port range. In brief overview, the core receives a request for allocation of a port range (step 941), determines whether NAT IP address is specified (step 942), determines whether a port range was specified (step 942'). and iterates through NAT IP addresses in the pool (step 943). The core iterates through a range of ports for suitable-sized range (step 944), resets a bit for range (step 945), and returns the range (step 946).

At step 941, the core receives a request for allocation of a port range. In some implementations, the request may specify an allocation via block allocation or via a deterministic NAT. The request may sent during steps 834 or 837 of FIG. 8B. A block allocation may refer to allocating a plurality of ports, where the NAT ports, i.e. the translated port numbers, are a plurality of ports such as a range of ports.

At step 942, the core determines whether a NAT IP address is specified. In some implementations, the NAT IP address may be specified if the source IP address was translated to NAT IP. The NAT IP address may be specified in the request or in a subscriber structure. If a NAT IP address was not specified, a NAT IP address may not have been selected for the translation, and the method continues to step 943. Otherwise, the method continues to step 942'.

At step 942', the core determines whether a port range was specified. The port range may be specified in the request or in a subscriber structure, which includes information about the address and port before translation. If the port range was not specified, the method continues to step 944 to find a suitable port range. Otherwise, the method continues to step 945.

At step 943, the core iterates through NAT IP addresses in the pool. The pool may be the pool of available IP addresses. In some implementations, each IP address in the pool may deterministically map to a port. In some implementations, each IP address in the pool may map to a block of ports. The iteration may continue until a suitable block of ports is found.

At step 944, the core iterates through a range of ports for suitable sized range. The method may reach this step by iterating through IP addresses in the NAT IP addresses. In some instances, where NAT IP address was not specified, each range of free ports in each IP address that may be iterated on may comprise one or more ports. In some instances, where NAT IP address was specified, each range of free ports in the NAT IP address may be iterated on. The number of ports in a range may be compared against the required size of the range in the request at step 941. The method may alternatively reach this step if a NAT IP address was specified in step 942, but a port range was not specified in step 942'. The At step 945, the core resets a bit for range. Both NAT IP address and port range will have either been specified or found via iteration. A bit in a block bitmap may be reset, indicating that the block has been allocated. A bit may represent a slot, and a slot may comprise 512 ports in some implementations.

At step 950, the core may return the range and save the range in a subscriber structure. In some implementations, a bit number may be saved in the subscriber structure, where the bit number indicates that the slot in the block bitmap may be allocated to the local core.

Figures 9E, 9F:
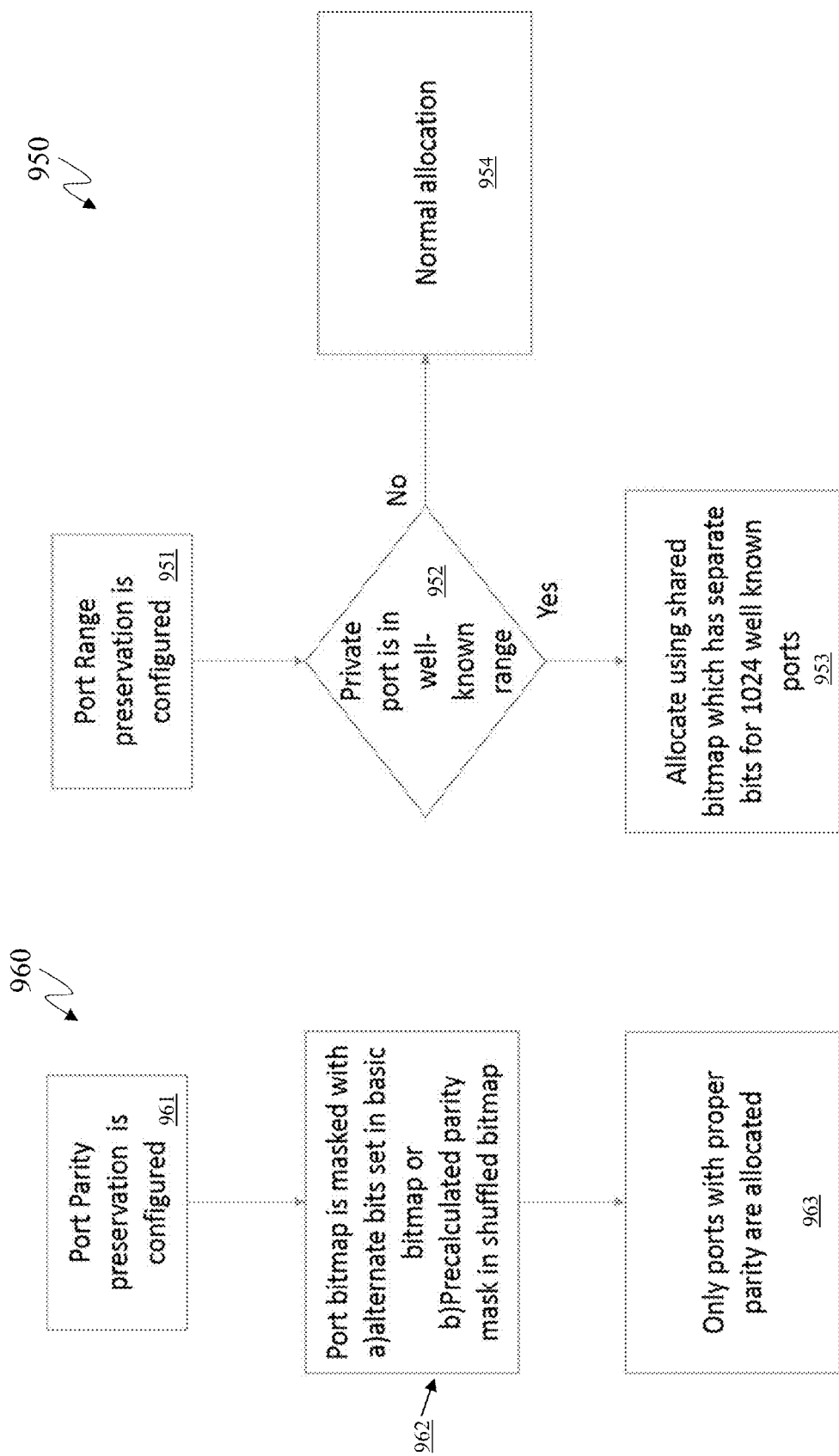
FIG. 9E is a flow diagram of an embodiment of a method for port range preservation.
FIG. 9F is a flow diagram of another embodiment of a method for port range preservation.

FIG. 9E is a flow diagram of an embodiment of a method for port range preservation. In brief overview, the method 950 comprises configuring port range preservation (step 951), determining whether a private port is in the well-known range of ports (step 952), allocating a port using shared bitmap which has separate bits for well-known ports (step 953), and allocating normally (step 954).

At step 951, the core configures a port range preservation. A separate, shared bitmap may be allocated. In some implementations, an offset value may be used for ports not within the well-known range. For instance, a port number of 1024 may be referred to by the first bit in a global bitmap under the basic scheme.

At step 952, the core determines whether the private port is in the well-known range. The private port refers to the pre-translated source port. The well-known ports may be between port number zero to 1023.

At step 953, if the private port is in the well-known range, the core allocates a port using a shared, separate bitmap instead of either a core local bitmap or the global bitmap. The separate global bitmap may ensure that a pre-translated port within well-known range will map to a post-translated port within well-known range.

At step 954, if the private port is not in the well-known range, the core may perform normal allocation, as described in FIGS. 9A-D

FIG. 9F is a flow diagram of an embodiment of a method for port parity preservation. In brief overview, the method 960 comprises configuring port parity preservation (step 961), masking port bitmap (step 962), and allocating ports with proper parity (step 963).

At step 961, the core may configure a port parity preservation. In some implementations, the core may create parity filters based on chunk allocation. In some implementations, the core may calculate a shuffled bitmap.

At step 962, for implementations using the basic bitmap, the core may mask the port bitmap with alternate bits set in the basic bitmap. For instance, the odd-numbered bits may be zero, and even-numbered bits may be one, or vice versa. For implementations that use a reshuffled bitmap, the pre-calculated parity mask may be used to mask the port bitmap. For instance, a bit in the pre-calculate parity mask may be set to one if the corresponding NAT port is an odd number or set to zero if the corresponding NAT port is an even number.

At step 963, the core may allocate only ports with proper parity. In some implementations, a pre-translated port number may be an even number. If a free port is found, in some instances, the free port is not used if the free port is an odd number. The mask is step 962 may filer out all free ports that have a different parity from the pre-translated port number.

J. Systems and Methods for Memory Management for Carrier-Grade NAT Implementation on a Multi-Core System Carrier-grade NAT on a multi-core system requires memory for allocating configuration structure (like NAT rules, port tables), dynamic entities (like NAT session, mapping, filtering, subscriber data, port block information, etc.) and hash table. On a multi-core implementation, there are various access patterns for this memory. Some memory, such as configuration structures, may reside in a core's private memory and be accessed efficiently due to the fact the configuration structures are changed and accessed by the respective core. Some resources could be efficiently partitioned among the cores and also safely reside in a core's private memory. A partitioning of some resources may leave some resources for need-based shared allocation which are present in shared memory like shared port tables. Entities which are heavily accessed and are required by dense subset of cores are replicated on all the cores. These entities are stored in shared memory. Subscriber data is one example of an entity stored in shared memory. Finally, entities which are either read-heavy or are required by only a sparse subset of cores are shared among all the cores. For instance, a NAT session which may be accessed by two cores in outbound and inbound path may be shared among all cores. Also, bindings, like mapping or filtering, are present on the shared memory and may be shared among all the cores because the bindings may be read-only after they are created. Hash tables are similar to bindings in this sense.

Each core of a multi-core system may own or be assigned core-private memory. Core-private memory may be assigned from a shared memory as described in relation to block 805 of FIG. 8A. A core-private memory may include memory exclusively mapped exclusively to the corresponding owner core. A core-private memory may also include shared memory that is logically owned by the corresponding owner core. Shared memory may be mapped to all cores at same virtual address space. For efficiency, virtual address space may be directly mapped to physical pages. In some implementations, each virtual address may map to one physical page.

Core-private memory allocation may be performed using a random-sized allocator or specific object sized slab allocator, also referred to as slab allocator. From shared memory, all allocations are done in page sizes of a specified size. In some implementations, the specified size of allocation is 2 megabytes (MB). In other implementations, the specified size may be 1 byte to 1 terabyte. Random-size allocator or slab allocator may be used for allocating memory for initialization, such as for hash tables and pagemap tables. Most of the shared memory may be allocated by slab allocators. In some implementations, slab allocators are primary consumers of shared memory.

Each core may maintain a per-core slab allocator that includes a free queue of objects. Each per-core allocator may be used for entities which are dynamic. A dynamic entity may change in size and may have a fair distribution among a number of cores. Per-core allocators may be associated with pages, and these pages may be owned by a specific core which may be responsible for allocation and deallocation of objects in the corresponding page. Other cores may access an object in the page but may not allocate or free the object or the page. As a result, synchronization may only be necessary at page level instead of object level.

Some entities that do not have a fair distribution among the cores and may be generated by configurations, may share a slab allocator that includes a single free queue of objects. These entities may include shared port address translation (PAT) tables. Per object synchronization mechanism achieved by locks may be used with the shared slab allocator.

Deallocation of objects may be performed by queuing the objects in per-core free memory queue. This queue is then collected periodically and memory returned to slab allocators.

Figure 10A:
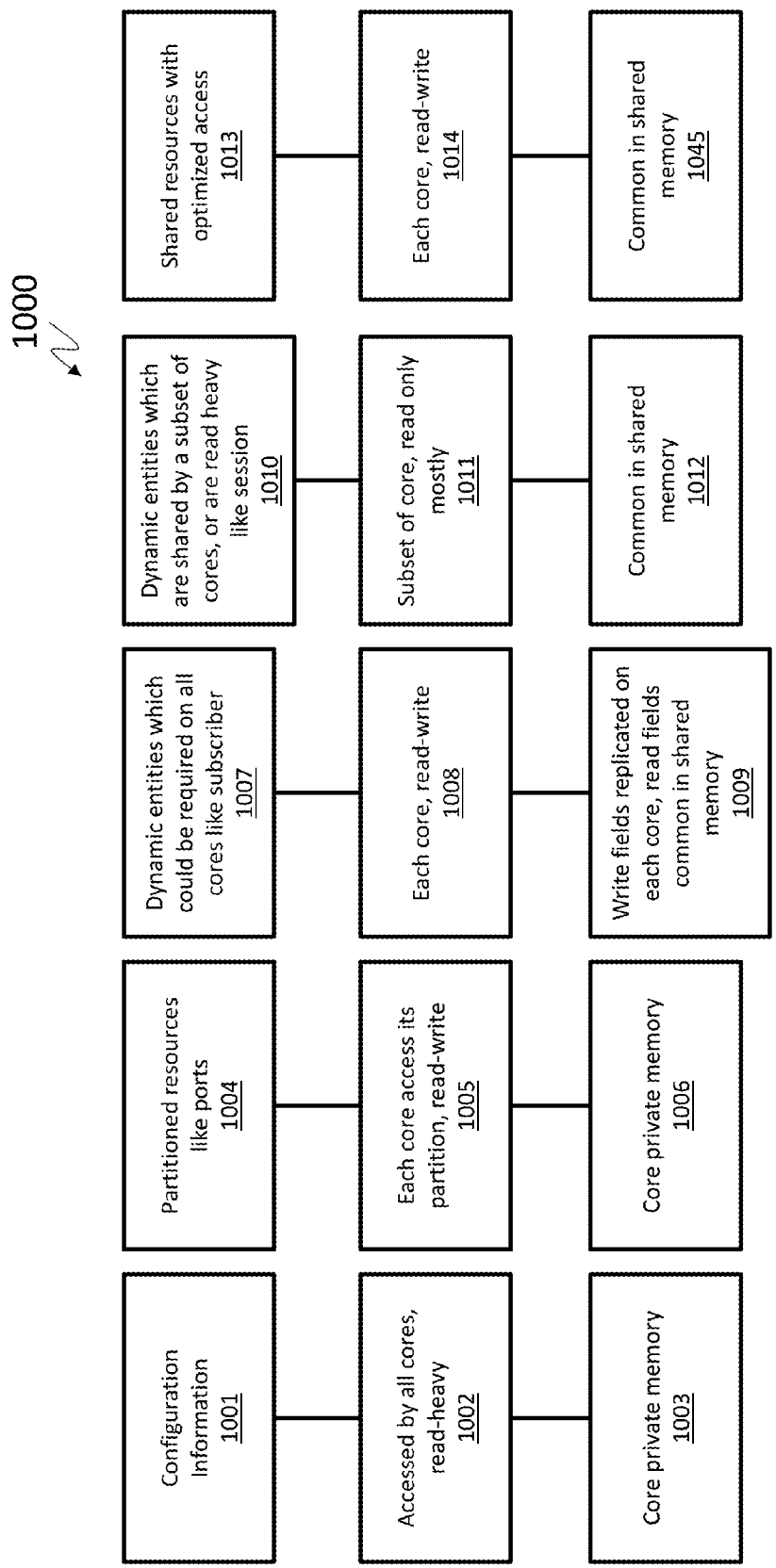
FIG. 10A is a block diagram indicating types of information and possible locations where the information is stored on a multi-core device.

FIG. 10A is a block diagram indicating types of information and possible locations where the information is stored on a multi-core device. A type of information may include configuration information 1001 which may be accessed by all cores and will be read-heavy. Configuration information may be allocated on core private memory. Another type of information may include partitioned resources such as ports 1004. Each core may access its own partition and may read or write the partitioned resource. Partitioned resources may be allocated in in core private memory. Another type of information may include dynamic entities which may be required on all cores, such as subscriber 1007. Each core may read or write to this type of information. Write fields of dynamic entities required on all cores may be replicated on each core, while read fields that may be common to multiple cores may be allocated in shared memory. Another type of information may include dynamic entities that may be shared by a subset of cores or may be read heavy, such as a session. A subset of cores may mostly read this type of information, which may be allocated in common shared memory. Another type of information includes shared resources with optimized access 1013. Each core may read-write such information. Shared resources with optimized access may be allocated in common in shared memory.

Figure 10B:
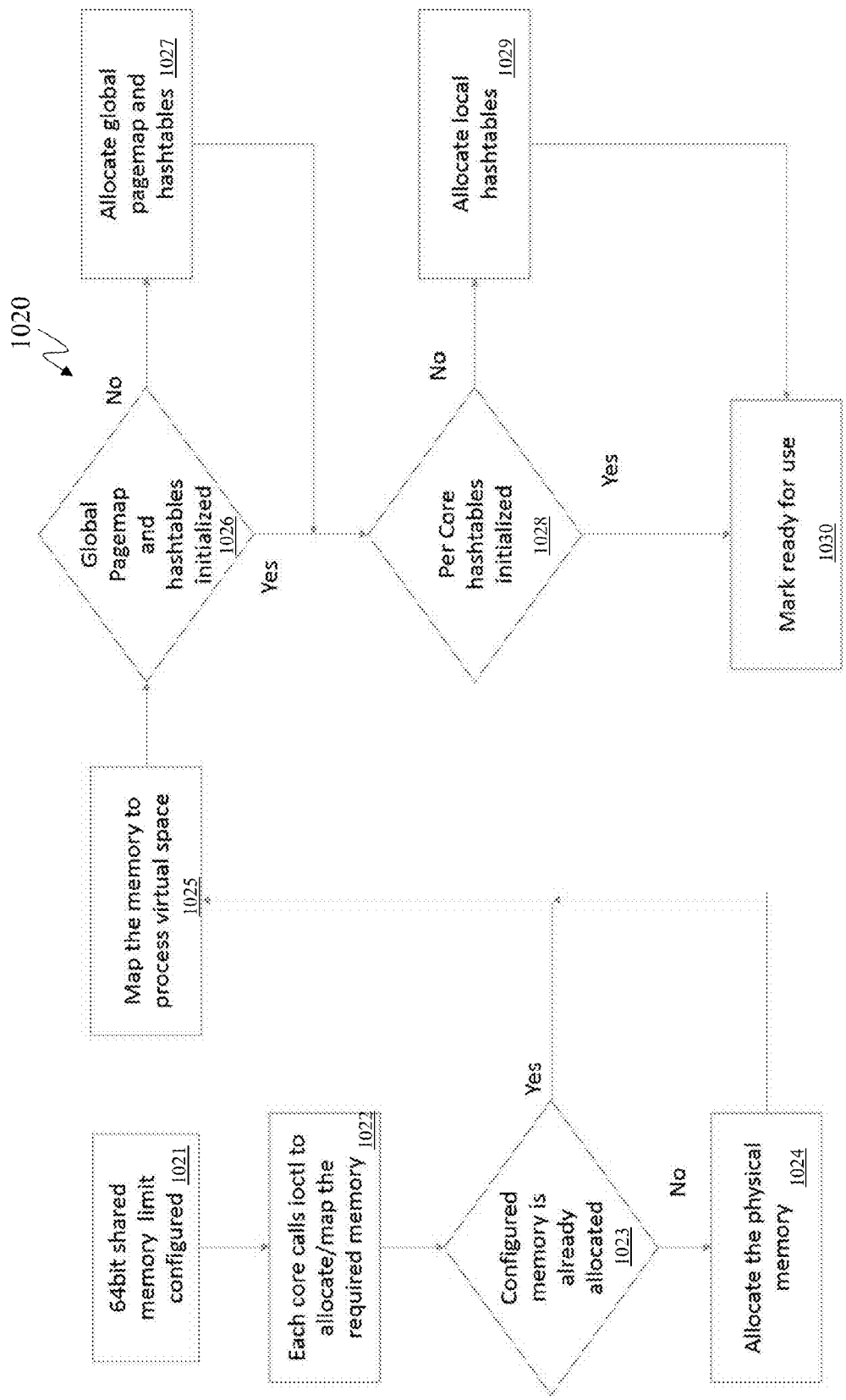
FIG. 10B is a flow diagram of an embodiment of a method for initializing shared memory.

FIG. 10B is a flow diagram of an embodiment of a method for initializing shared memory. In brief overview, the method 1020 may include the device configuring a shared memory limit (step 1021), allocating and mapping required memory for each core (step 1022), and determining whether the configured memory has already been allocated (step 1023). The method may further include the device allocating the physical memory (step 1024), mapping the memory to process virtual space (step 1025), and determining whether global pagemap and hash table have been initialized (step 1026). The method may further include the device allocating global pagemap and hash table (step 1027), determining whether per-core hash table have been initializes (step 1028), allocating local hash table (step 1029), and marking shared memory as ready for use (step 1030).

At step 1021, the device may configure a shared memory limit. In some implementations, the shared memory may be 64-bit memory. The shared memory may be as described in block 805 in FIG. 8A. The shared memory may be initialized when the multi-core device is initialized.

At step 1022, the device may allocate and map memory required for each core. In some implementations, each core may call a function to perform allocation and mapping. In some implementations, the function may be a "ioctl" function which may be a system call for device-specific input/output operations and other operations that may not be expressed by regular system calls.

At step 1023, the device may determine whether the configured memory has already been allocated. If the memory has already been allocated, then the method may continue to step 1025. Otherwise, the method may continue to step 1024.

At step 1024, if the configured may has not been allocated, the device may allocate the physical memory. The method may then continue to step 1025.

At step 1025, if the configured memory has already allocated or if the physical memory has been allocated in step 1024, the device may map the memory to process virtual space. In some implementations, a direct mapping may be used. In some implementations, a two-way associate, four-way associative or fully associative mapping may be used.

At step 1026, the device may determine whether global pagemap and hash table have been initialized. If the global pagemaps and/or hash table have not been initialized, the method may continue to step 1027. Otherwise, the method may continue to step 1028.

At step 1027, the device may allocate global pagemap and hash table. The method may then continue to step 1028.

At step 1028, the device may determine whether per-core hash table have been initializes. Per-core hash table are the hash table that are owned and/or allocated for each of the cores. If the per-core hash table have not been initialized, then the method may continue to step 1029. Otherwise the method may continue to step 1130.

At step 1029, the device may allocate local hash table, which are per-core hash table. The method may continue to step 1130.

At step 1030, the device may mark shared memory as ready for use. In some implementations, global pagemap, hash table, and local hash table may been marked ready for use.

Figure 10C:
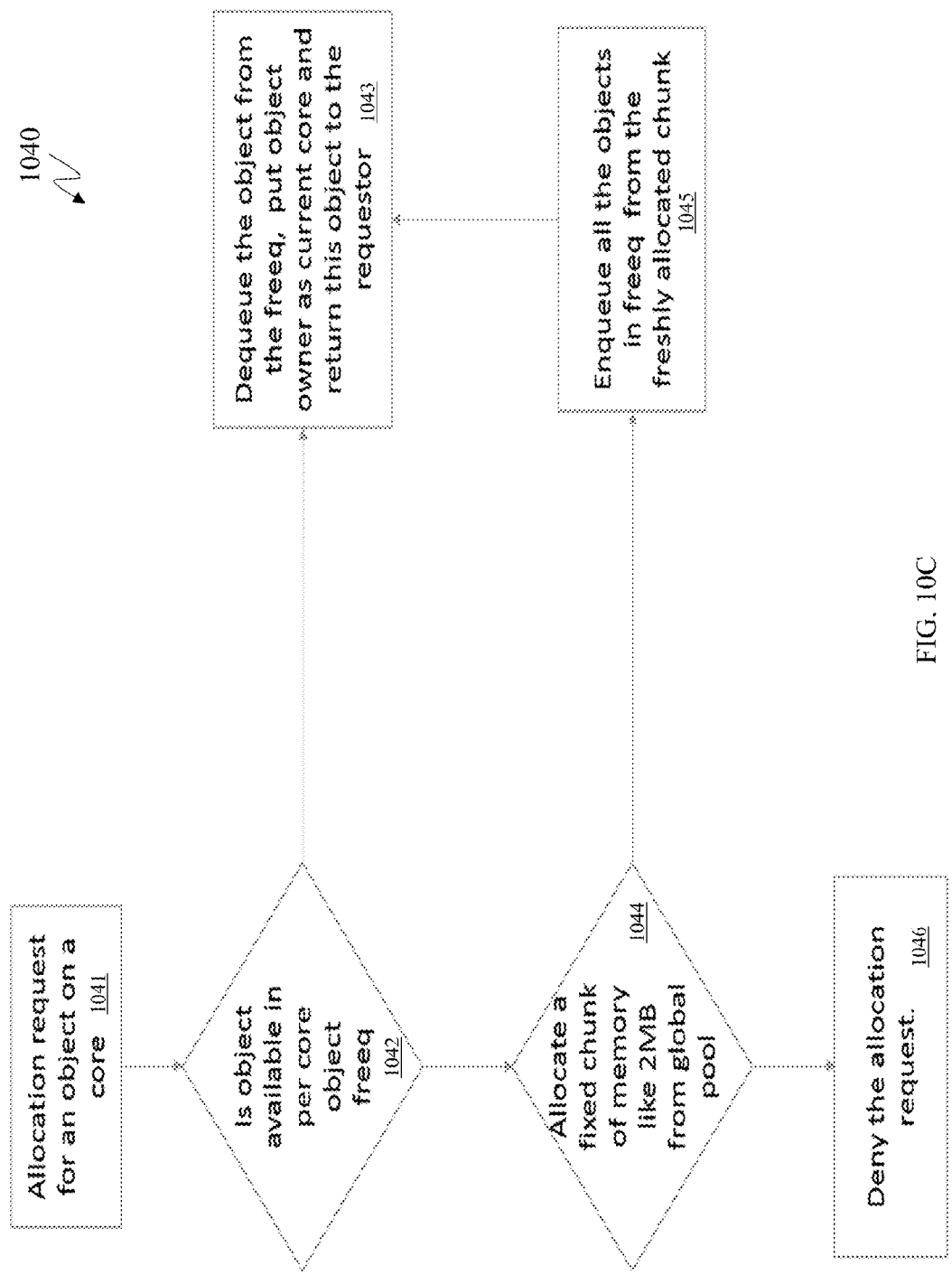
FIG. 10C is a flow diagram of an embodiment of a method for allocating a dynamic shared object.

FIG. 10C is a flow diagram of an embodiment of a method for the device allocating a dynamic shared object. In brief overview, the method 1040 may include the device receiving an allocation request for an object on a core (step 1041), and the device determining whether an object is available in a per-core object free queue (step 1042). The method may further include the device de-queuing the object from the free queue, putting object owner as the current core, and returning this object to the request (step 1043). The method may further include the device allocating a fixed chunk of memory from global pool (step 1044), en-queuing all the objects in the free queue from the freshly allocated chunk (step 1045), and denying the allocation request (step 1046). Using this method, synchronization among cores may not be required for object allocation but may be required for memory chunk allocation.

At step 1041, the device may receive an allocation request for an object on a core. The allocation request may be for a dynamic shared object. The request may be sent from another core or the core receiving the request. In some implementations, the request may be received at a per-core allocator.

At step 1042, the device may determine whether an object is available in a per-core object free queue. Each core may include or maintain an object free queue. The object free queue may correspond to a per-core allocator. If the object is available in the per-core object free queue, the method continues to step 1043. Otherwise, the method continues to step 1044.

At step 1043, the device may de-queue the object from the free queue, putting object owner as the current core, and returning this object to the request. The object may be dequeued from the per-core object free queue. The current core may be marked as the owner of the object. In some implementations, an allocator that is associated with the current core may mark the object. The object may be returned to the requestor and the method may conclude.

At step 1044, if the object is not available in the per-core object free queue, the device may further allocate a fixed chunk of memory from global pool. In some implementations, the fixed size of memory may be 2 MB, or any size between 1 byte to 1 terabyte. In some instances, the global pool may not be able to allocate the chunk due to not having enough memory, at which point the method may continue to step 1046. Otherwise, if the chunk can be allocated in the global pool, the method may continue to step 1045.

At step 1045, the device may en-queue all the objects in the free queue from the freshly allocated chunk. The free queue may correspond to the allocator and/or the core that received the allocation request. At step 1046, the request for allocation may be denied. The method may then conclude.

Figure 10D:
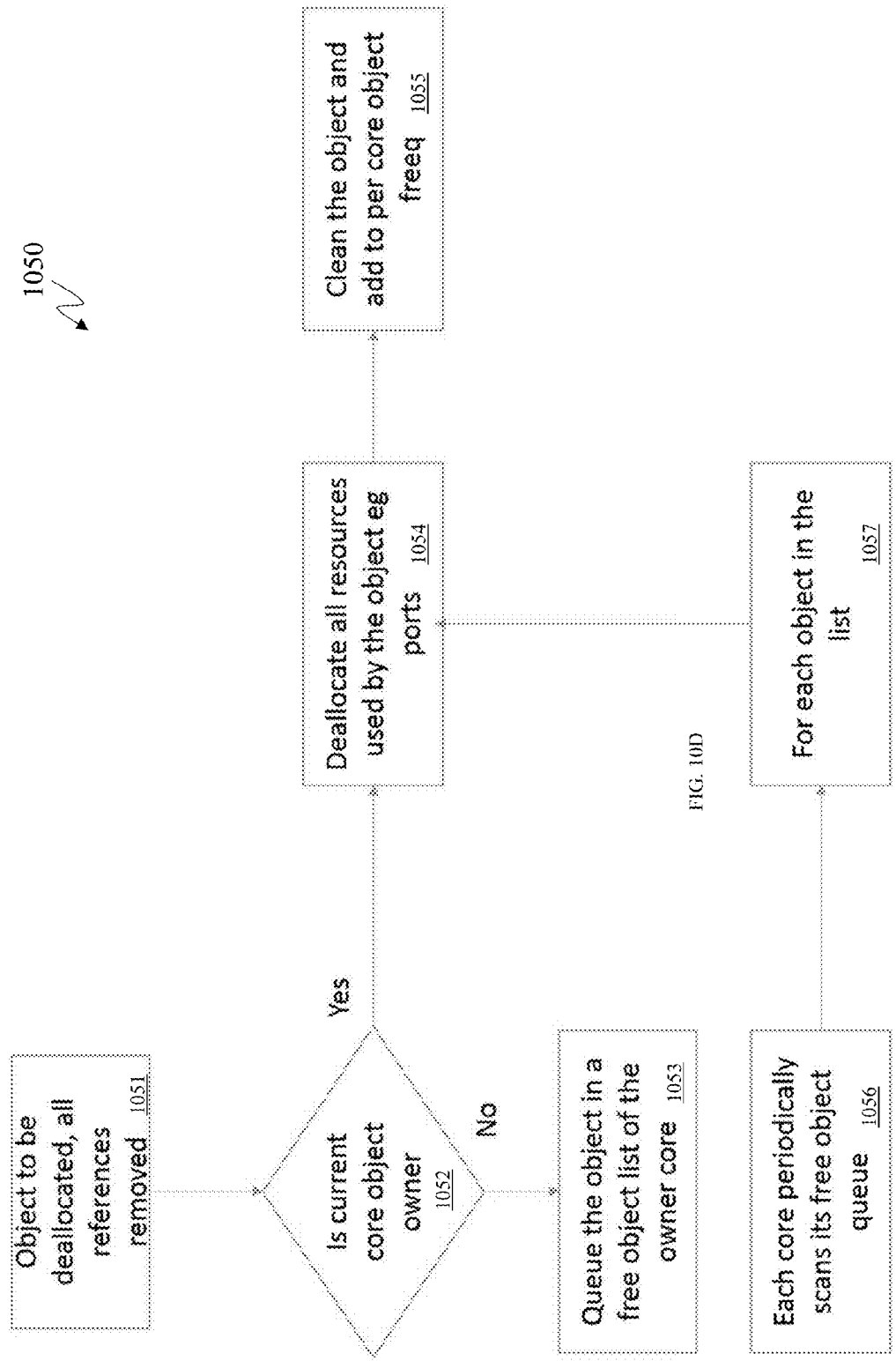
FIG. 10D is a flow diagram of an embodiment of a method for freeing a dynamic shared object.

FIG. 10D is a flow diagram of an embodiment of a method for freeing a dynamic shared object. In brief overview, the method 1050 may include a core receiving an object to be deallocated with all references removed (step 1051), determining whether the current core is the object owner (step 1052), and queuing the object in a free object list of the owner core (step 1053). The method may further include the device deallocating all resources used by the object, such as ports (step 1054), and cleaning the object and adding the objects to per-core free memory queue (step 1055). The method may further include each core periodically scanning its free object list (step 1056), and iterating through each object in the free object list of the each core (step 1057).

At step 1051, a core may receive an object to be deallocated with all references removed. In some instances, an object may not have references or reference counts. In some implementations, the object may be a dynamic shared object. In some implementations, a reference count may be stored with or in the object.

At step 1052, the core may determine whether the current core is the object owner. The current core may be the core that received the object in step 1051. In some implementations, the owner of the object may be indicated by a marking in the object. In other implementations, the owner of the object may be determined by the memory location of the object. If the current core is the owner, the method may continue to step 1054. Otherwise, the method may continue to step 1053.

At step 1053, if the current core is not the object owner, the device may queue the object in a free object list of the owner core. The free object list may be owned by or correspond to the owner core. The owner core may then later go through the list of free object queue, as described in step 1056.

At step 1054, if the current core is the object owner, then the device may deallocate all resources used by the object, such as ports. Resources may also include, for instances, memory used for structures and different types of memory usage as described in relation to FIG. 10A.

At step 1055, after deallocating all resources used by the object, the device may clean the object and add the objects to per-core free queue. Cleaning the object may include returning memory to a slab allocator corresponding to the current core. In some implementations, the per-core object free queue may be similar to the one described in relation to step 1042 of FIG. 10C.

At step 1056, each core may periodically scan its free object list. In some implementations, the free object queue may be periodically scanned. In some implementations, the periodicity may be every one second. In some implementations, the periodicity may be sixty seconds. Periodicity may be similar to step 851 of FIG. 8D. In some implementations, a single periodic process on each core may scan the corresponding free object list.

At step 1057, the device may iterate through each object in the free object list of the each core. The list may have been filled with objects in step 1053 at a different core. Each object in the list may be deallocated at step 1054.

K. Systems and Methods for Dynamic Resource Quotas for Subscribers of Carrier-Grade NAT on Multi-Core Systems Subscribers may be configured to allocate a configured limit of resources. Such limits may ensure fairness, so that no subscriber may use up resources and prevent other subscribes from using those resources, especially for scarce resources such as ports or memory. Subscribers include devices, servers, services, etc., that are the source, i.e. attached to the internal network and have addresses that are to be translated.

On multi-core systems, such as the multi-core device described herein, quotas may be divided into exclusive quotas owned by owner cores and shared quotas. Dividing the quotas to exclusive and shared quotas may be an efficient implementation of limiting resources. Shared quotas may be used for allocation as needed. Quota limits may be set for each quota.

When a new resource request is received, a core may first use up exclusive quota until the quota limit is reached. Thereafter, shared quota may be allocated under lock either in individual units or in chunks. While freeing up resources, shared quota may be freed up first. Resources may be freed in individual units or chunks as was the allocation. Quotas may be changed dynamically and may be immediately used for the received new resource allocation request.

In some implementations, quota limits may be decreased. If a quota limit for an exclusive quota is decreased, then the exclusive quota may be decreased by the difference between the new quota limit and the old quota limit. Then the shared quota may be increased by the difference. In some implementations, the difference may be calculated by the difference between the new quota limit and the amount resources used by the quota, which may be less than the old quota limit. When the shared quota is increase, in some instances, shared quota limit may be overdrawn, and remaining shared quota may be negative overall.

Similarly if quota limits are increased for the exclusive quotas, the exclusive quota is increased by the difference between the new quota limit and the old quota limit. Some or all resources used in the shared quota may be freed up, the amount determined by the difference.

Figure 11A:
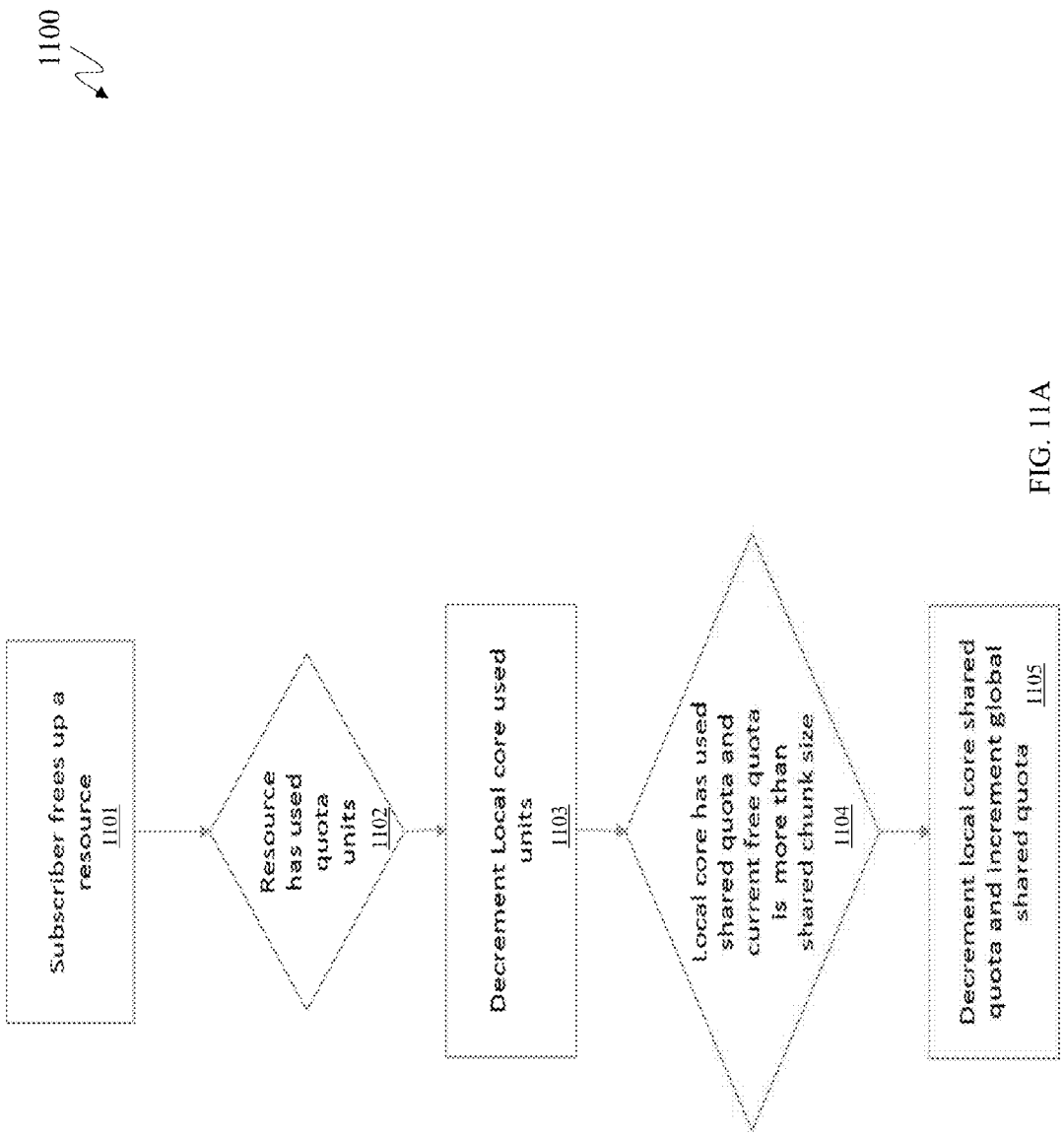
FIG. 11A is a flow diagram of an embodiment of a method for freeing quota units.

FIG. 11A is a flow diagram of an embodiment of a method for freeing quota units. In brief overview, the method 1100 may include the device receiving an indication that a subscriber freed up a resource (step 1101), determining whether a resource has used quota units (step 1102), and decrementing used units of the local core (step 1103). The method may further include the device determining whether the local core has used shared quota and current free quota is more than shared chunk size (step 1104), and decrementing local core shared quota and incrementing global shared quota (step 1105).

At step 1101, the device may receive an indication that a subscriber freed up a resource. In some implementations, the subscriber may send a notice that a session may be closed or that a port may be closed. In some implementations, resource may be memory.

At step 1102, the device may determine whether a resource has used quota units. In some implementations, quota units may be part of a quota assigned to a local core for the resource or the type of resource. In some implementations, the quota units may refer to any resource take counts against a quota of a local core. If the resource had not used quota units, the method may stop. Otherwise, the method may continue to step 1103.

At step 1103, if the resource had used quota units, the device may decrement used units of the local core. Each core may keep track of a quota limit for each type of resource, as well as a number of used units for each type of resource. For instance, the local core may track a number of ports that are currently used by the core.

At step 1104, the device may determine whether the local core has used shared quota and whether the current free quota is more than shared chunk size. In some implementations, the local core may determine whether the local core has used shared quota and whether the current free quota is more than shared chunk size. In some instances, the local core had previously used the shared quota if the local core ran out of exclusive quota. The shared chunk size may be the size of the chunk that is shared by the global quota that may is currently used by the local core. Current free quota may refer to the amount of units to be freed by freeing up the resource. So if the current free quota is greater than the shared chunk size, then more than the shared chunk may be freed from the shared resource quota.

At step 1104, the device may decrement local core shared quota and increment global shared quota. In some implementations, a core of the device, such as the local core, may decrement local core shared quota and increment global shared quota. Because the shared chunk that had stored the freed resource may now be empty, it may be freed and be given back to the global shared quota. Local core shared quota may be decremented, indicating that the local core may have one less chunk from the global shared resource. Also, the global shared quota may be incremented, indicating that one more chunk may be available for sharing.

Figure 11B:
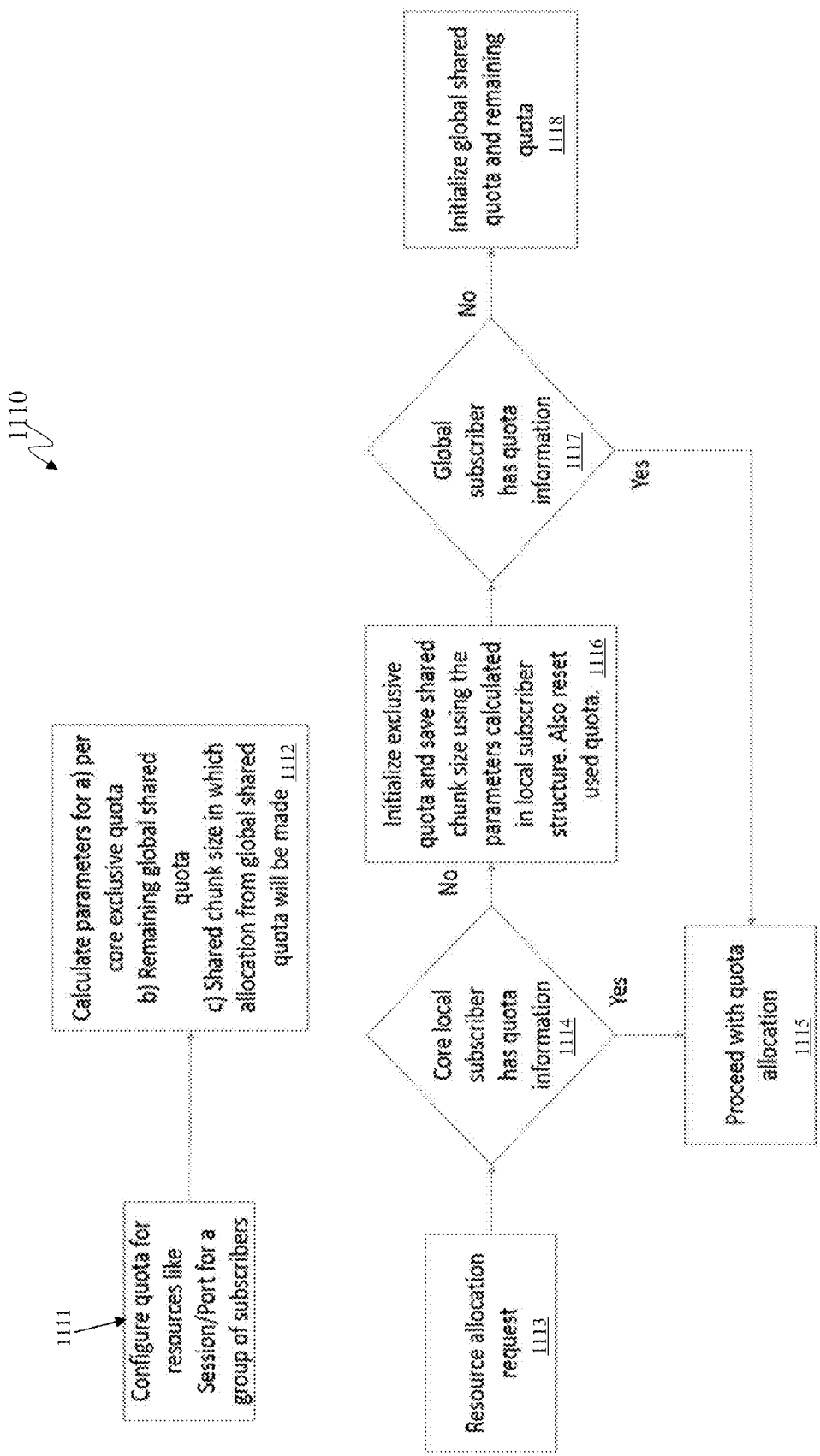
FIG. 11B is a flow diagram of an embodiment of a method for configuring quota with lazy copying to dynamic entities.

FIG. 11B is a flow diagram of an embodiment of a method for configuring quota with lazy copying to dynamic entities. In brief overview, the method 1110 includes the device configuring quota for resources such as session and port for a group of subscribers (step 1111), and calculating parameters for a) per-core exclusive quota, b) remaining global shared quota, and c) shared chunk size in which allocation from global shared quota will be made (step 1112). The method may further include the device receiving a resource allocation request (step 1113), determining that a core-local subscriber has quota information (step 1114), and proceeding with quota allocation (step 1115). The method may further comprise the device initializing exclusive quota and saving shared chunk size using the parameters calculated in local substructure and resetting used quota (step 1116), determining that a global subscriber has quota information (step 1117) and initializing global shared quota and remaining quota (step 1118).

At step 1111, the device may configure quota for resources, such as session and port, for a group of subscribers. In some implementations, one or more cores of the device may configure the quota for resources. The method may be called from an initialization method of the multi-core device. One or more configuration parameters may be used. A per-subscriber quota of each subscriber may be configured.

At step 1112, the device may calculate parameters for a) per-core exclusive quota, b) remaining global shared quota, and c) shared chunk size in which allocation from global shared quota will be made. Each core may have an exclusive quota. All cores may share from one global shared quota. In some implementations, one or more of the cores of the device may calculate the parameters for a) per-core exclusive quota, b) remaining global shared quota, and c) shared chunk size in which allocation from global shared quota will be made. A shared chunk size may indicate how many units are shared with a core at once. A chunk size may be, for instance 1, 2, 16, 256, or any number less than the number of global quota. In some implementations the size of global quota may be a multiple of the chunk size. The parameters may be calculated based on size of memory and one or more configuration parameters from step 1111. The quotas may be initialized with steps 1111 and 1112. Each subscriber may have a set of per-resource quota parameters.

At step 1113, the device may further receive a resource allocation request. In some implementations, the request may be received after or before allocating an object, as described in relation to FIG. 10C. The resource may be allocated at a local core, or the request to allocate a resource may be received at a local core.

At step 1114, the device may determine that a core-local subscriber has quota information. In some implementations, the local core may track per-subscriber quota information, which may be limited based on a configuration parameter. For instance, a subscriber may be allowed to use a limit of 16 ports. The per-subscriber limit may be set to any number, from zero to maximum number of resources available on the multi-core device. In some implementations, the per-subscriber limit may be not set as a quota limit on a local core level.

At step 1115, the device may proceed with quota allocation. In some implementations, a per-subscriber quota limit for local level may be available from step 1114. In other implementations, global per-subscriber quota may be available from step 1117. The method may proceed to quota allocation as describe in relation to FIG. 11C. If the core local does not have per-subscriber quota information, it may be initialized at step 1116.

At step 1116, the device may further initialize the exclusive quota and saving shared chunk size using the parameters calculated in local substructure and resetting used quota. In some implementations, the parameters may have been calculated at initialization at step 1112. In some implementations, the exclusive quota and the shared chunk size may be initialized to a set of default parameters from step 1112. In some implementations, the initial parameters may be calculated from parameters loaded from a local subscriber structure. The quota may be reset because no resource has yet to be used as part of the quota.

At step 1117, the device may determine that a subscriber has quota information. In some implementations, a per-subscriber quota for a type of resource may be imposed on a global level. For instance, a subscriber may use a limit of 128 ports altogether on all the ports. The global subscriber may be a global subscriber structure that includes information on the total number of resources that the subscriber is currently using. If the quota information is available, the method may continue to step 1115, onto FIG. 11C. Otherwise, the method may continue to step 1118.

At step 1118, the device may initialize global shared quota and remaining quota. The global shared quota may have not been previously initialized. Global sharing quota may be initialized based on configuration parameters, and because no global shared quotas has been allocated, the value may be set to zero. The remaining quota may similarly be set to the maximum number of resources available for sharing. In some implementations, the initial value of global shared quota. The remaining quota may take into account the chunk size, and the remaining quota may be set to maximum size divided by chunk size.

Figure 11C:
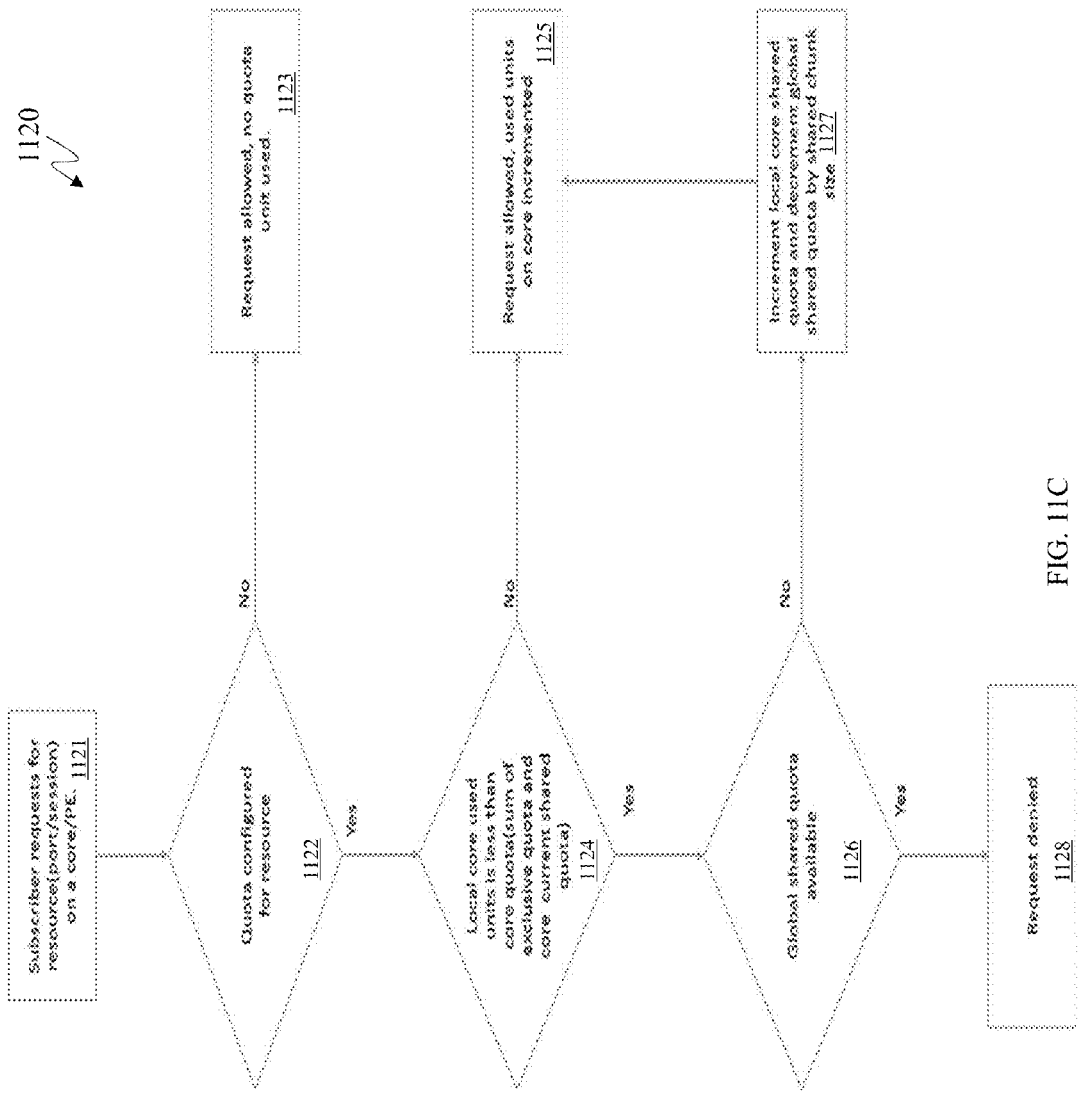
FIG. 11C is a flow diagram of an embodiment of a method for allocating quota units.

FIG. 11C is a flow diagram of an embodiment of a method for allocating quota units. In brief overview, the method 1120 includes the device receiving a request from a subscriber, for a resource such as a port or session, by a core or a packet engine (step 1121), determining whether the quota is configured for the resource (step 1122), and allowing the request without using quota units (step 1123). The method may further include the device determining whether a local core used units less than core quota, which may be the sum of exclusive quota and current core's shared quota (step 1124), and allowing the request while incrementing used units on the core (step 1125). The method may further include the device determining whether a global shared quota may be available (step 1126), incrementing local core's shared quota and decrementing global shared quota by shared chunk size (step 1127), and denying the subscriber's request (step 1128).

At step 1121, the device may receive a request for a resource. The request may be sent from a subscriber. The request may be received by a core or a packet engine executed by a core. The resource may be, for instance, a port or a session.

At step 1122, the device may determine whether the quota is configured for the resource. Each core may have access to a per-subscriber quota for a resource type specified in the request. For instance, the subscriber may have a quota of 16 ports. In some implementation, the quota may not have been configured because a quota may not be used for the resource type or for the subscriber sending the request. If the quota has not been configured, the method continues to step 1123. Otherwise, the method continues to step 1124.

At step 1123, the device may allow the request without using quota units. In some implementations, quota may not be used for the type of resource. In some implementations, quota may not be used for the subscriber. The request for the resource may be allowed and no quota units may be used.

At step 1124, the device may determine whether a local core used units less than core quota, which may be the sum of exclusive quota and current core's shared quota. "Core quota" may represent the amount of resources that have been allocated in the core for the subscriber to use. The "local core used units" may be the amount of resources in the local core for the subscriber that are currently in use. If the local core used units is less than core quota, than more from the core quota may be used without requesting additional resources from the global shared quota. If more local resources are available, then the method continues to step 1125 to allow the request. Otherwise, the method continues to step 1126.

At step 1125, the device may allow the request from step 1121. More units assigned to the local core may be used. The used units for local core may be incremented to track the number of actual units of resources that are currently in use.

At step 1126, if the local core does not have additional resources in the quota that has been assigned to it (in either the exclusive quota or the already shared quota), then the device determines whether global shared quota is available. In some implementations, the global shared quota may be tracked with a number that indicates a number of resource units or chunks that are available for sharing among the cores. If global shared quote is greater than zero, then the request may be granted and the method may continue to step 1127. Otherwise, there are no resources available to service the request and the request is denied.

At step 1127, the device increments local core shared quota and decrementing global shared quota by shared chunk size. In some implementations, the local core shared quota may track the number of local units of resources that are shared for the local core per subscriber, per resource. For instance, a local core shared quota may be zero if no global shared resource is used by the local core for the resource requested. In another instance, a local core shared quota may be sixteen to indicate sixteen of the global shared resource are currently used by the core for the subscriber. In some implementations, the shared chunk size may the amount of resources that may be shared with a core at once. In some implementations, instead of tracking the amount of resources, the global shared quota may track the number of chunks available, and the global shared quota may be decremented by one.

At step 1128, the device may deny the request for the resource by the subscriber. No resource may be available at the local core and no more resources may be shared by the global share.

Figure 11D:
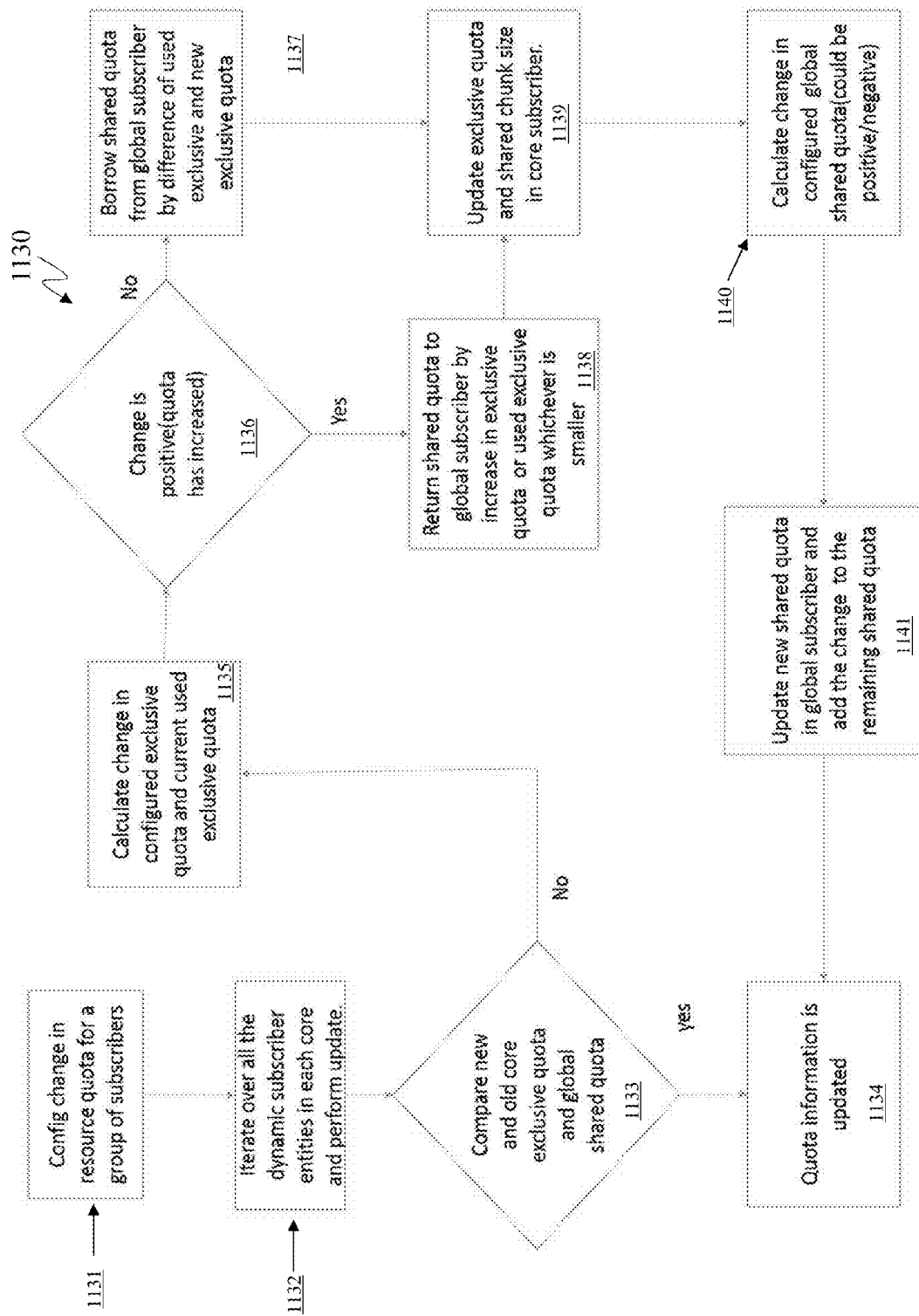
FIG. 11D is a flow diagram of an embodiment of a method for dynamically changing configured quota.

FIG. 11D is a flow diagram of an embodiment of a method for dynamically changing configured quota. The method 1130 includes the device receiving a change in configuration for resource quota for a group of subscribers (step 1131), iterating over all the dynamic subscriber entities in each core and performing an update (step 1132), comparing the new and old core-exclusive quota and global shared quota (step 1133), and updating quota information (step 1134). The method may further include the device calculating a change in the configured exclusive quota and the core's currently used exclusive quota (step 1135), and determining whether the quota has increased (step 1136). The method may further include the device borrowing shared quota from global subscriber by calculating the difference between the used exclusive quota and new exclusive quota (step 1137), or returning shared quota to global subscriber by increasing the exclusive quota or used exclusive quota, whichever is smaller (step 1138). The method may further include the device updating the exclusive quota and shared chunk size in the core subscriber (step 1139), calculating a change in configured global shared quota, which can be positive or negative (step 1140), and updating the new shared quota in global subscriber and adding the change to the remaining shared quota (step 1141).

At step 1131, the device receives a change in configuration for resource quota for a group of subscribers. In some instances, the quota may be increased, and in other instances, the resource quota may be decreased. In some implementations, the configuration may change the resource quota per-core, per-subscriber.

At step 1132, the device iterates over all the dynamic subscriber entities in each core and performs an update. In some implementations, dynamic subscriber entities refer to dynamic entities as described in relation to FIG. 10A. In some implementations, dynamic subscriber entities refer to dynamic entities that may be assigned subscribers or are used to translate and route traffic from or to the subscriber. Each of the dynamic entities used for the subscriber may then be iterated over and updated.

At step 1133, the device may compare the new and old core-exclusive quota and global shared quota. The new core-exclusive quota may be part of the configuration change in step 1131. The comparing step may be to determine whether the quota is being changed at all. The configuration change may change a quota for one of the resources or only one of the subscribers, and so for some resource quotas, no change may be necessary. In some implementations, amount of global quota available may be changed.

At step 1134, the device may update quota information. In some implementation, no change may be necessary. In some implementations, quota may be increased or decreased. The quota being updated may be a core-local quota or a global quota.

At step 1135, the device may calculate a change in the configured exclusive quota and the core's currently used exclusive quota. In some implementations, the change may be calculated by subtracting the old quota value from the new quota value. The old quota value may be referred to as core's currently used exclusive quota and the new quota value may be referred to as the configured exclusive quota.

At step 1136, the device may determine whether the quota has increased. In some implementations, if the change calculated in step 1135 is positive, then quota has increased.

If the quota has increased, the method continues to step 1138. Otherwise, the quota has decreased, and the method continues to step 1137.

At step 1137, if the quota has decreased, the device borrows shared quota from global subscriber by calculating the difference between the used exclusive quota and new exclusive quota. The difference may represent the amount resources that are unavailable in the core exclusive quota. The method may continue to step 1139.

At step 1138, if the quota has increase, the device returns shared quota to global subscriber by increasing the exclusive quota or used exclusive quota, whichever is smaller. Exclusive quota may refer to the limit and the used exclusive quota may be the amount of resources that are currently used that count against the exclusive quota. The method may continue to step 1139.

At step 1139, the device may update the exclusive quota and shared chunk size in the core subscriber. The exclusive quota and the shared chunk size may be tracked per-subscriber and may be stored in a subscriber structure. The exclusive quota may have been increased or decreased. The shared chunk size may refer to number of chunks that are shared for the subscriber for the current core and/or the number of resources per chunk in the share chunks.

At step 1140, the device may calculate a change in configured global shared quota, which can be positive or negative. If the exclusive quota increase, and if the shared chunk size was greater than zero, then the global shared quota may be increase. If the exclusive quota decrease to a value lesser than the used exclusive quota, then the global shared quota may decrease.

At step 1141, the device may update the new shared quota in global subscriber and adding the change to the remaining shared quota. The global subscriber may a subscriber structure stored in the global memory that stores the shared quota. The change calculated from the step 1140 may be added to the shared quota value. The method may then include step 1134, where the quota information is updated.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method of maintaining network address translation (NAT) session management on a multi-core system, comprising:
    inserting, by a first core of a multi-core device intermediary between a plurality of clients and a plurality of servers, for a session established between a client of the plurality of clients and a server of the plurality of servers, a network address translation (NAT) session in to a local outbound session table stored in a memory of the first core;
    determining, by the first core, that a second core of the multi-core device will serve as a receiving core for a response to the request from the server to the client;
    inserting, by the first core, the NAT session into a global session table responsive to determining that the second core will serve as the receiving core;
    identifying, by the second core of the multi-core device, that the NAT session is not included in a local inbound session table stored in a memory of the second core;
    identifying the NAT session in the global session table; and
    inserting, by the second core, the NAT session in the local inbound session table stored on the memory of the second core.

2. The method of claim 1, further comprising:
    determining, by the first core, that the first core will serve as a receiving core for a response to the request from the server to the client; and
    inserting, by the first core, the NAT session in a local inbound session table stored on the memory of the first core.

3. The method of claim 1, further comprising:
    identifying, by the first core, an existing NAT session owned by the first core;
    determining that the existing NAT session is shared using the global session table;
    determining that the existing NAT session is no longer being used;
    removing the existing NAT session from the local outbound session table stored on the memory of the first core; and
    removing the existing NAT session from a local inbound session table stored on a memory of a core of the multi-core device determined to serve as a receiving core for packets corresponding to the existing NAT session.

4. The method of claim 1, further comprising:
    receiving, by the first core, an input packet corresponding to the NAT session;
    determining that at least one service is associated with the NAT session; and
    forwarding the input packet from the client to the service.

5. The method of claim 1, further comprising:
    receiving, by the first core, a request for a port within a range on the first core;
    iterating through slots of ports in a local bitmap of the first core;
    determining that a slot of ports in the local bitmap has at least one free port; and
    allocating, by the first core, the free port responsive to the request.

6. The method of claim 1, further comprising allocating a port range based on one of a block allocation or a NAT session.

7. The method of claim 1, further comprising:
receiving, by the first core, a request for allocation of an object;
determining that the object is available in a free queue of a memory of the first core;
removing the object from the free queue; and
returning the object to a core from which the request was received.

8. The method of claim 1, further comprising:
receiving, by the first core, a request for a resource on the first core;
determining, by the first core, that a quota is configured for a resource; and
responsive to determining that a quota is not configured for the resource, processing the request.

9. The method of claim 8, further comprising:
responsive to determining that a quota is not configured for the resource, determining that an amount of units used by the first core is less than a quota of the first core; and
responsive to determining that the amount of units used by the first core is not less than a quota of the first core, processing the request; and
updating the amount of units used by the first core based on the processed request.

10. A system of maintaining network address translation (NAT) session management on a multi-core system, comprising:
a multi-core device intermediary between a plurality of clients and a plurality of servers, the multi-core device including a first core and a second core, the first core, coupled to memory, configured to:
insert, for a session established between a client of the plurality of clients and a server of the plurality of servers, a network address translation (NAT) session in to a local outbound session table stored in a memory of the first core;
determine that a second core of the multi-core device will serve as a receiving core for a response to the request from the server to the client; and
insert the NAT session into a global session table responsive to determining that the second core will serve as the receiving core; and
the second core, coupled to memory, is configured to:
identify that the NAT session is not included in a local inbound session table stored in a memory of the second core;
identify the NAT session in the global session table; and
insert the NAT session in the local inbound session table stored on the memory of the second core.

11. The system of claim 10, wherein the first core is further configured to:
determine that the first core will serve as a receiving core for a response to the request from the server to the client; and
insert the NAT session in a local inbound session table stored on the memory of the first core.

12. The system of claim 10, wherein the first core is further configured to:
identify an existing NAT session owned by the first core;
determine that the existing NAT session is shared using the global session table;
determine that the existing NAT session is no longer being used;
remove the existing NAT session from the local outbound session table stored on the memory of the first core; and
remove the existing NAT session from a local inbound session table stored on a memory of a core of the multi-core device determined to serve as a receiving core for packets corresponding to the existing NAT session.

13. The system of claim 10, wherein the first core is further configured to:
receive an input packet corresponding to the NAT session;
determine that at least one service is associated with the NAT session; and
forward the input packet from the client to the service.

14. The system of claim 10, wherein the first core is further configured to:
receive a request for a port within a range on the first core;
iterate through slots of ports in a local bitmap of the first core;
determine that a slot of ports in the local bitmap has at least one free port; and
allocate the free port responsive to the request.

15. The system of claim 10, wherein the first core is further configured to allocate a port range based on one of a block allocation or a NAT session.

16. The system of claim 10, wherein the first core is further configured to:
receive a request for allocation of an object;
determine that the object is available in a free queue of a memory of the first core;
remove the object from the free queue; and
return the object to a core from which the request was received.

17. The system of claim 10, wherein the first core is further configured to:
receive a request for a resource on the first core;
determine that a quota is configured for a resource; and
responsive to determining that a quota is not configured for the resource, process the request.

18. The system of claim 17, wherein the first core is further configured to:
responsive to determining that a quota is not configured for the resource, determine that an amount of units used by the first core is less than a quota of the first core; and
responsive to determining that the amount of units used by the first core is not less than a quota of the first core, process the request; and
update the amount of units used by the first core based on the processed request.

19. A system of maintaining network address translation (NAT) session management on a multi-core system, comprising:
a multi-core device intermediary between a plurality of clients and a plurality of servers, the multi-core device including a first core and a second core, the first core, coupled to memory, configured to:
insert, for a session established between a client of the plurality of clients and a server of the plurality of servers, a network address translation (NAT) session in to a local outbound session table stored in a memory of the first core;
determine that a second core of the multi-core device will serve as a receiving core for a response to the request from the server to the client;
insert the NAT session into a global session table responsive to determining that the second core will serve as the receiving core;

identify an existing NAT session owned by the first core;
determine that the existing NAT session is shared using the global session table;
determine that the existing NAT session is no longer being used;
remove the existing NAT session from the local outbound session table stored on the memory of the first core; and
remove the existing NAT session from a local inbound session table stored on a memory of a core of the multi-core device determined to serve as a receiving core for packets corresponding to the existing NAT session.

* * * * *